(12) United States Patent
Jarett

(10) Patent No.: US 6,195,665 B1
(45) Date of Patent: Feb. 27, 2001

(54) DIGITAL ELECTRICAL COMPUTER APPARATUS, AND METHODS FOR MAKING AND USING THE SAME, FOR TEMPLATE BUILDING, LOADING, AND VIEWING

(75) Inventor: Irwin M. Jarett, Chicago, IL (US)

(73) Assignee: Tomorrow's Software, L.L.C., Rosemont, IL (US)

(*) Notice: Subject to any disclaimer, the term of this patent is extended or adjusted under 35 U.S.C. 154(b) by 0 days.

(21) Appl. No.: 08/612,670

(22) Filed: Mar. 5, 1996

(51) Int. Cl.$^7$ .................................................. G06F 17/21
(52) U.S. Cl. ............................................................ 707/500
(58) Field of Search ................................... 395/784, 788, 395/764, 770, 766, 767, 768, 943; 707/500, 501, 505, 506, 507, 508, 509, 522, 526; 705/1, 7, 8, 9; 345/440

(56) References Cited

U.S. PATENT DOCUMENTS

| | | | |
|---|---|---|---|
| 5,071,135 | * 12/1991 | Campbell | 273/256 |
| 5,189,608 | * 2/1993 | Lyons et al. | 395/230 |
| 5,358,278 | * 10/1994 | Ellis | 281/31 |
| 5,410,646 | * 4/1995 | Tondevold et al. | 395/768 |
| 5,471,575 | * 11/1995 | Giansante | 395/764 |
| 5,481,714 | * 1/1996 | Pipkin et al. | 395/712 |

FOREIGN PATENT DOCUMENTS 0 762 289 A2 * 3/1997 (EP).

OTHER PUBLICATIONS

*Financial Reporting Using Computer Graphics*, Irwin M. Jarett, Copyright 1993 by John Wiley & Sons, Inc.
*Financial Reporting Using Computer Graphics 1994 Supplement*, Irwin M. Jarett, Copyright 1994 by John Wiley & Sons, Inc.
*Financial Reporting Using Computer Graphics 1995 Cumulative Supplement*, Irwin M. Jarett, Copyright 1995 by John Wiley & Sons, Inc.
Envisioning Information, Edward Tufte, 1990, Introduction and pp. 37–15, 1990.*
Reflex User's Guide, Database Management, Graphics, & Analysis, 1989, Chapter 4, pp. 69–108, 1989.*

* cited by examiner

*Primary Examiner*—Joseph H. Feild
(74) *Attorney, Agent, or Firm*—Kajane McManus; Peter K. Trzyna

(57) ABSTRACT

A machine and methods for making and using the same, involve a digital electrical information processing system to make a template program for organizing subsequently input template data. A builder program is used to make the template include a page having: a first portion that includes a set of data elements for representing the subsequently input data such that if the subsequently input data includes a time series data, then the first portion includes sets of up to twelve time series numeric data elements, and if the subsequently input data includes numeric data elements, then the first portion includes no more than four sets of numeric data elements, each of the sets including no more than ten numeric data elements; a second portion having at least one chart with at least one plot for depicting each of the numeric data elements from the first portion of the page; and a third portion having text characterizing at least one of the numeric data elements in the first portion. The template program is stored on memory media, and read by a viewer program operable on the computer system, to permit loading the template with data. The template loaded with data can be used to produce a show, readable by either the viewer program or an abbreviated version thereof, or to produce printed reports.

49 Claims, 78 Drawing Sheets

Microfiche Appendix Included
(5 Microfiche, 429 Pages)

FIG. 51

CPANALYST ANNUAL TEMPLATE - Sample Company

File  Edit  Words  Data  Charts  Pages  Help

Bal Sht-Data

Sample Company Consolidated
Balance Sheet Analysis - End of Year Results

| ASSETS: | | Feb 1996 ACTUAL | Feb 1995 ACTUAL |
|---|---|---:|---:|
| Cash | $ | 8,300 | $ 3,400 |
| Accounts Receivable | | 1,500 | 1,300 |
| Inventory | | 1,250 | 800 |
| Other current Assets | | 500 | 1,000 |
| Total current Assets | $ | 11,500 | $ 6,500 |
| Fixed Assets at Cost | | 19,500 | 16,600 |
| Less Accumulated Depreciation | | 5,000 | 4,000 |
| Fixed Assets Net | $ | 14,500 | $ 12,600 |
| Other Assets | | 1,000 | 600 |
| Total Assets | $ | 27,050 | $ 19,700 |
| LIABILITIES & EQUITY | | | |
| Accounts Payable | $ | 900 | $ 850 |
| Accrued Taxes Payable | | 1,200 | 1,500 |
| Accured Expenses Payable | | 1,300 | 1,250 |
| Other Current Liabilities | | 250 | 500 |
| Total Current Liabilities | $ | 3,650 | $ 4,100 |
| Other Liabilities | | 4,000 | 3,200 |
| Total Liabilities | $ | 7,650 | $ 7,300 |
| Capital | | 10,000 | 5,000 |
| Retained Earnings | | 9,400 | 7,400 |
| Total Liabilities & Equity | $ | 27,050 | $ 19,700 |

IRVS TIRE STORE
Consolidated
End of Year Results

CPAnalysis for September 1995

Printed on Wednesday September 27, 1995

| FIG. 69A | FIG. 69B |
|---|---|
| FIG. 69C | FIG. 69D |

FIG. 69B

IRV'S TIRE STORE - Tabular Balance Sheet Analysis

| | DEC 1995 ACTUAL | | DEC 1994 ACTUAL | |
|---|---|---|---|---|
| Assets: | | | | |
| Cash | $ | 51,681 | $ | |
| Accounts Receivable | | 904,000 | | 861,000 |
| Inventory | | 956,320 | | 956,200 |
| Other Current Assets | | 65,000 | | |
| Total Current Assets | $ | 2,029,201 | $ | 1,765,000 |
| Fixed Assets at Cost | | 678,000 | | 441,000 |
| Less Accumulated Depreciation | | 101,000 | | |
| Fixed Assets Net | $ | 577,000 | $ | 441,000 |
| Other Assets | | | | |
| Total Assets | $ | 2,606,201 | $ | 2,206,000 |
| Liabilities & Equity | | | | |
| Accounts Payable | $ | 201,000 | $ | 187,000 |
| Taxes Payable | | 532,000 | | 648,000 |
| Accrued Expenses Payable | | 62,500 | | 24,000 |
| Other Current Liabilities | | 278,900 | | 310,000 |
| Total Current Liabilities | $ | 1,074,400 | $ | 1,169,000 |
| Other Liabilities | | 325,600 | | 441,000 |
| Total Liabilities | $ | 1,400,000 | $ | 1,610,000 |
| Capital | | 216,000 | | 216,000 |
| Retained Earnings | | 990,201 | | 380,000 |
| Total Liabilities & Equity | $ | 2,606,201 | $ | 2,206,000 |

FIG. 69D

IRV'S TIRE STORE
Written Balance Sheet Analysis

IRV'S TIRE STORE's Total Assets and Total Liabilities & Equity increased from $2,206,000 in 1994 to $2,606,201 in 1995, a $400,201 or 18.14% increase.

A 18.14% increase is an aggressive growth rate. Such growth puts substantial pressures on management to maintain a sustainable return on assets. Growth this large requires careful planning and execution by everyone in the company.

FIG. 70

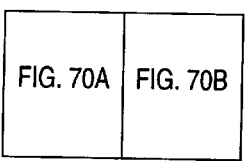

FIG. 70A

Balance Sheet Analysis for IRVS TIRE STORE

IRVS TIRE STORE's Total Assets and Total Liabilities & Equity increased from $2,226,000 in 1994 to $2,616,201 in 1995, a $390,201 or 17.53% increase.

A 17.53% increase is an aggressive growth rate. Such growth puts substantial pressures on management to maintain a sustainable return on assets. Growth this large requires careful planning and execution by everyone in the company.

The Current Ratio is a primary indicator of liquidity and is computed by dividing Total Current Assets by Total Current Liabilities. The Current Ratio for the year ended 1994 was 1.45 and was 1.89 for the year ended 1995, an increase of 0.43 or 29.91%. This Ratio Shows that for the year ended 1994, IRVS TIRE STORE had $1.45 in current assets for every dollar in current liabilities, and $1.89 in 1995. A 1.89 Current Ratio is in the range considered extremely liquid. Management may want to consider options to invest liquid assets in revenue generating techniques, such as paying off short term debt to avoid interest charges.

The Quick Ratio is a supplementary indicator of liquidity that concentrates on the most liquid assets, Cash, Accounts Receivable and Inventory. These three current assets are called the Quick Assets because they include cash and the two current assets most easily converted to cash. The Quick Ratio is computed by dividing the Quick Assets by Total Current Liabilities. The Quick Ratio for the year ended 1994 was 0.71 and was 0.94 for 1995. This Ratio Shows that for the year ended 1994, IRVS TIRE STORE had $0.71 in quick assets for every dollar in current liabilities, and $0.94 in 1995.

A 0.94 Quick Ratio is in the range considered adequate.

Long-term Debt Coverage is computed by dividing Fixed Assets Net by Other Liabilities the long term debt element. The Long-term Debt Coverage for the year ended 1994 was $0.96 and was $1.18 for 1995, an increase of $0.22 or 22.90%. This ratio shows the Company had $0.96 invested in fixed assets for every dollar financed by long-term debt in 1994 and $1.18 this year.

FIG. 70B

Balance Sheet Analysis for IRVS TIRE STORE

A $1.18 coverage is not considered good.

Leverage is a ratio that shows how much of the Total Assets are funded by total Equity and is computed by dividing Total Assets by Total Equity. Each industry has certain ranges of leverage that are workable for that industry. Certain industries use assets that require a high leverage to make money such as a steel processing plant, others require a low leverage such as a software company. The higher the leverage, the smaller "Net Income" has to be to create a high return on Equity; and the down side is that the higher the leverage, the more likely it is that the company cannot earn enough to support the debt. This ratio is best explained in context with the other DuPont ratios, see Company Performance Review.

Leverage at year end 1994 was 4.09 and 2.49 this year, a decrease of 1.60 or 39.16%. In 1994 the Company had 4.09 invested in fixed assets for every dollar financed by direct equity and 2.12 this year. Check with your industry associations or the library to see how your leverage compares to the industry.

| FIG. 71A | FIG. 71B |
|---|---|
| FIG. 71C | FIG. 71D |

FIG. 71B

IRVS TIRE STORE
Tabular Assets Analysis

| Assets: | | DEC 1995 ACTUAL | | DEC 1994 ACTUAL | % Var. |
|---|---|---|---|---|---|
| Cash | $ | 58,256 | $ | 6,575 | 786% |
| Accounts Receivable | | 956,200 | | 854,425 | 11% |
| Inventory | | 956,320 | | 904,000 | 5% |
| Other Current Assets | | 58,425 | | 10,000 | 484% |
| Total Current Assets | $ | 2,029,201 | $ | 1,775,000 | 14% |
| Fixed Assets at Cost | | 678,000 | | 806,000 | (15%) |
| Less Accumulated | | 101,000 | | 365,000 | (72%) |
| Fixed Assets Net | $ | 577,000 | $ | 441,000 | 30% |
| Other Assets | | 10,000 | | 10,000 | 0% |
| Total Assets | $ | 2,616,201 | $ | 2,226,000 | 17% |

FIG. 71D

IRVS TIRE STORE
Written Assets Analysis

IRVS TIRE STORE's Total Assets increased $390,201, or 17.53% between 1994 and 1995.

Such an increase is larger than what might be expected. Does your business plan call for such rapid asset growth? Does your source of funds support such growth?

Last year, Total Current Assets were 79.74% or $0.80 of every dollar of Total Assets. This year Total Current Assets decreased to 77.56% or $0.78 of every dollar of Total Assets. Fixed Assets Net plus Other Assets increased from 20.26% or $0.20 of every dollar of Total Assets in 1994 to 22.44% or $0.22 of every dollar of Total Assets in 1995.

FIG. 72

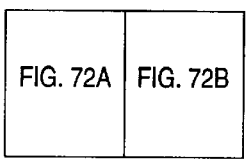

FIG. 72A

Assets Analysis for IRVS TIRE STORE

IRVS TIRE STORE's Total Assets increased $390,201, or 17.53% between 1994 and 1995.

Such an increase is larger than what might be expected. Does your business plan call for such rapid asset growth? Does your source of funds support such growth?

Last year, Total Current Assets were 79.74% or $0.80 of every dollar of Total Assets. This year Total Current Assets decreased to 77.56% or $0.78 of every dollar of Total Assets. Fixed Assets Net plus Other Assets increased from 20.26% or $0.20 of every dollar of Total Assets in 1994 to 22.44% or $0.22 of every dollar of Total Assets in 1995.

Cash increased from 0.35 days sales on hand last year to 2.57 days sales on hand this year. Days Sales in Cash is a good indicator of your ability to cover immediate cash requirements. Too little cash hinders your ability to pay your bills and too much cash cost you money.

Days Sales in Cash of 2.57 may be too small to protect your ability to pay. If this is not a short term exception and is creating a negative impact on your ability, you may need to turn more of your current assets into cash.

Accounts Receivable decreased from 45.28 days sales in accounts receivable last year to 42.12 days sales this year. Days Sales in Accounts Receivable is a good indicator of your ability to cover short term cash requirements. Too many days in sales indicates a potential collection problem while too few sales days in Accounts Receivable may indicate you are loosing additional sales. Balancing the need for cash against easier credit terms is a constant struggle.

Days Sales in Accounts Receivable of 42.12 indicates good control of your receivables.

Inventory decreased from 47.90 days sales in inventory last year to 42.12 days sales this year. Days Sales in Inventory is a good indicator of your ability to cover customer demands. Too many days sales in Inventory indicates a potential inventory problem of old, non producing inventory while too few sales days in Inventory may indicate you are not able to service customer demands. Balancing inventory to meet customer demands and maintain your investment mix is a critical management skill.

FIG. 72B

Assets Analysis for IRVS TIRE STORE

Days Sales in Inventory of 42.12 indicates good control of your inventory for most industries.

The total days sales in Cash, Accounts Receivable and Inventory is IRVS TIRE STORE's average operating cycle. If you are in a highly seasonal business, this annual computation may not be a totally appropriate figure. Just as any of the components have upper and lower limits, the operating cycle has a similar set of limits. Normally 60 to 75 days is a good target. IRVS TIRE STORE's operating cycle decreased with 93.53 in 1994 and 86.80 in 1995.

A total operating cycle of 86.80 indicates an operating cycle that may strain your ability to pay and to profit from your operations. Using scarce investment funds to support such a cycle could be very expensive in the long run. You should consciously work to lower this figure to a more acceptable range.

Other Current Assets are not normally operating assets. This category includes prepaid expenses, deposits and other assets that will be consumed during the current year. IRVS TIRE STORE's Other Current Assets increased with 0.56% of Total Current Assets in 1994 and 2.88% in 1995.

Fixed assets decreased from $806,000 in 1994 to $678,000 in 1995, a 15.88% decrease in Fixed Assets at Cost. You sold or wrote off $128,000 of Fixed Assets at Cost in 1995 net of any assets that were purchased. That is a 15.88 % decrease in Fixed Assets at Cost over last year.

Reserve for Depreciation decreased from $365,000 in 1994 to $101,000 in 1995. This decrease is impacted by the assets bought, sold and or retired during the year.

Fixed Assets Net increased from $441,000 in 1994 to $577,000 in 1995. This increase is impacted by the assets bought, sold and or retired during the year.

Other Assets decreased from 0.45% of Total Assets in 1994 to 0.38% in 1995. When Other Assets are 0.38% of Total Assets, that tends to be within a normal range. Other Assets are normally non earning assets and thus should be carefully controlled.

| FIG. 73A | FIG. 73B |
|---|---|
| FIG. 73C | FIG. 73D |

FIG. 73B

IRVS TIRE STORE
Tabular Liabilities & Equity Analysis

| Liabilities & Equity | DEC 1995 ACTUAL | DEC 1994 ACTUAL | % Var. |
|---|---|---|---|
| Accounts Payable | $ 201,000 | $ 187,000 | 7% |
| Taxes Payable | 532,000 | 648,000 | (17%) |
| Accrued Expenses Payable | 62,500 | 75,950 | (17%) |
| Other Current Liabilities | 278,900 | 310,000 | (10%) |
| Total Current Liabilities | $ 1,074,400 | $ 1,220,950 | (12%) |
| Other Liabilities | 490,790 | 461,000 | 6% |
| Total Liabilities | $ 1,565,190 | $ 1,681,950 | (6%) |
| Capital | 216,000 | 216,000 | 0% |
| Retained Earnings | 835,011 | 328,050 | 154% |
| Total Liabilities & Equity | $ 2,616,201 | $ 2,226,000 | 17% |

FIG. 73D

IRVS TIRE STORE
Written Liabilities & Equity Analysis

IRVS TIRE STORE's Total Liabilities & Equity increased $390,201, or 17.53% between 1994 and 1995.Such an increase is larger than what might be expected. Does your business plan call for such rapid funding growth? Does your new asset mix earn enough to support the new funding mix?

Last year, Total Equity was 24.44% or $0.24 of every dollar of Total Liabilities and Equity and this year it grew to 40.17% or $0.40 of every dollar. This year, Total Liabilities dropped from $1,681,950 in 1994 to $1,565,190 in 1995. As a result, Total Liabilities dropped from 75.56% or $0.76 of every dollar of Total Liabilities and Equity in 1994 to 59.83% or $0.60 in 1995.

FIG. 74

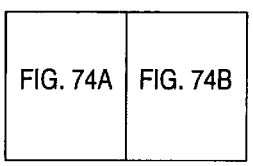

FIG. 74A

Liabilities & Equity Analysis for IRVS TIRE STORE

IRVS TIRE STORE's Total Liabilities & Equity increased $390,201, or 17.53% between 1994 and 1995.Such an increase is larger than what might be expected. Does your business plan call for such rapid funding growth? Does your new asset mix earn enough to support the new funding mix?

Last year, Total Equity was 24.44% or $0.24 of every dollar of Total Liabilities and Equity and this year it grew to 40.17% or $0.40 of every dollar. This year, Total Liabilities dropped from $1,681,950 in 1994 to $1,565,190 in 1995. As a result, Total Liabilities dropped from 75.56% or $0.76 of every dollar of Total Liabilities and Equity in 1994 to 59.83% or $0.60 in 1995.

A 15.73% increase in Equity funding is a material shift in funding source from Liability to Equity in 1995. Debt is a material part of business management and contributes to a higher return on Equity. Moving to such a greater portion of Equity in the funding mix puts additional earning requirements on your assets. As noted in the company Performance page, Leverage was 4.09 in 1994 and is currently 2.49 a decrease of 1.60.

Last year, Total Current Liabilities were $1,220,950 and this year they were $1,074,400, a decrease of $146,550 or 12% in 1995. Last year Total Current Liabilities were 72.59% or $0.73 of every dollar of Total Liabilities and this year they dropped to 68.64% or $0.69 of every dollar. Other Liabilities increased from $461,000 in 1994 to 11 in 1995, an increase of 6.46%. Other Liabilities increased from 27.41% or $0.27 of every dollar of Total Liabilities in 1994 to 31.36% or $0.31 in 1995.

A 3.95% increase in Other Liabilities as portion of Total Liabilities is a significant shift in the Total Liabilities mix. The more emphasis placed on other or longer term liabilities as a funding source, the more stress is placed on the earning assets to generate cash and sufficient earnings to cover the interest costs. Certain types of Other Liabilities also impose company performance ratios to meet the loan requirements.

FIG. 74B

Liabilities & Equity Analysis for IRVS TIRE STORE

IRVS TIRE STORE's Total Equity increased $506,961, or 93.18% between 1994 and 1995. Last year, Capital Investment was $216,000 and this year it stayed the same. As a result, Capital Investment was 39.70% or $0.40 of every dollar of Total Equity in 1994 and this year it dropped to 20.55% or $0.21 of every dollar. Retained Earnings was $328,050 in 1994 and increased to $835,011 in 1995, a $506,961 or 154.54% increase. Because Retained Earnings increased, it grew from 60.30% or $0.60 of every dollar of Total Equity in 1994 to 79.45% or $0.79 in 1995.

A 93.18% increase in the Retained Earnings portion of Total Equity is a significant shift from Capital to Retained Earnings. It indicates that management feels the company can earn a higher than market return on investment.

Days sales in Accounts Payable decreased from 9.91 last year to 8.85 this year.

Days Sales in Accounts Payable is a good indicator of your ability to effectively use accounts payable as a source of funding. Too small an Accounts Payable balance may mean you are paying your bills too quickly, and too large an Accounts Payable balance may cost you money. Each industry and business balances will differ.

Days Sales in Accounts Payable of 8.85 might indicate that you are paying too quickly. If so, you may be loosing the interest you could gain on short term cash investments. You should determine if you are earning more discounts on the payables than you would on short term cash investments.

Operating Capital required is a figure that describes how efficient IRVS TIRE STORE is in managing liquid Current Assets to maintain an appropriate capital position. The Average Days Sales is computed by dividing the Total Income by 365 days. The Average Days Sales was $18871.23 in 1994 and $22703.67 in 1995, an increase of $3832.44 days.

The Net Cash Cycle is computed by subtracting the days sales in Accounts Payable from the Average Operating Cycle. The Net Cash Cycle for 1994 was 83.62 days and 77.95 days for 1995, a decrease of 5.67 days.

FIG. 75

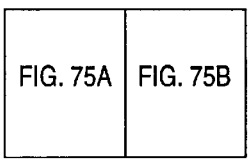

FIG. 75A

Liabilities & Equity Analysis for IRVS TIRE STORE

The Operating Capital required for 1994 was $1,578,000 and $1,769,776 for 1995, a difference of $191,776. If you are in a highly seasonal business, this annual computation may not be a totally appropriate figure. Your current Operating Capital requirements based on the figures provided are 87.22% of Total Current Assets.

Operating Capital as a percent of Total Current Assets for 1995 is 87.22% and is considered high. Using scarce investment funds to support such a cycle could be expensive and risky in the long run. You should consciously work on the components of the Net Cash Cycle to lower this figure to a more acceptable range. It may be wise to get a professional accountant or financial person involved.

Taxes Payable include all of the Federal, State and Local Taxes due. These payables have exact payment requirements that if they are not met, can cause serious reprocussions. The only way to tell if the taxes are current is to check the taxes due to each taxing entity. Last year Taxes Payable were 53.07% or $0.53 of every dollar of Total Current Liabilities. This year they were 49.52% or $0.50 of every dollar of Total Current Liabilities, a decrease of 3.56%. A 3.56% decrease is a small decrease.

Accrued Expenses Payable normally include all of the expenses that have accrued due to the operations of the business. For example, if payroll is not paid at the end of the month, the payroll will be accrued. Regular, reoccurring expenses such as electricity, insurance are also accrued to provide for a good matching of expenses and revenues. Last year Accrued Expenses Payable were 6.22% or $0.06 of every dollar of Total Current Liabilities. This year they were 5.82% or $0.06 of every dollar of Total Current Liabilities, a decrease of 0.40%. A 0.40% decrease is a small decrease.

Other Current Payables are not normally operating payables. This category includes prepaid deposits, current portion of notes payable and other payables that are due sometime during the current year. Last year IRVS TIRE STORE's Other Current Payables were $461,000 and this year they were $490,790. That is an increase of $29,790 or 6.46% this year.

FIG. 75B

| Liabilities & Equity Analysis for IRVS TIRE STORE |
|---|
| |

| FIG. 76A | FIG. 76B |
| --- | --- |
| FIG. 76C | FIG. 76D |

FIG. 76B

IRV'S TIRE STORE
Tabular Revenue & Expense Analysis

|  | DEC 1995 ACTUAL | DEC 1994 ACTUAL | % Var. |
|---|---|---|---|
| Total Revenues | $ 8,286,840 | $ 6,888,000 | 20% |
| Cost of Goods Sold | 6,760,564 | 5,718,000 | 18% |
| Gross Margin | $ 1,526,276 | $ 1,170,000 | 30% |
| Selling, General & Admin. Exp. | 567,203 | 489,000 | 15% |
| Operating Expenses | 348,872 | 301,000 | 15% |
| Operating Profit | $ 610,201 | $ 380,000 | 60% |
| Other Income/Expense (Net) | 23,500 | 25,000 | (6%) |
| Earnings Before Taxes | $ 633,701 | $ 405,000 | 56% |
| Income Taxes | 126,740 | 76,950 | 64% |
| Earnings After Taxes | $ 506,961 | $ 328,050 | 54% |

FIG. 76D

IRVS TIRE STORE
Written Revenue & Expense Analysis

Selling, General & Administrative Expenses "SG&A" increased from $489,000 to $567,203, a $78,203 or 15.99% increase in 1995. Last year SG&A was 7.10% of Total Revenues and this year it decreased to 6.84%, a 0.25% drop. The fact that SG&A dropped at a rate of 0.25% this year when compared to Total Revenues indicates that management placed more controls on these expenses.

Operating Expenses "OPEX" increased from $301,000 to $348,872, a $47,872 or 15.90% increase in 1995. Last year OPEX was 4.37% of Total Revenues and this year it decreased to 4.21%, a 0.16% drop.

FIG. 77

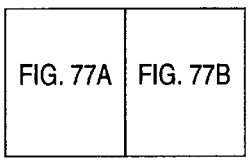

FIG. 77A

Revenue & Expense Analysis for IRVS TIRE STORE

IRVS TIRE STORE's Total Revenues increased from $6,888,000 in 1994 to $8,286,840 in 1995, a 20.31% increase. Cost of Goods Sold "COGS" increased from $5,718,000 in 1994 to $6,760,564 in 1995, an increase of $1,042,564 or 18.23%. Gross Margin increased from $1,170,000 in 1994 to $1,526,276 in 1995, a net increase of $356,276 or 30.45%. Last year Gross Margin was 16.99% of Total Revenues and this year it is 18.42%, a net increase of 1.43%. When COGS decreases at a faster rate than Total Revenues, the Gross Margin percent will rise. You may want to look at your pricing and/or your sales mix to see how you can sustain such a trend.

Selling, General & Administrative Expenses "SG&A" increased from $489,000 to $567,203, a $78,203 or 15.99% increase in 1995. Last year SG&A was 7.10% of Total Revenues and this year it decreased to 6.84%, a 0.25% drop. The fact that SG&A dropped at a rate of 0.25% this year when compared to Total Revenues indicates that management placed more controls on these expenses.

Operating Expenses "OPEX" increased from $301,000 to $348,872, a $47,872 or 15.90% increase in 1995. Last year OPEX was 4.37% of Total Revenues and this year it decreased to 4.21%, a 0.16% drop.

The fact that OPEX dropped at a rate of 0.16% this year when compared to Total Revenues indicates that management placed more controls on these expenses.

Last year Other Income Expenses Net reduced Earnings Before Taxes $25,000 and this year $23,500, an increase of $1,500 or 6%. Other Income Expenses accrue from financial or other transactions not part of the normal business operations. Such transactions include interest income and expenses, dividends, discounts, etc..

DIGITAL ELECTRICAL COMPUTER APPARATUS, AND METHODS FOR MAKING AND USING THE SAME, FOR TEMPLATE BUILDING, LOADING, AND VIEWING

MICROFICHE APPENDIX

Appendix A, which is a part of the present disclosure, is a microfiche appendix consisting of 5 sheets of microfiche having a total of 429 frames. Microfiche appendix A is a computer program listing.

I. TECHNICAL FIELD

This invention concerns a digital electric computer and a data processing system (apparatus), and methods for making and using the apparatus, and articles produced thereby. Preferably these are applied to the fields of finance and accounting. More particularly, this invention relates to a computer system for generating computer-based briefing books which assist in the effective visual and acoustic communication of numerical and textual data. The invention further concerns the computer-assisted creation of templates to match the specific reporting needs. The invention can be implemented in hardware, by programming a programmable device, or some combination thereof. One approach is to use a template builder program to make a template program, a template viewer program to view the template and load it with data, to generate a presentation, a show, and/or a report. The show can be run in combination with a viewer program. Any of these can separately be stored in memory (diskette, ROM, etc.) to form an article of manufacture.

II. BACKGROUND OF THE INVENTION

If there was ever a single word that describes the mental state of, or the perspective of, an industry, it is "multimedia." It is impossible to imagine a new personal computer being announced without multimedia capability. Few retail sales of personal computers are believed to be made without at least minimum multimedia capabilities. The computer science industry is always looking for a new concept upon which the next product of the decade can be built. This decade it could be "Multimedia." There are at least two types of multimedia—emotional and intellectual.

Emotional Multimedia concentrates on those media that activate the emotional characteristics of the brain. The most recognizable use of Emotional Multimedia is motion pictures. Films utilize graphics, movement, human or humanoids, sound, light, and trick photography to involve a passive viewer in an emotional roller coaster.

In this regard, Applicant has published the following texts: *Financial Reporting Using Computer Graphics,* John Wiley & Sons, N.Y., 1993, and its 1995 supplement (both of which are incorporated by reference herein). The supplement defines "Intellectual Multimedia" as "a concentrated and specific effort to activate all four parts of the brain about a set of information with appropriate media that results in understanding." The effort reflects research into how the brain functions, as discussed in references cited therein.

Intellectual Multimedia requires tabular, written, graphic and voice or sound to activate all four parts of the brain. If all of the media is aimed at getting the same information into the brain, improved learning occurs. The best use is to include interactivity so that a "learner" moves at his or her own pace.

Implementating intellectual multimedia requires a substantial understanding of how the human brain processes information and how a large amount of information can be successfully communicated at one time.

Executives, managers, employees and their families who do not understand accounting or the financial reports prepared by accountants would benefit from a multimedia approach to help them understand. However, Accountants are once again unprepared for the technological revolution that surrounds us. Thus, financial statements in the prior art are not at all known for their wide range of understanding.

One of the most critical success factors in communication is to get information to those involved as soon as possible after the events occur. When the events that created the data, such as operating results, are fresh in the mind of those involved, the information becomes more relevant.

What is needed, therefore, is a system which truly explains what the data means by combining such information with the vast multimedia power of present day systems. The system must be fast—e.g., real time. And the system should make use of developments in brain research, so as to effeciently communicate such information as financial data.

III. SUMMARY OF THE INVENTION

Therefore, it is an object of the present invention to provide a machine, manufacture, process, and improvement thereof in which an electrical signal processing system processes and modifies electrical signals representing data so as to overcome the aforementioned disadvantages of prior art systems and construct and manipulate data signals by electrical means.

Another object of this invention is to provide a machine, manufacture, process, and improvement thereof in which a computerized system is capable of building a template for organizing data.

Yet another object of the invention is to provide a machine, manufacture, process, and improvement thereof in which a computerized system is capable of viewing the template and loading data in the template.

Yet another object of the invention is to provide a machine, manufacture, process, and improvement thereof in which a computerized system is capable of generating, real time, reports constructed by the system.

Yet another object of the invention is to provide a machine, manufacture, process, and improvement thereof in which a computerized system is capable of making a show program.

Yet another object of the invention is to provide a machine, manufacture, process, and improvement thereof which can be implemented in a variety of embodiments, including hardware, a hard coded computer program, objects, applets, or the like, and can be stored in volitile memory or in a Read Only Memory (ROM).

Various other objects, advantages and features of the present invention will become readily apparent from the ensuing detailed description, and the novel features will be particularly pointed out in the appended claims.

Accordingly, the present invention involves an apparatus for doing real time, structured data presentations, using developments in brain research. The apparatus presents data in tables and in exact replica of the data in graphic form; plus a detailed written analysis to describe the importance of the numbers; and, voice or sound can be added. The media is organized so the same information gets into all four parts of the brain quickly and at the same time. The result is a more effective and relevant understanding and eventually, learning.

Intellectual Multimedia is a highly structured computer system or series of systems having several critical components. A straight forward way to understand Intellectual Multimedia is by the output of the computer system, a "Briefing Book." A Briefing Book is comprised of a series of "Pages" that together present data in an efficient structure, based on brain research. An example of a Briefing Book can be one used to characterized business' performance from the corporate level to the lowest level operating component (see the sample Page at FIG. 53. For example, one Briefing Book could include financial statements that describe the overall corporate performance. A second Briefing Book might be a "shift" report describing the results of the 6:00 a.m. to 3:30 p.m. shift for a manufacturing production line or for a fast food restaurant.

The structure for each Briefing Book is defined in a set of words, formulas, and definitions called a Template. The Template includes a number of Pages. For the above-mentioned examples, the financial statement Template could be eight Pages and the shift Template could be three Pages. There can be as many Templates as desired for business functions with measurable tasks and/or results. Operating results can be analyzed and presented in Intellectual Multimedia, such as analyzing production mix formulas using heat, pressure, materials mix, etc. This example, however, focusses on the analysis of financial results. In any data case, the Briefing Book must be available soon after the events occur for distribution throughout the organization—preferably via real time digital computing.

The Pages are assembled into a bound Briefing Book and distributed to the appropriate personnel. Each Page presents a set of numbers, such as a Balance Sheet, a Revenue and Expense Statement, a Statement of Retained Earnings, Cash Flow lists, Expense Schedules, and other required or supporting statements. Each set of numbers organized in the template is matched to a comparable set of numbers used for analytical purposes. The actual comparative data set can be current actual data shown as compared to the same for last year; or current actual data can be shown compared to current a budget or forecast; or current actual data can be compared to an industry standard. The Pages are highly structured and follow a strict set of guidelines that ensure an effective and efficient communication of the data:

A. Each Page preferably has four "portions", which can be understood as quadrants: Two for the left side of the brain and two for the right side. The portions are linked horizontally, and vertically in accordance with the scientific research on how people see and bring information into the brain.
  B. The top half of the Page makes up a data transfer portion of the Page. The purpose of the top half is to get a data set into the viewer's brain. The two upper portions must be strictly related.
    1. The top left portion is seen best by the left eye. The left eye gets the information to the top right part of the brain, the "visual part."
    2. The top right portion is seen best by the right eye. The right eye gets the information to the top left part of the brain, the "number" part of the brain.
    3. The top right portion presents a highly structured tabular version of financial or operating data, to be communicated within this Page. Research indicates that the average human can only work with a limited number of variables. The most often quoted limitation is seven variables. Applicant's own research indicates that through the proper use of these Intellectual Multimedia presentations, the number of data variables that can be seen and understood increases to ten. The ten variables can be doubled to twenty by selecting either the Component or Twin chart for the top left quadrant.
    4. The top left portion of the Page contains a chart presentation replicating the data set. The chart selected must be an exact representation of the financial statement or other number data set presented in the top right portion of the Page. For example, if the data set shows (cash+accounts receivable+inventory+other current assets=total current assets) then the chart must show the identical relationships. It is critical that the upper left and upper right parts of the brain see the same data patterns.
  C. The bottom half of the page makes up a data analysis part of the Page. The purpose of the bottom half is to help the viewer's brain understand what the data patterns mean.
    1. A chart presentation in the bottom left portion can be any chart that helps the user analyze and understand the relationships shown on any Page in the book. In most instances, the bottom chart will be a "ratio" chart from data in the first portion of any pages in the book, matched with any other relevant data.
    2. The lower right portion contains a written analysis of the results. If the written report requires more space than the lower right portion, the system inserts a global summary in the portion and carries the full text over to a separate Page or Pages.

The Template shown in this example is designed to analyze the financial statements for a generalized business model. The Template is called the Financial Statement Template—Annual. The Template compares actual data for the current year with current data from the previous year.

If the Template is to be sent to the client in a file format, a set of "slide show" files is created and sent to the client, either by diskette or electronically (using local or wide area networks or the Internet). If the presentation media is the computer, then one can add a voice message to each Page and direct the client to the critical areas.

In the Financial Statement Template, "Annual" is a general purpose Template that is useful in a large number of industries. There are eight Pages in the Template comparing current year to last year:

1. The Balance Sheet;
  2. Total Assets;
  3. Total Liabilities & Equity;
  4. Revenue & Expenses;
  5. Retained Earnings;
  6. Cash Flow (automatically created);
  7. Sales & Gross Margin for past twenty-four months (data must be supplied)
  8. Overall corporate performance showing net change and working capital and the Dupont ratios.

The client, with a companion viewer software/hardware system, can change data and add responses to the written or voice adaptation and return the template for use on a host or server. Thus, a user can be in direct contact with its clients or every worker in an organization so each can see and hear the results, providing an immense intellectual highway for communicating business information.

A Template can be built when a consistent set of data is used as a report and there is a knowledge base surrounding the data. When people use queries to see what the data might yield, the numbers are returned lacking the organization of a general knowledge base independent of the query user. There certainly is not sufficient general knowledge to support an interpretation of the numbers independent of the user. If, however, the numbers are organized and structured into repetitive statements (e.g., Financial Statements) or reports (e.g. the Standard Cost Variance Reports), a body of knowledge begins to accrue around the reports comprising general knowledge and company-specific knowledge. The more company-specific knowledge that exists, the more information can be captured in a template and then presented in the analysis.

The Templates are created so they capture the corporate intelligence surrounding the various report types. For example, a large, fast food franchising company would build company- specific Templates designed so each franchisee gets a consistent and timely evaluation of their performance at every level of operation. Each Template provides a detailed and timely analysis based on the best knowledge available throughout the company. For example, the user would develop monthly financial statement Templates for each reporting unit. In addition, the user would build Templates to help a shift manager at each store reconcile the actual cash, inventory, and supplies with expected values based on the sales mix. Similar reporting processes would support managers through their career paths, starting with shift reports and ending with the board's of directors financial statements. The Intellectual Multimedia reporting process guides personal growth through the management ranks, like a personal tutor who is fully knowledgeable about corporate expectations.

The data is used to load or activate the template that analyzes the data and forms a reports of the results. The text portion of the template, is built by defining every case situation that the data can present, and by creating fact statements and detailed analytical statements activated with various levels of triggers set for each case. For example, a case could be: "Total assets increased, total current assets increased, and the current ratio increased." One trigger might be set so that an increase in the current ratio of 0.15 would "trigger" an analytical statement about what that size move may indicate, which is inserted in the text portion of this template.

A set of Templates can be built for any company within any industry. For example, the fast food or trucking industry might use industry data for compariso, rather than its last year's budget or forecast data. When the actual data is analyzed, it also could be compared to the industry averages.

In the traditional client/server mode, the Template acts as the client and looks to the server for the data used in the analysis. The server can place the data in an appropriate file at a scheduled time. When the client is started, data could be automatically inputted into the Template. Or, the Template could be programmed to issue a "call" to the server as needed and wait for a response. In either case, data transfer can be made through a predefined, automated process. In many other situations, it would be more efficient to enter the data manually and concurrently read the emerging patterns in the chart format.

The Page Builder portion or program helps the user create new Pages in the Briefing Book, or altogether new Briefing Books, all starting with the data set. Once the data set is established, the Builder will help the user select the appropriate charts to replicate the data in a graphic format. Finally, the Builder helps the user create the variables and write the words required to report on all possible variations. The server contains all of the Builder functions and provides the users with access only to the "Pages" they are authorized to use. The Builder resides on the server and is used to create all of the Templates available to the client.

A "Bottom Line" feature is an improvement in productivity never before experienced by accountants. For example, a sixteen to eighteen page printed Briefing Book can be completed in less than one hour (using the Financial Statement—Annual Template with manual data entry). Here is a brief analysis of the time:

1. The time it takes the accountant (or staff) to enter the data is 5–10 minutes.
2. The time it takes the accountant to edit the written analysis before it is printed is 20–30 minutes.
3. The time it takes to print the report is strictly dependent on the speed of the printer.
4. Once the Briefing Book is printed, it will take another 20–25 minutes to perform the final edit before the Briefing Book is ready for distribution. But the real productivity comes from the fact that:
    a. An accounting firm can provide their clients with a set of detailed analyses in a few hours where now it could take several days. The economics of the practice change dramatically.
    b. The clients (public and private) learn more about the financial aspects of their business than ever before. In short, data turns into comprehensible information, becoming more valuable to the clients.
    c. A CFO can help the company capture the corporate knowledge surrounding the operating numbers from the lowest operating unit to the highest level consolidation. Such a corporate-wide set of Templates helps everyone in the company see and understand how their efforts impact the bottom line.

IV. BRIEF DESCRIPTION OF THE DRAWINGS AND CODE

The aforementioned and other features of this invention and the manner of attaining them will become apparent and the invention itself will be best understood with reference to the following description of the invention in conjunction with the accompanying drawings and source code.

A. Figures

Figure 13:
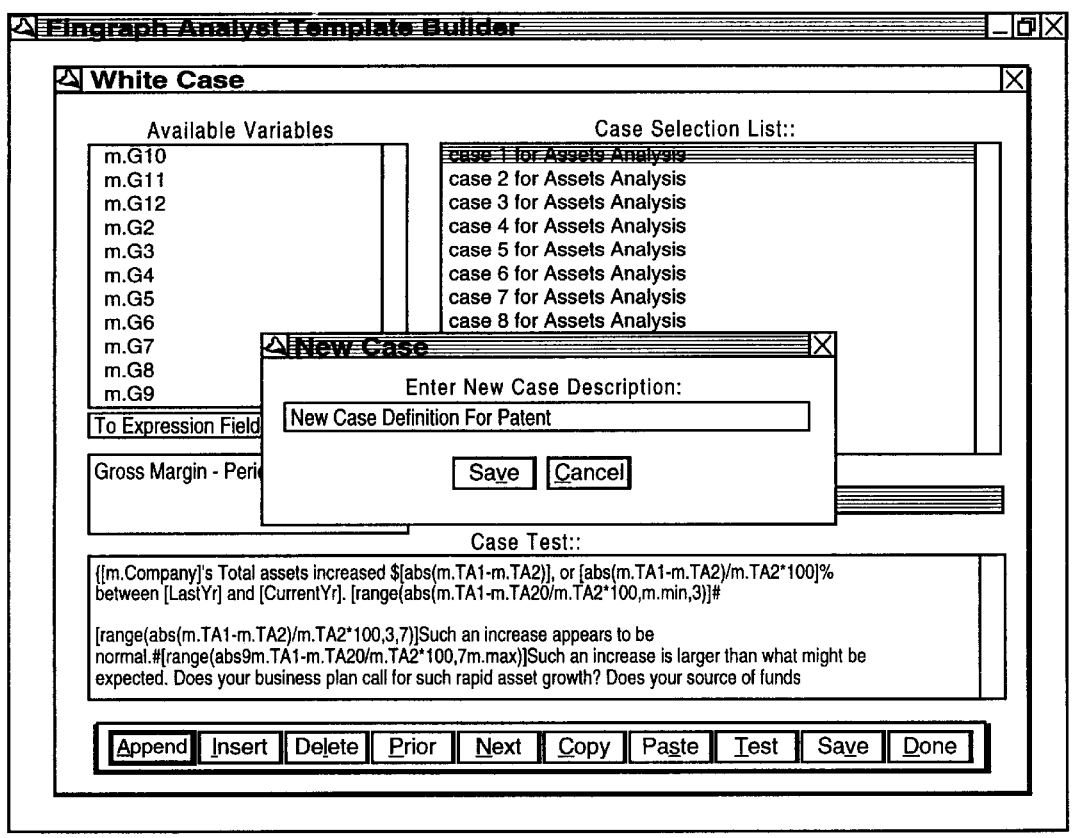
Figure 14:
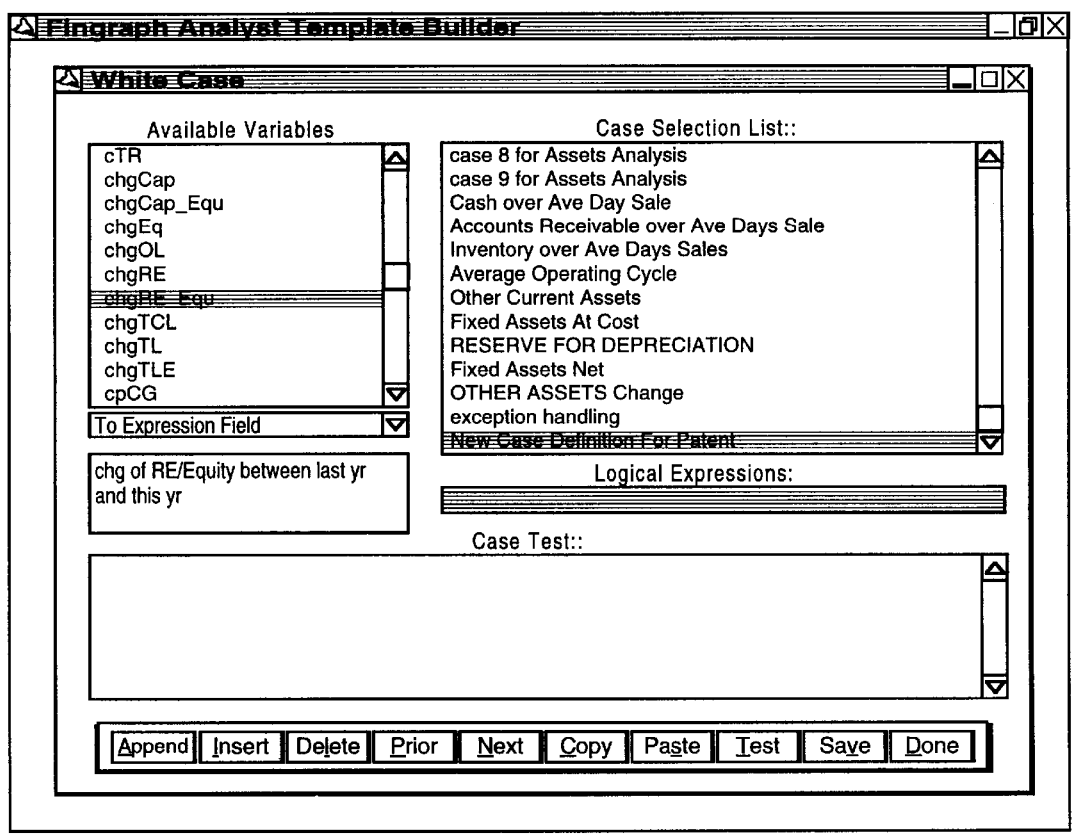
Figure 15:
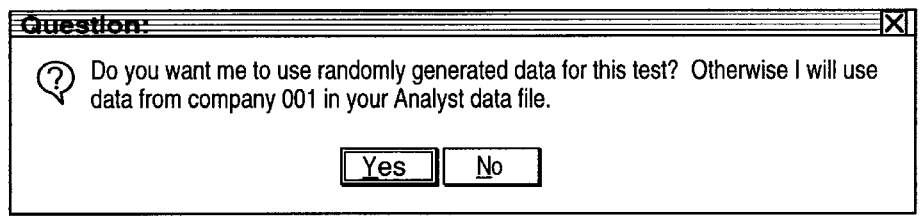
Figure 16:
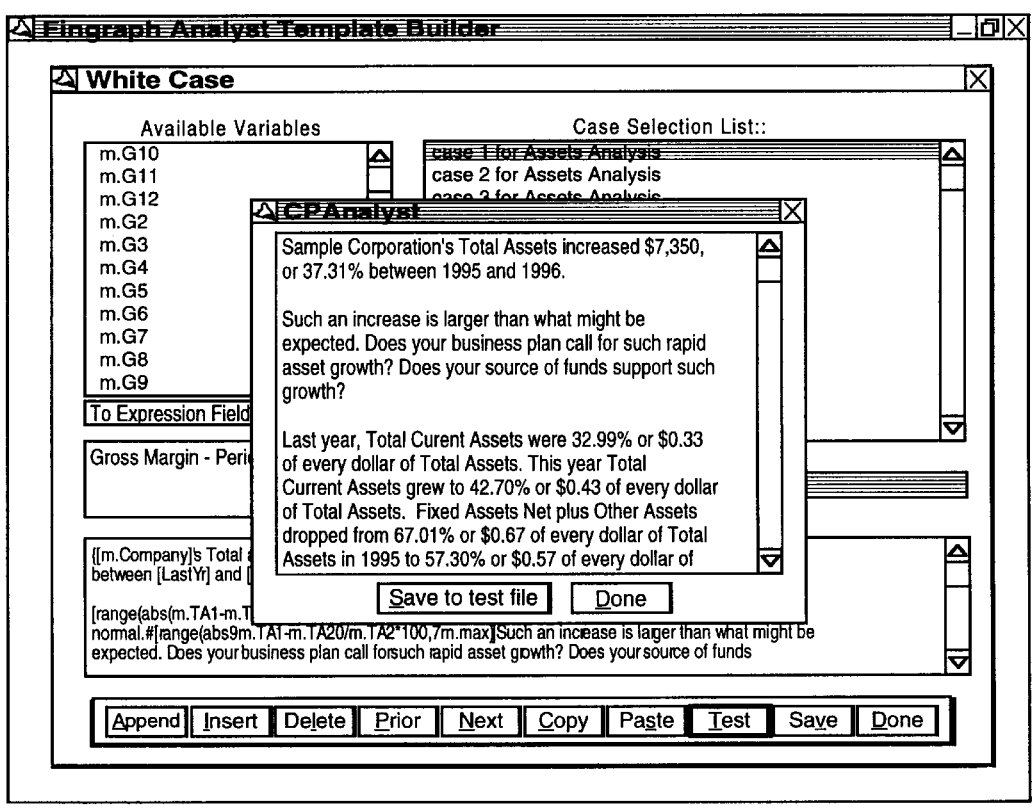
Figure 17:
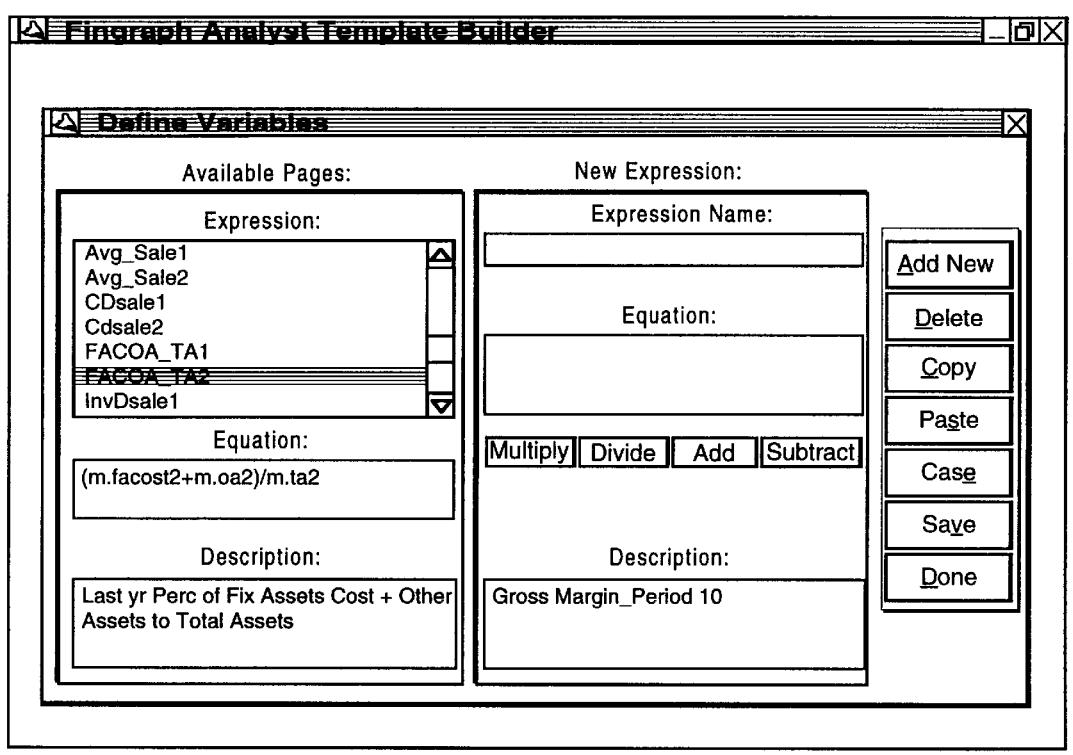
Figure 18:
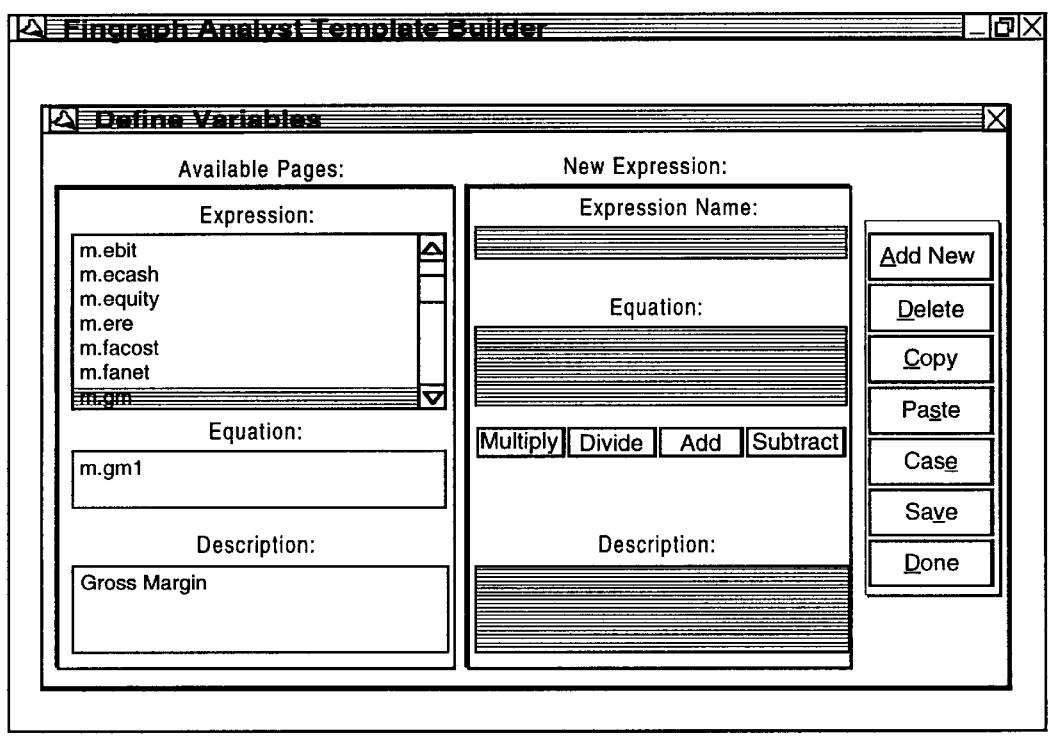
Figure 19:
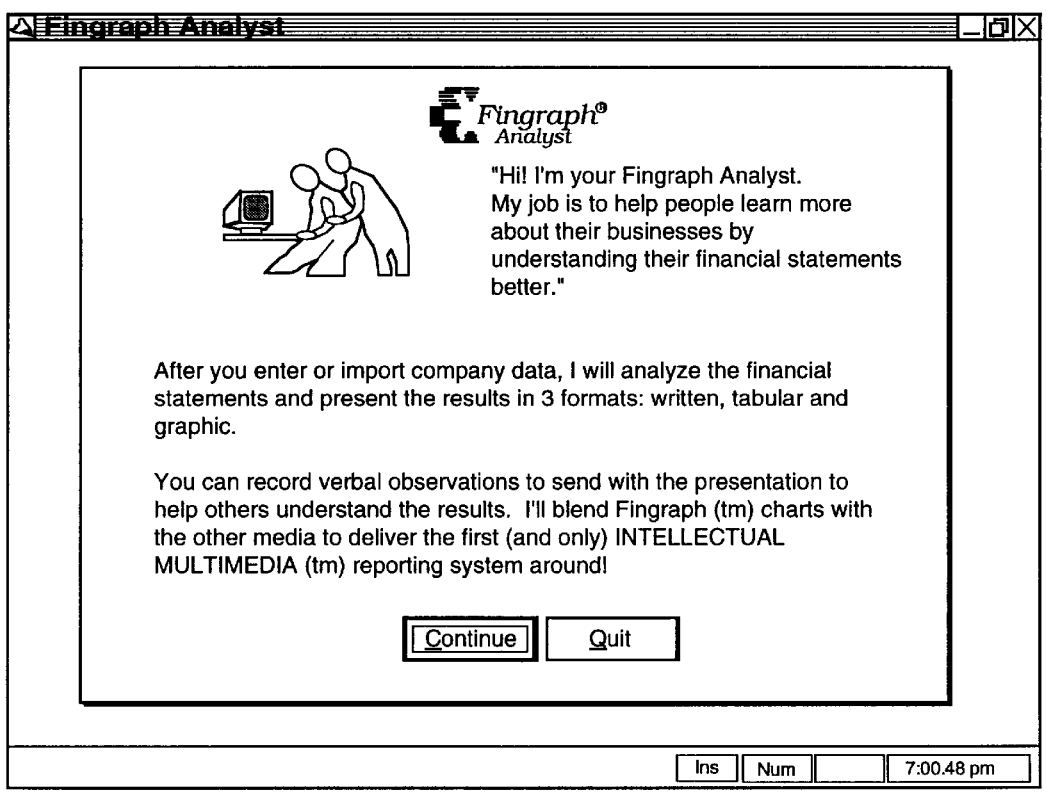
Figure 20:
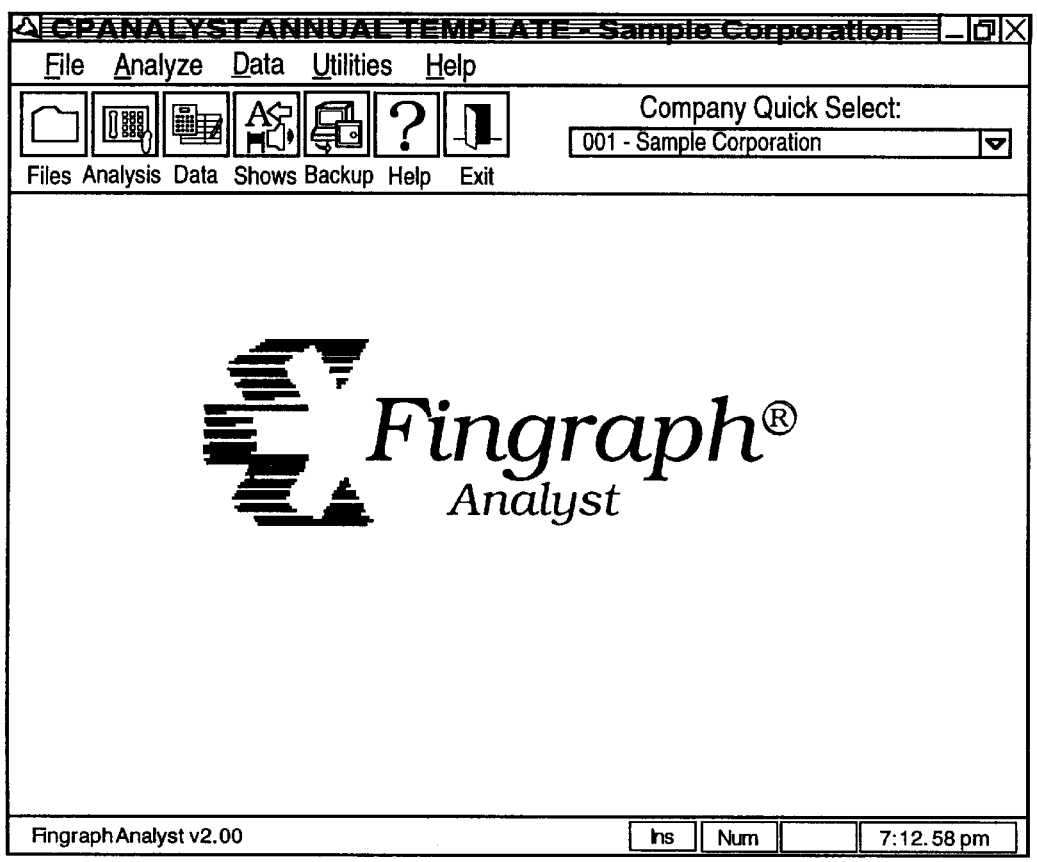
Figure 21:
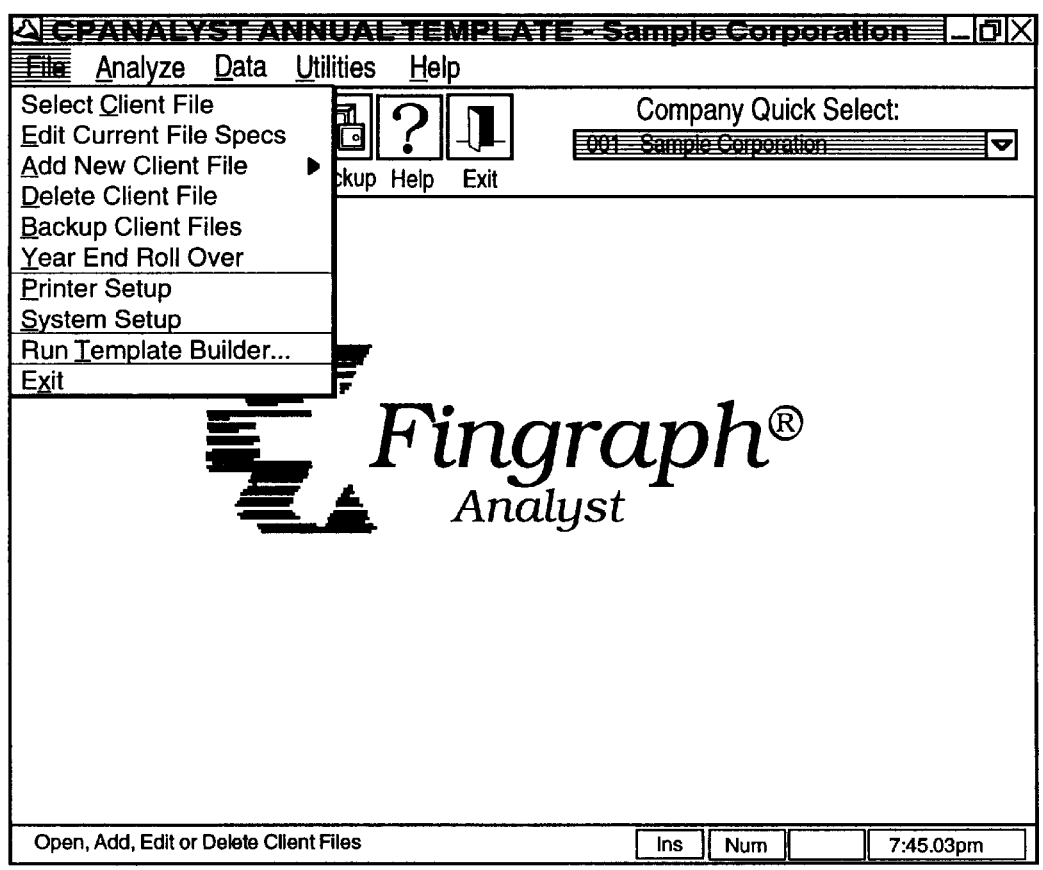
Figure 22:
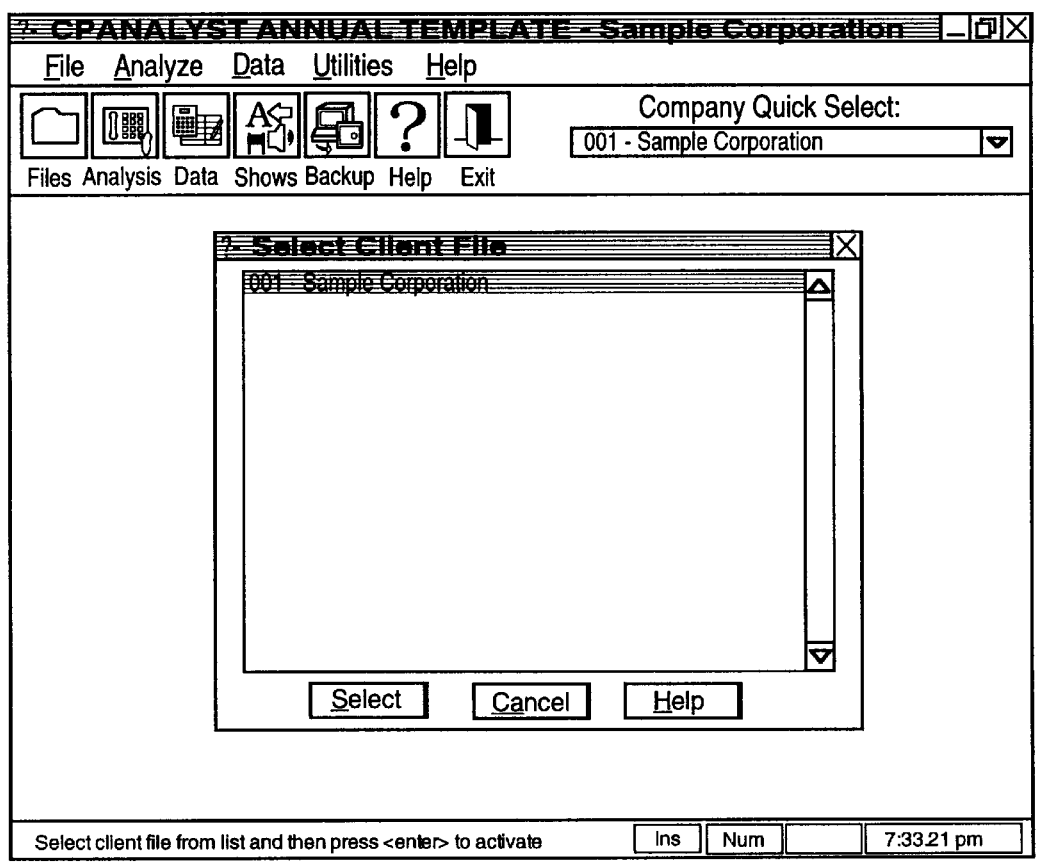
Figure 23:
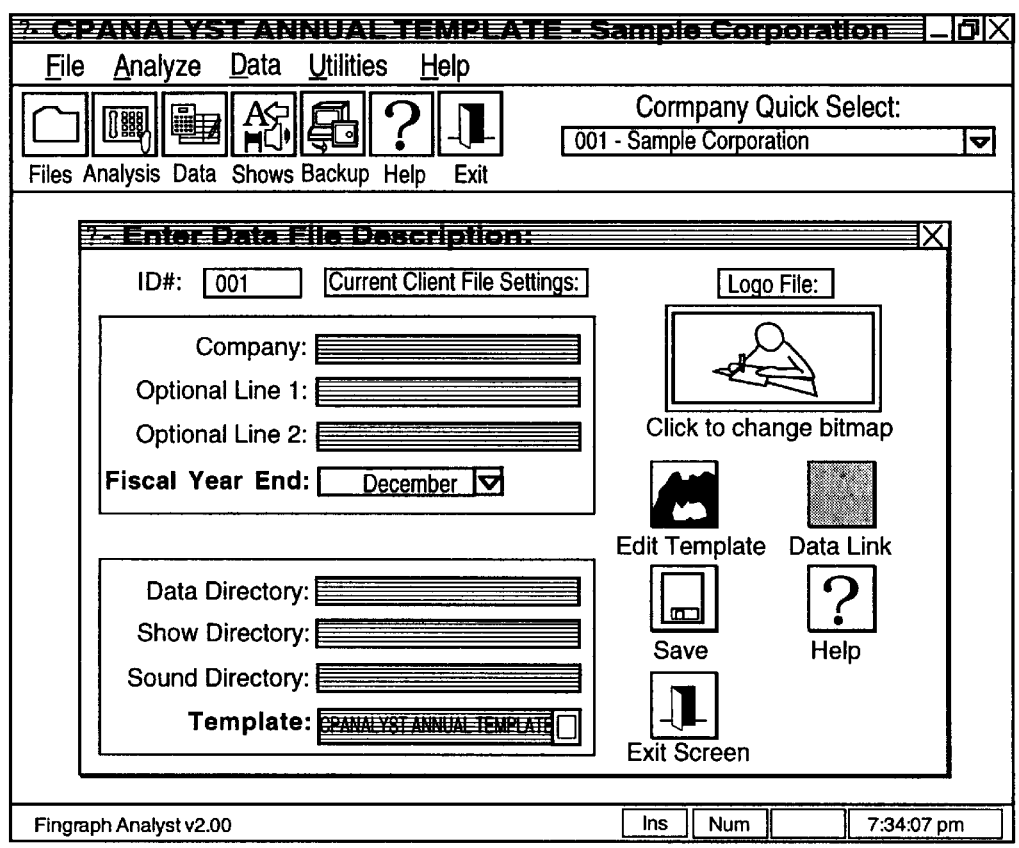
Figure 24:
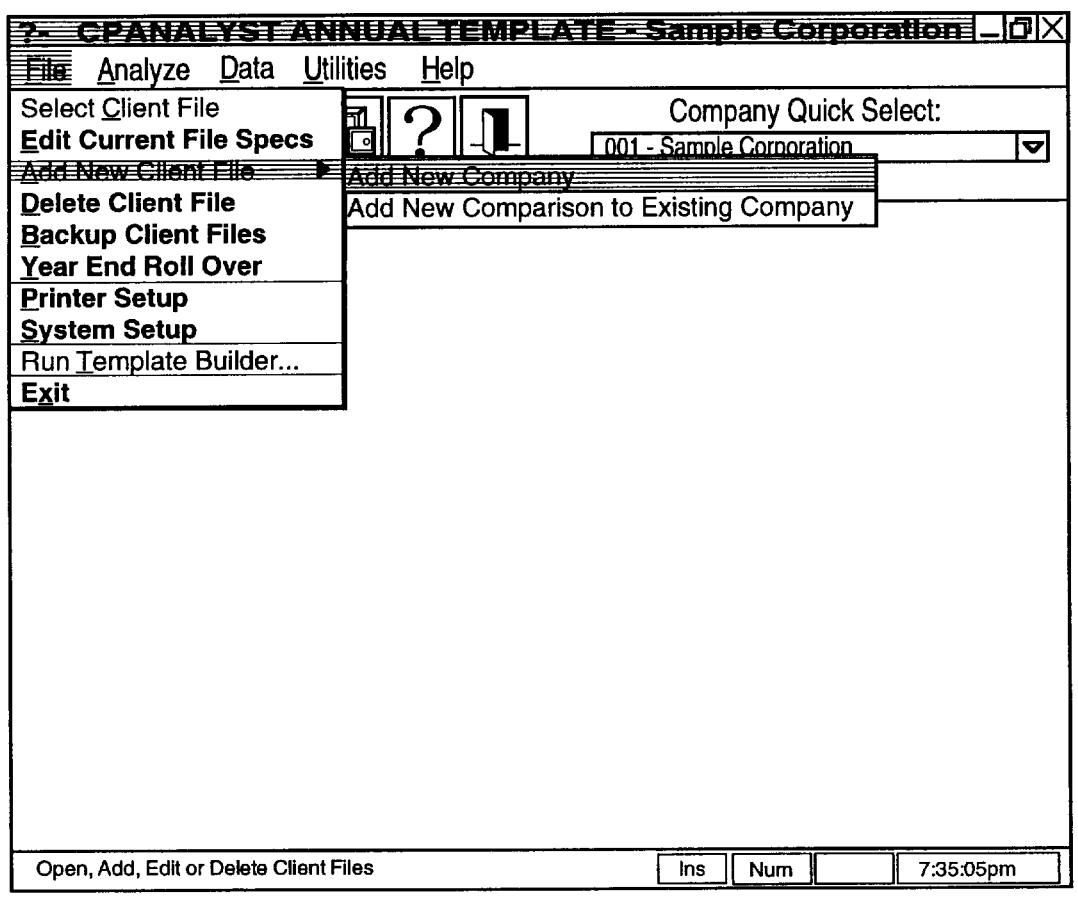
Figure 25:
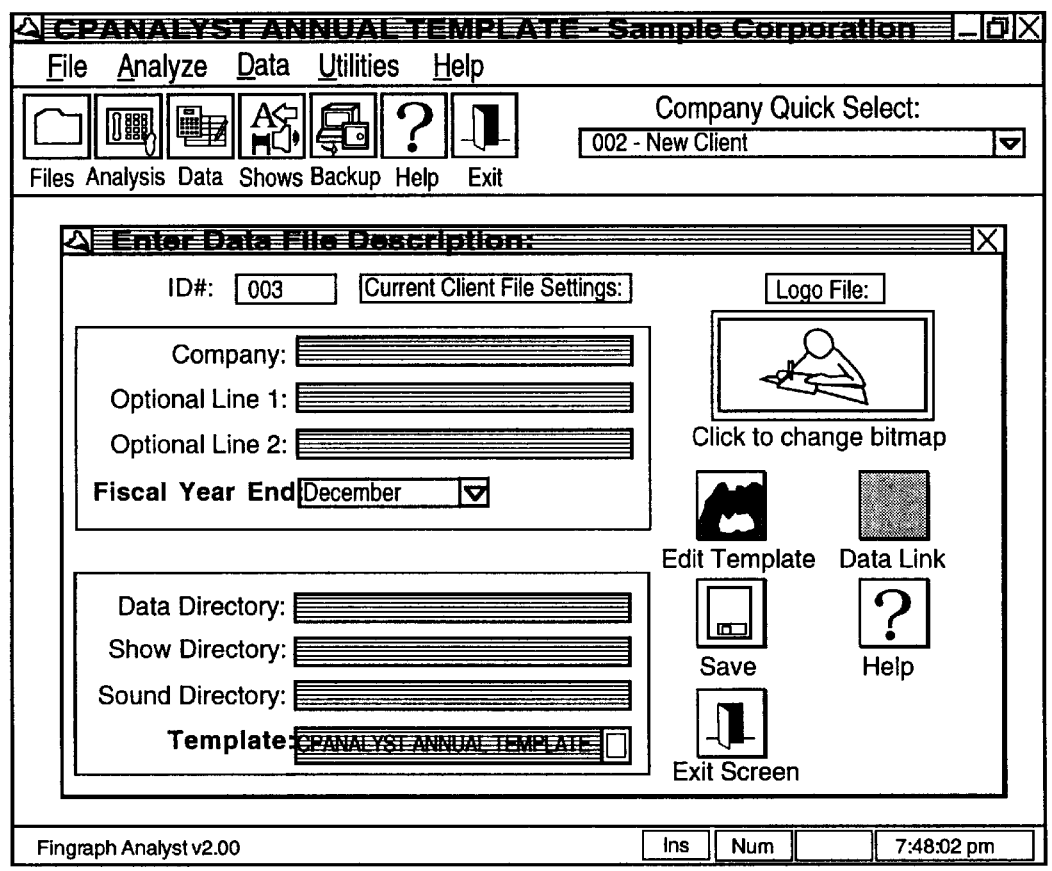
Figure 26:
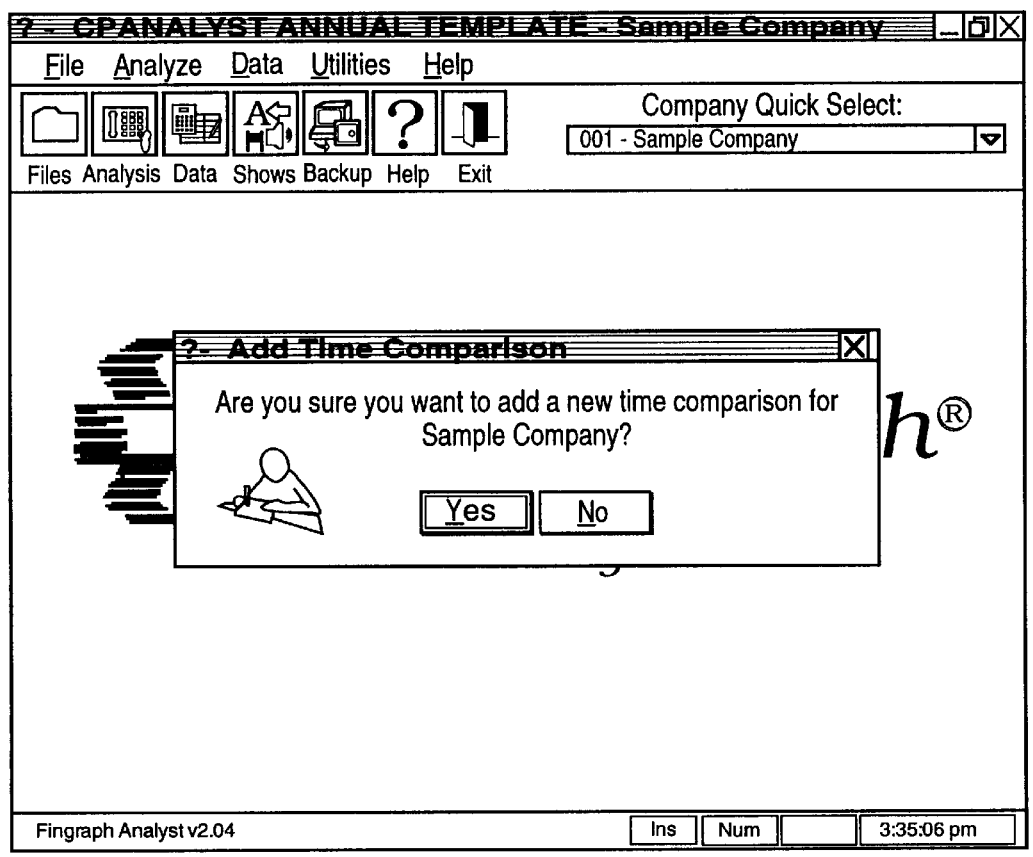
Figure 27:
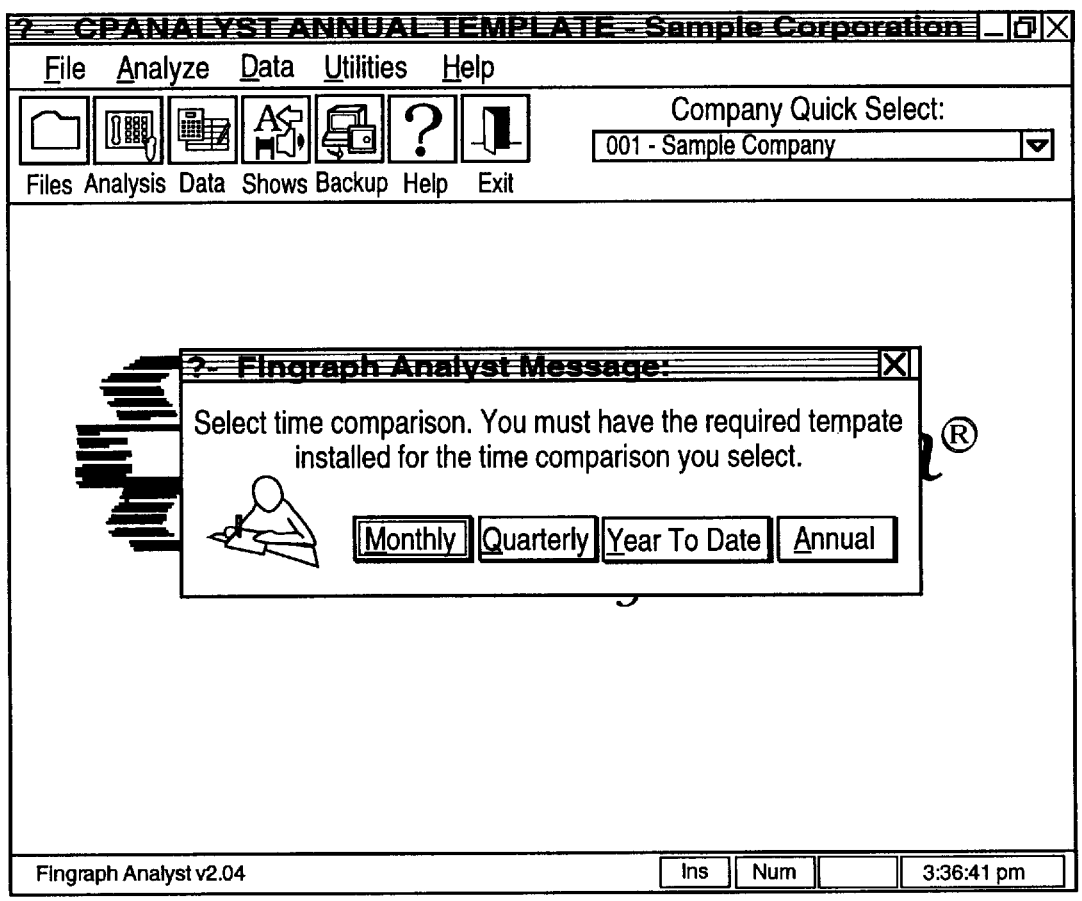
Figure 28:
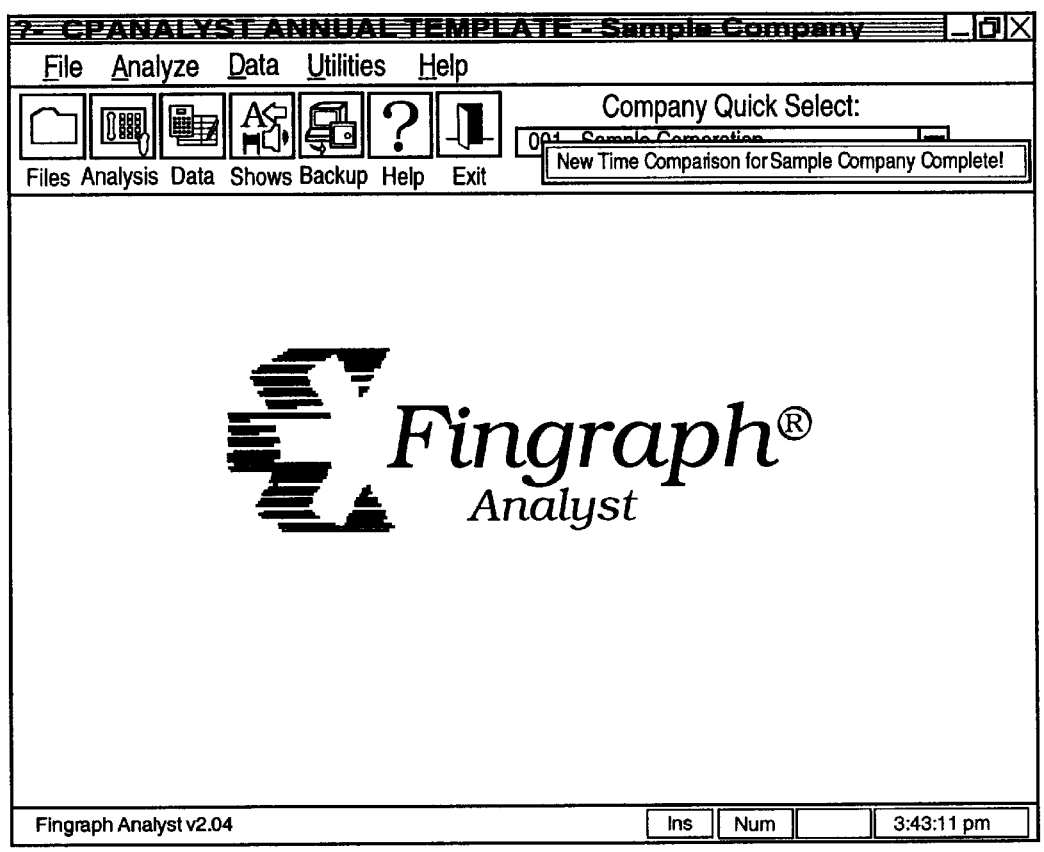
Figure 29:
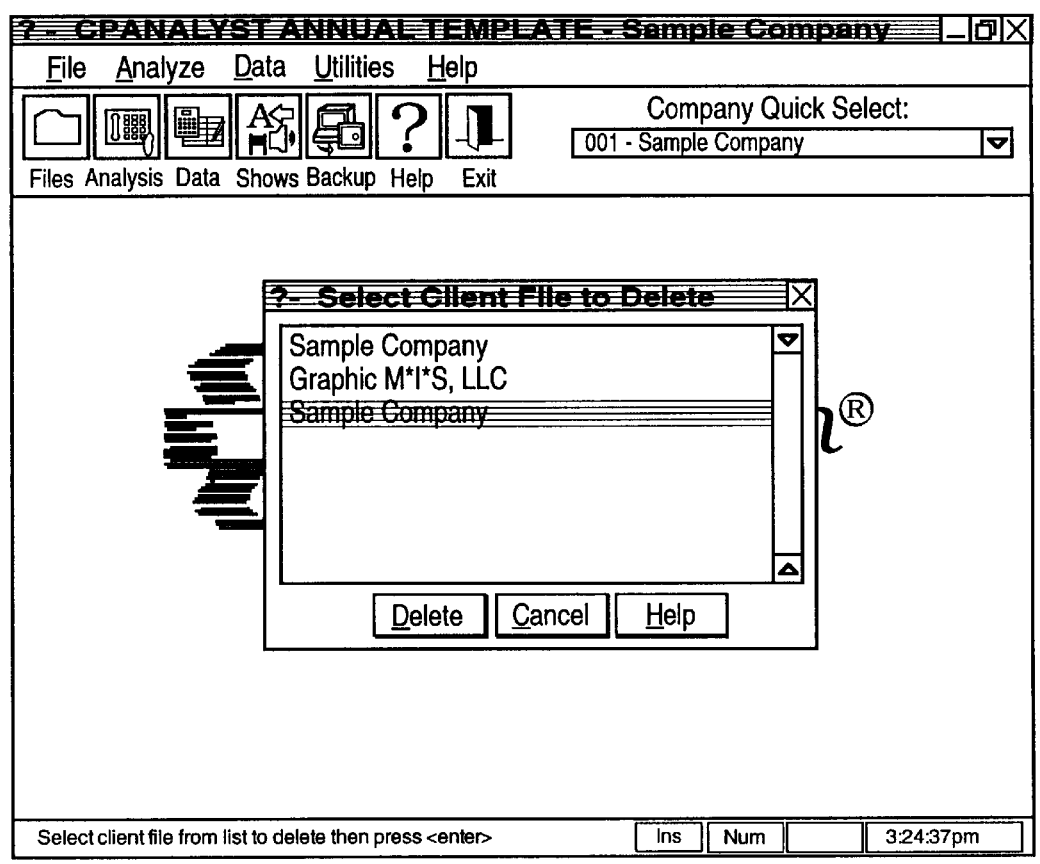
Figure 30:
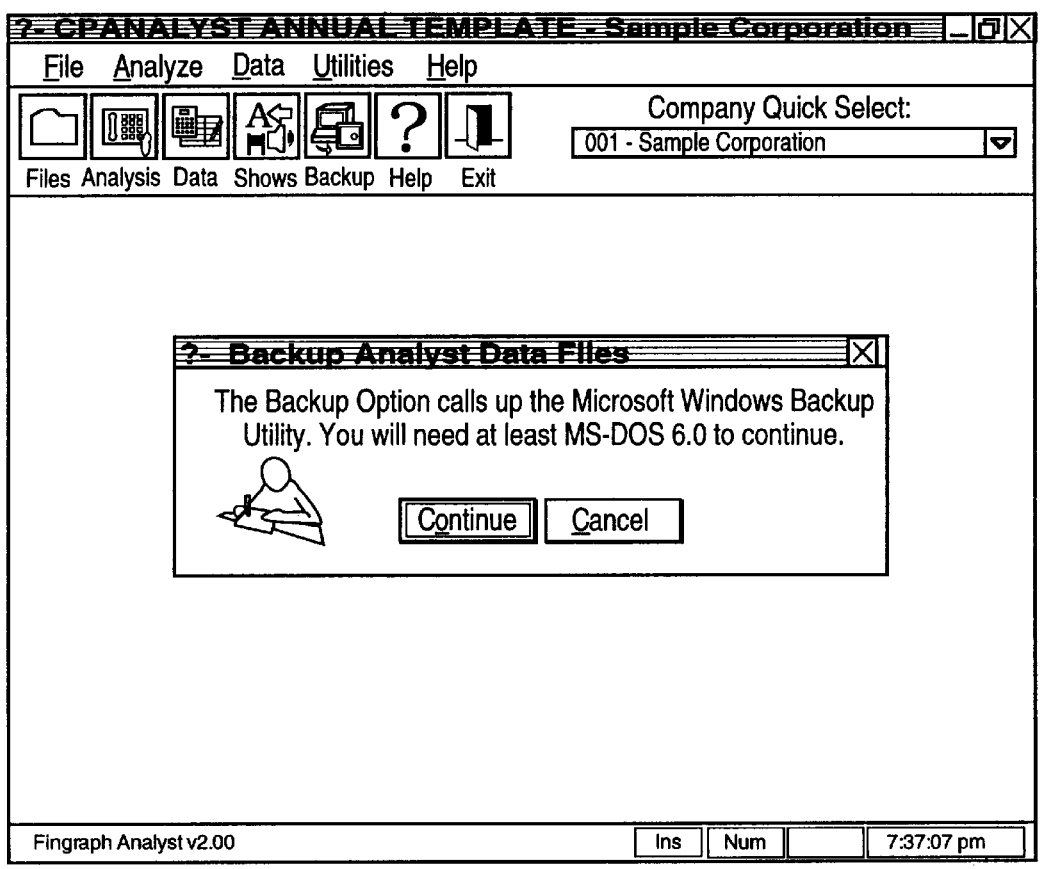
Figure 31:
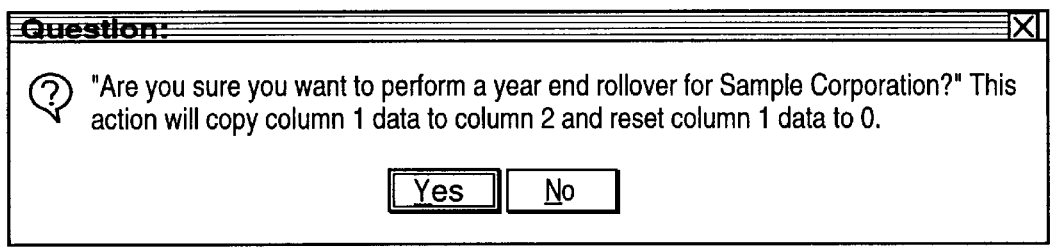
Figure 32:
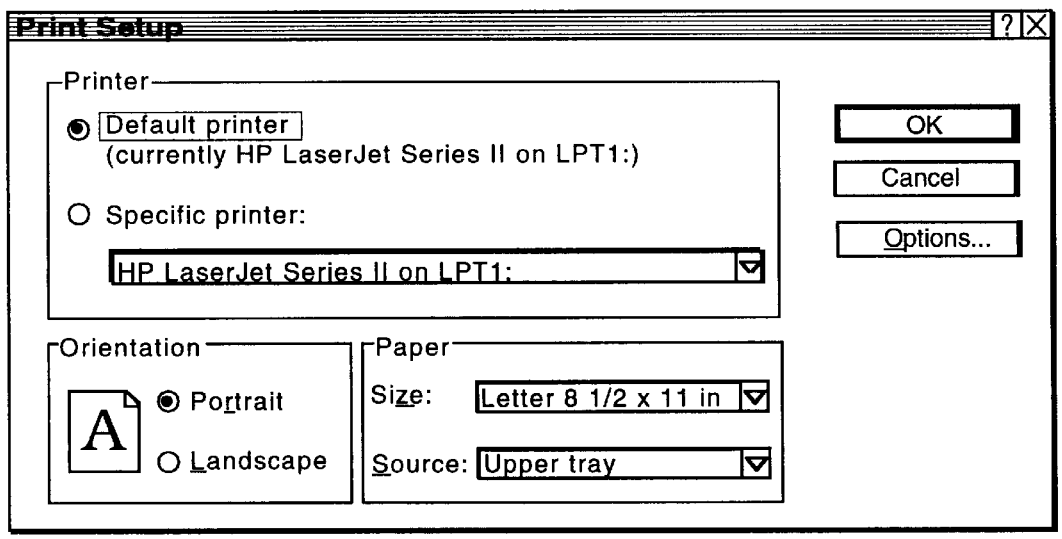
Figure 33:
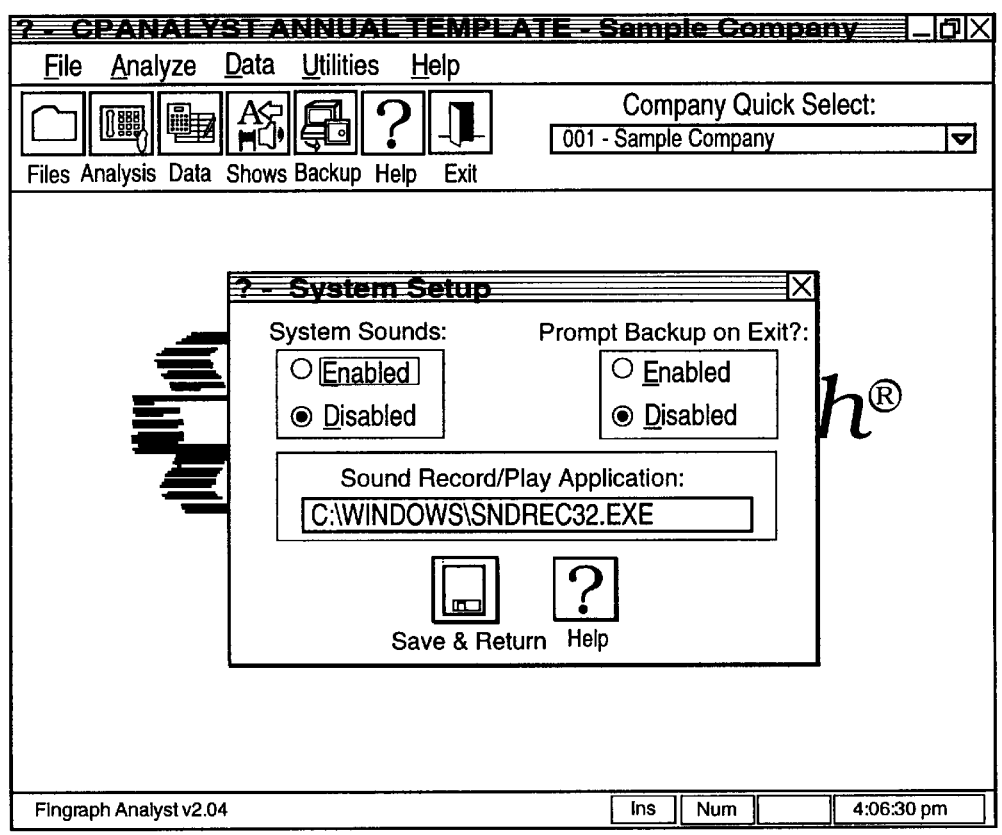
Figure 34:
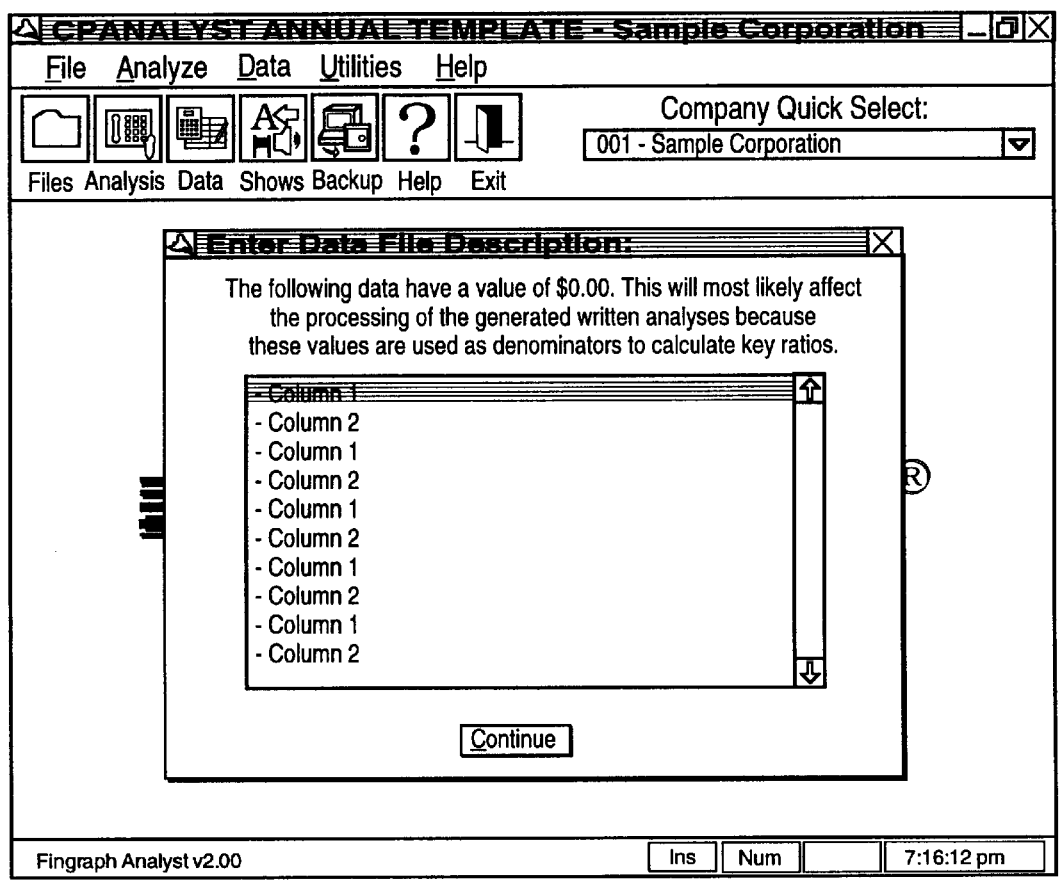
Figure 35:
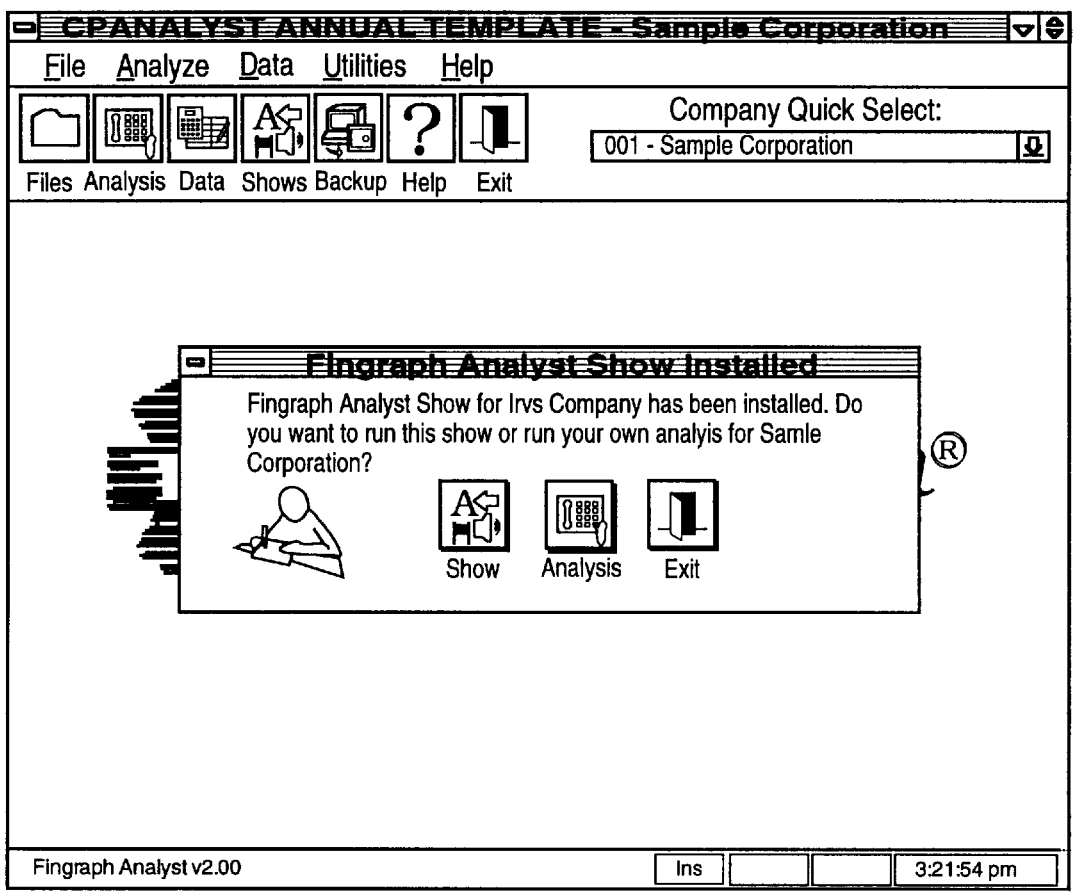
Figure 36:
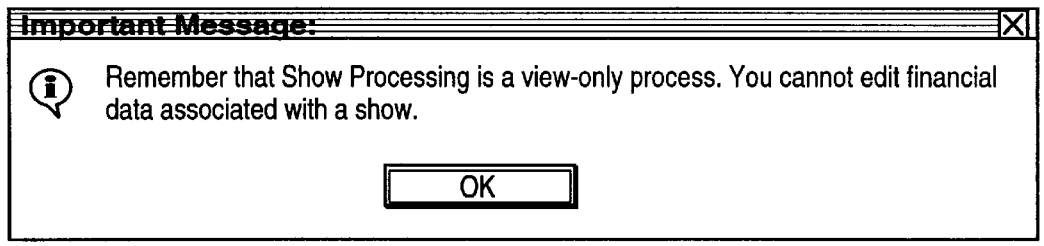
Figure 37:
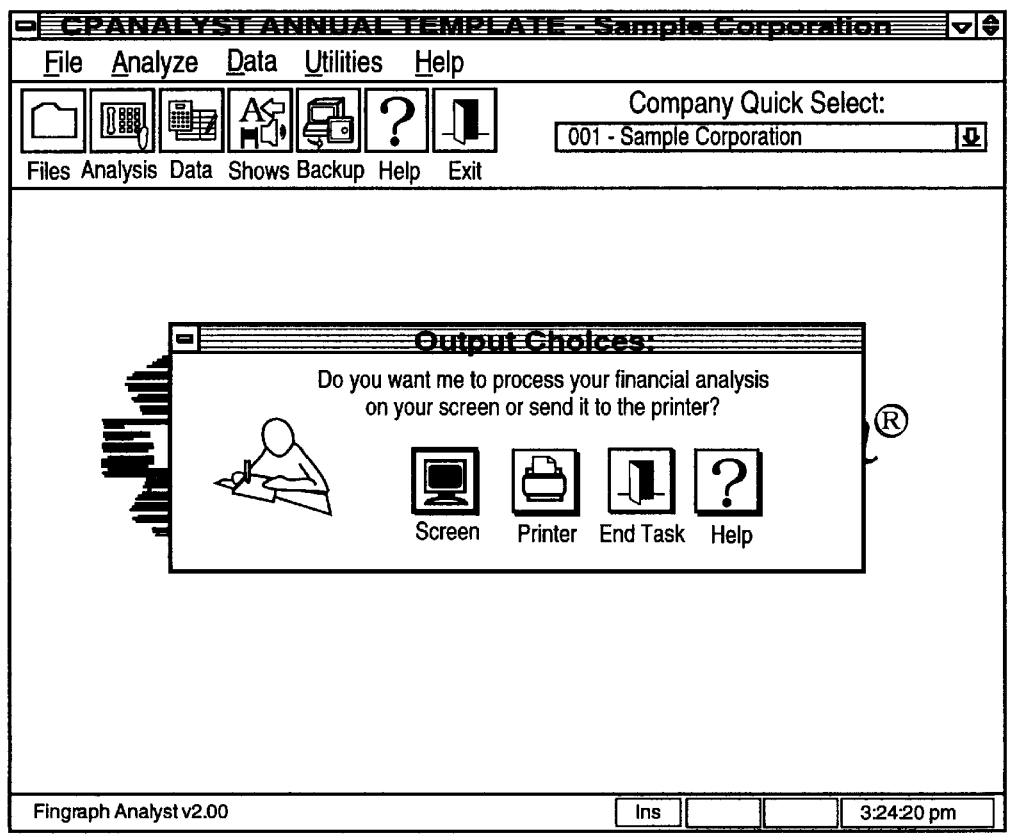
Figure 38:
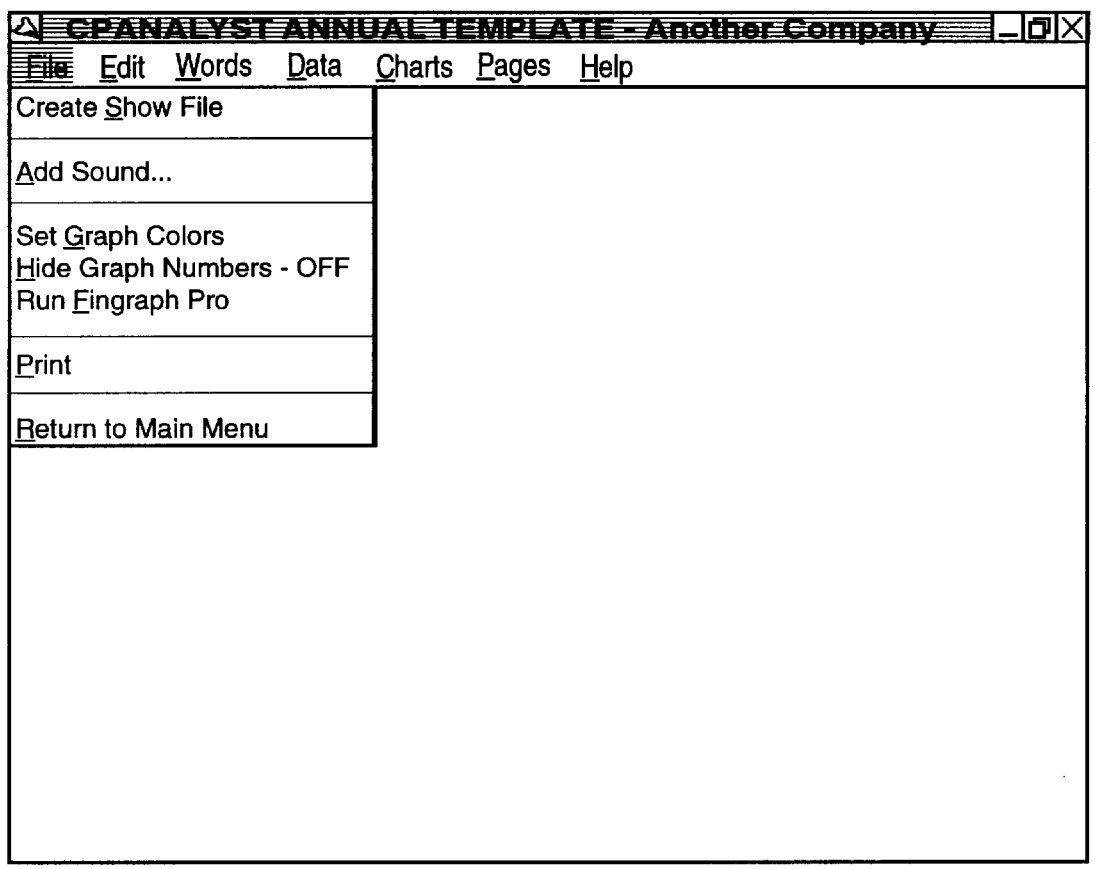
Figure 39:
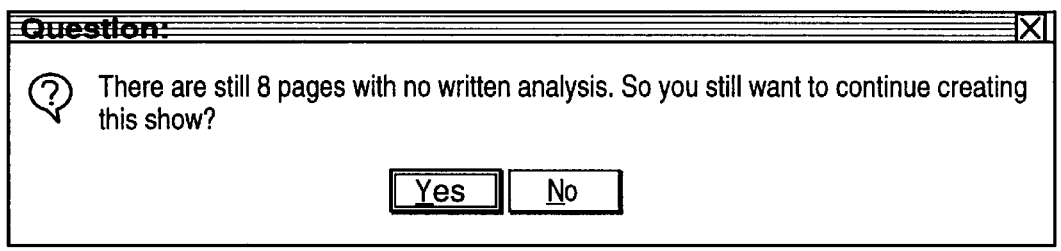
Figure 40:
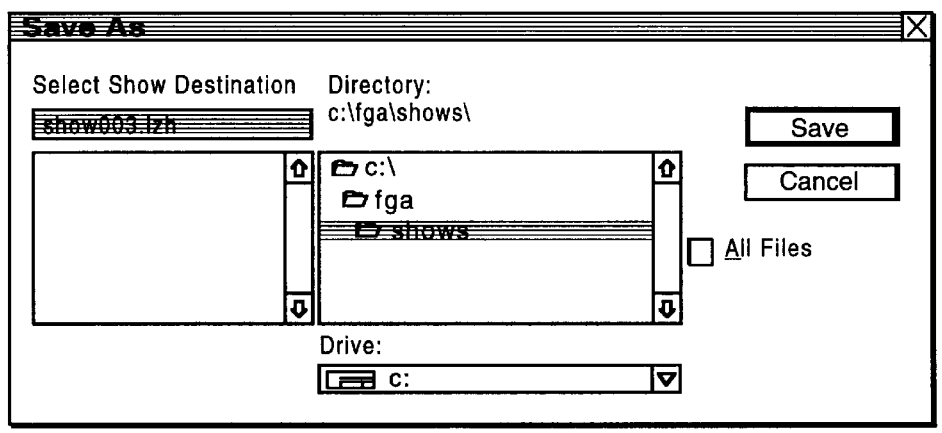
Figure 41:
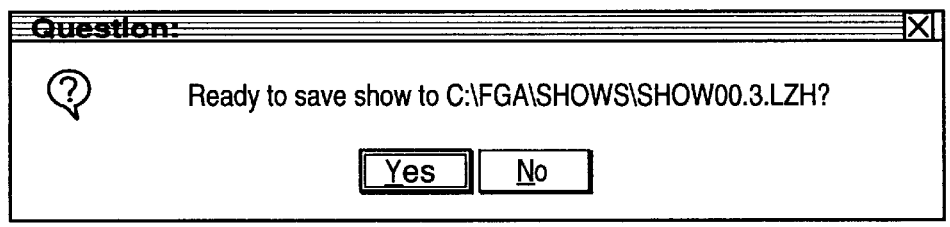
Figure 42:
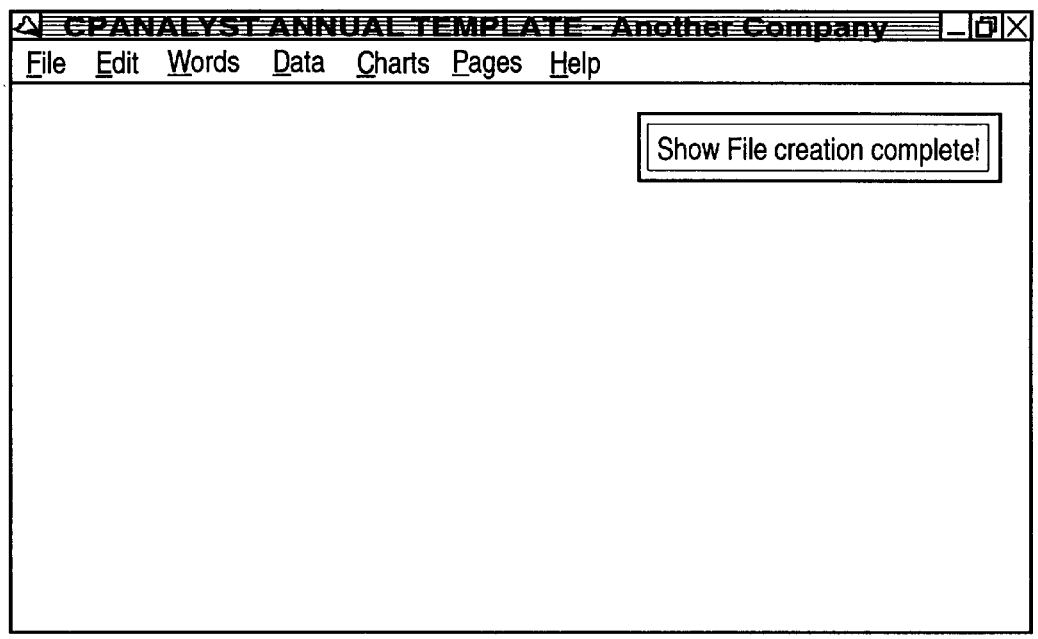
Figure 43:
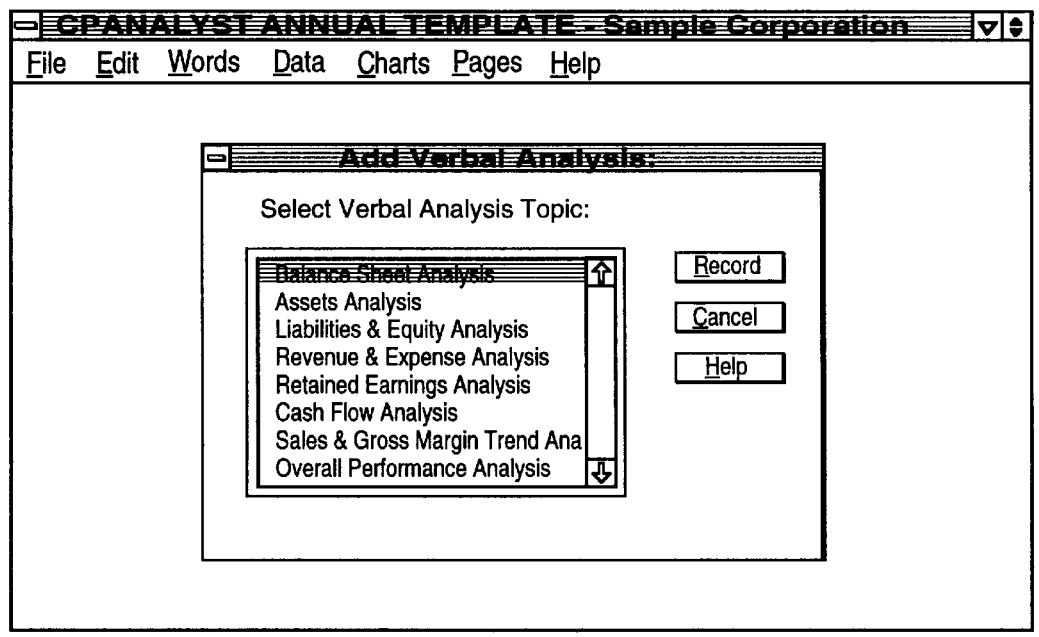
Figure 44:
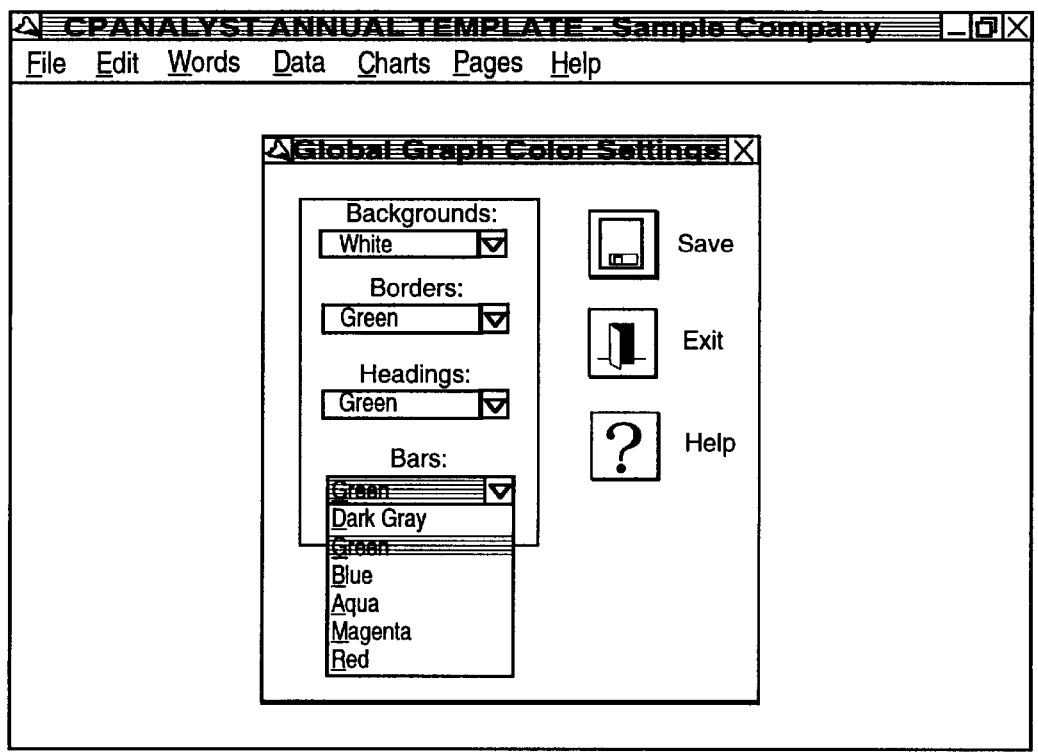
Figure 45:
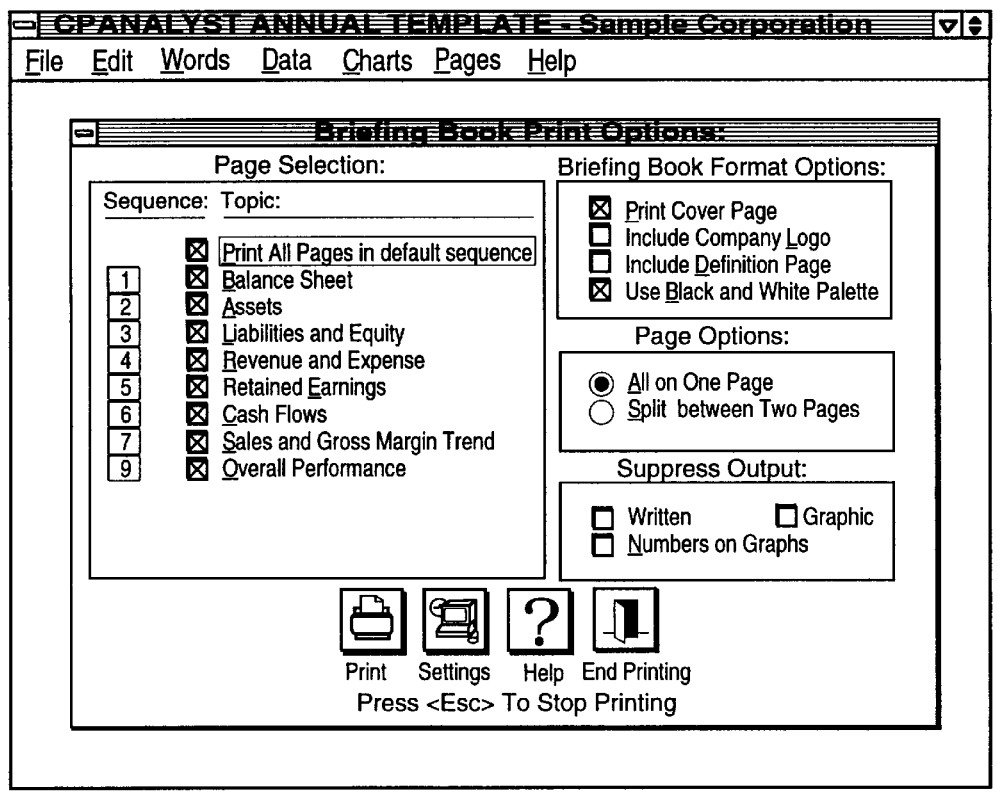
Figure 46:
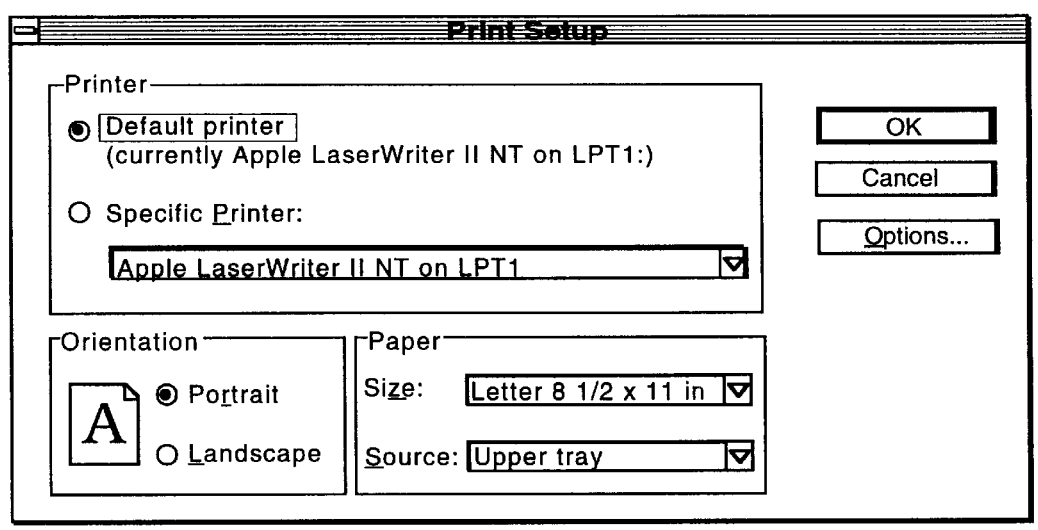
Figure 47:
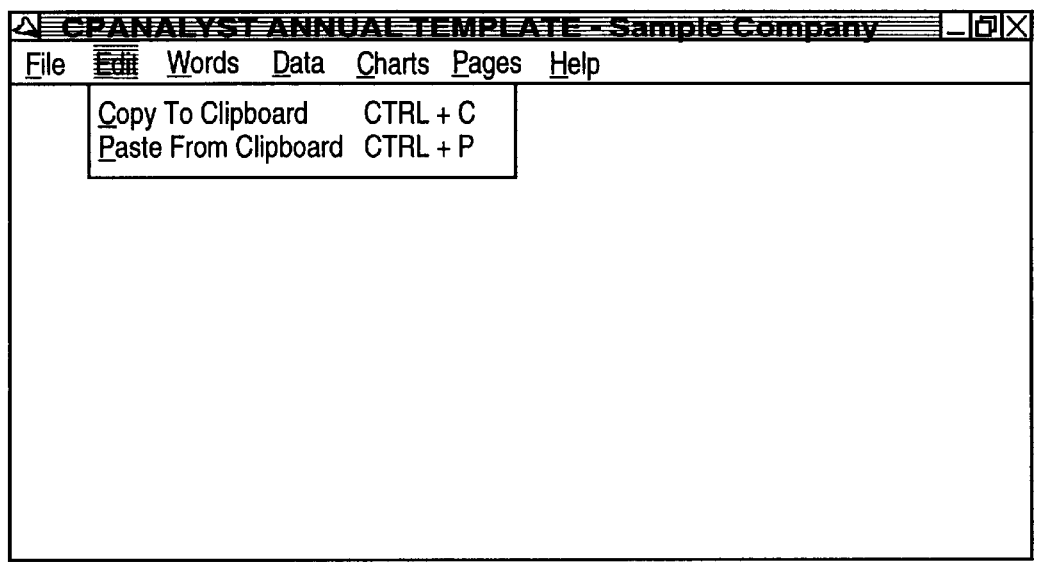
Figure 48:
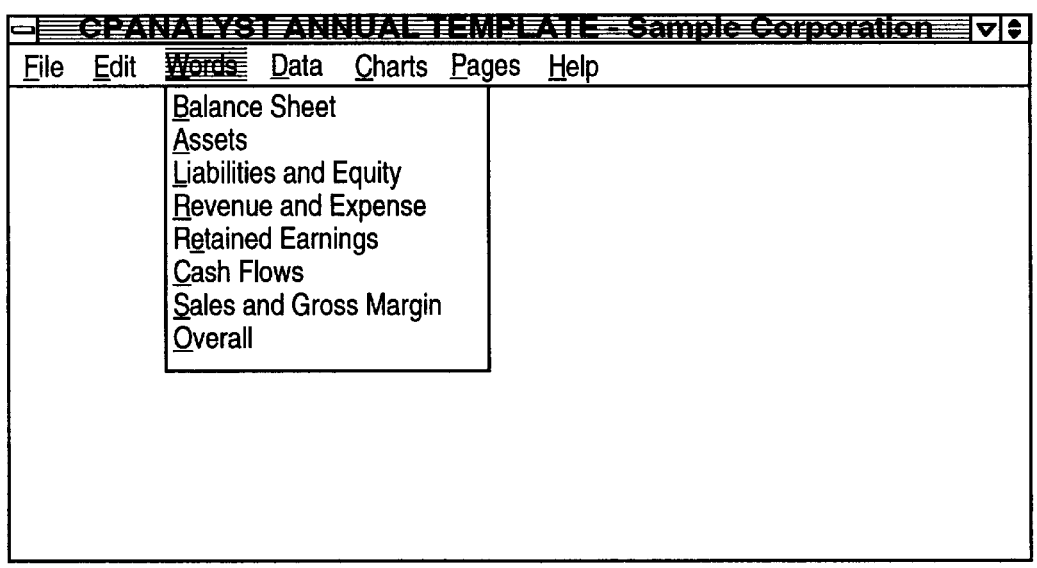
Figure 49:
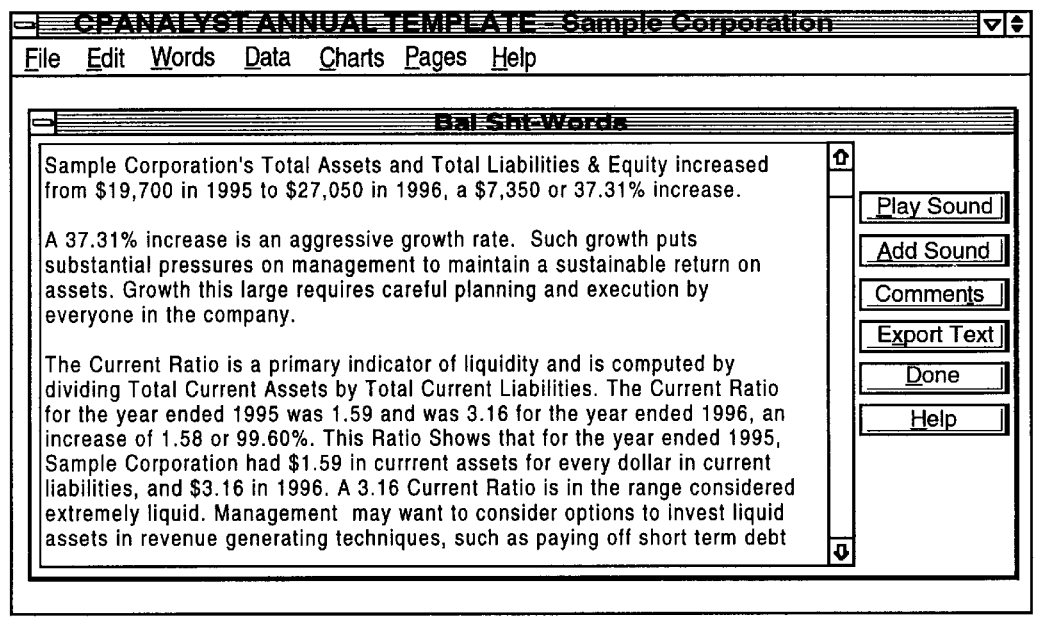
Figure 50:
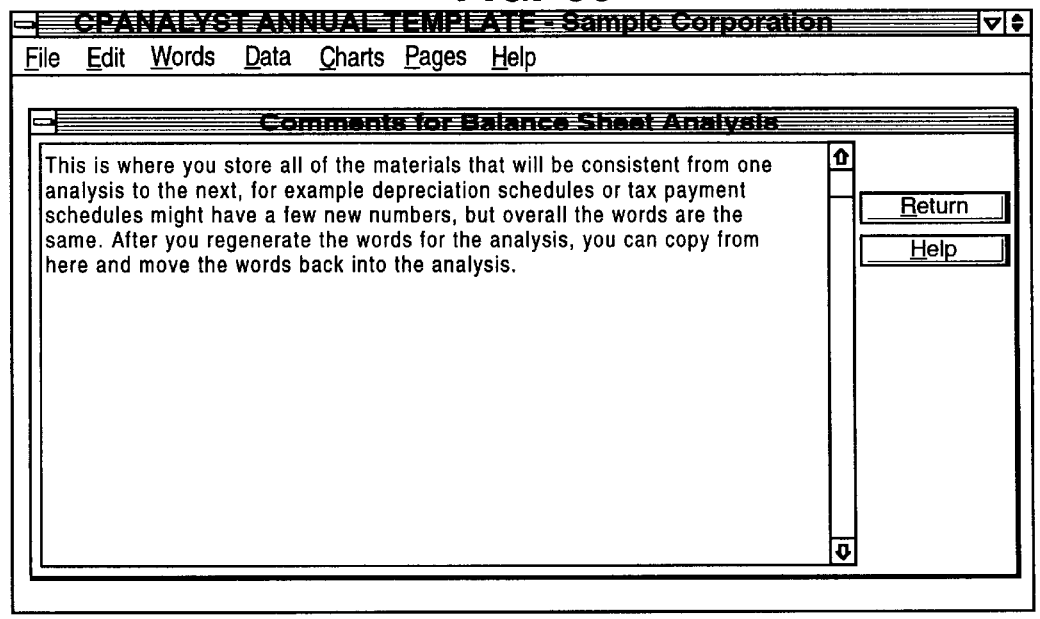
Figure 52:
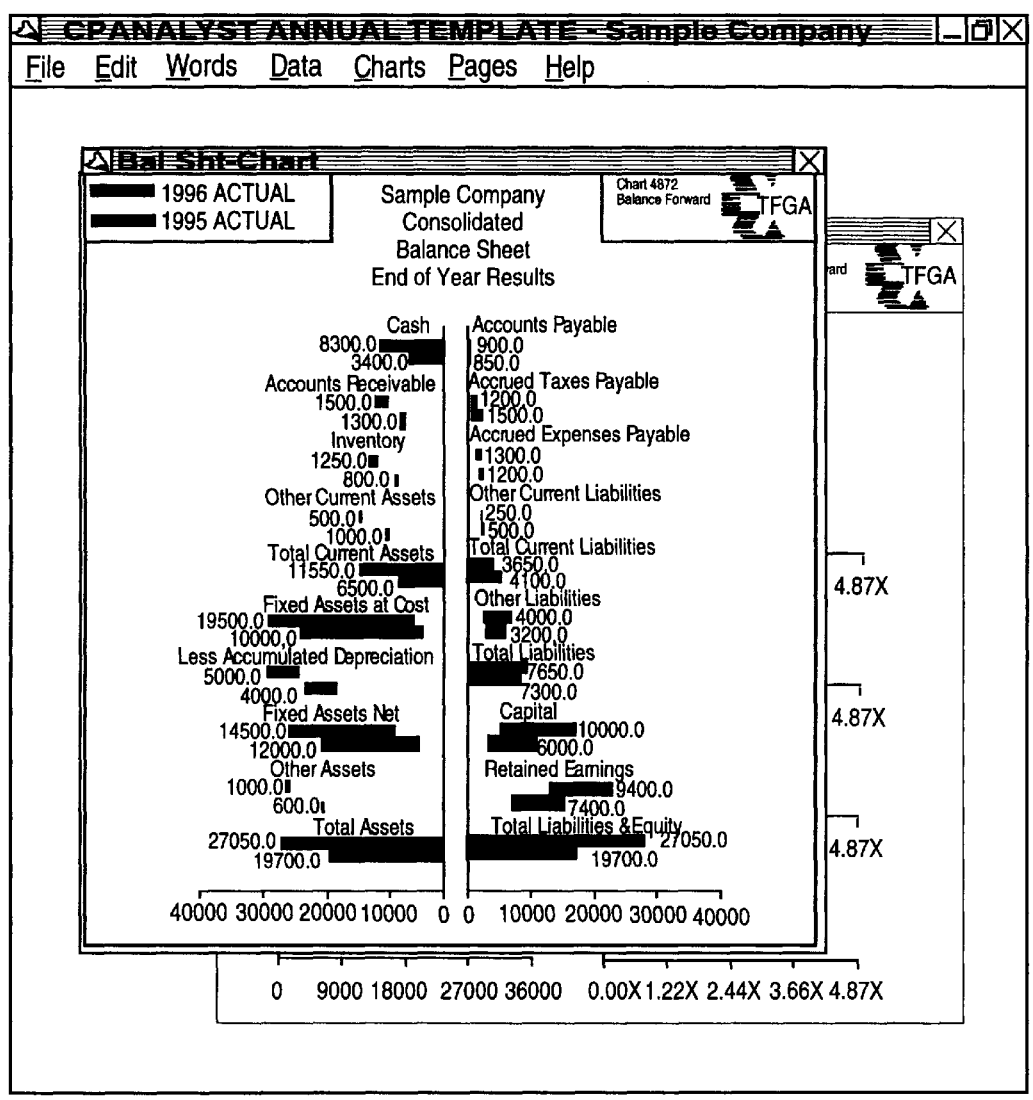
Figure 53:
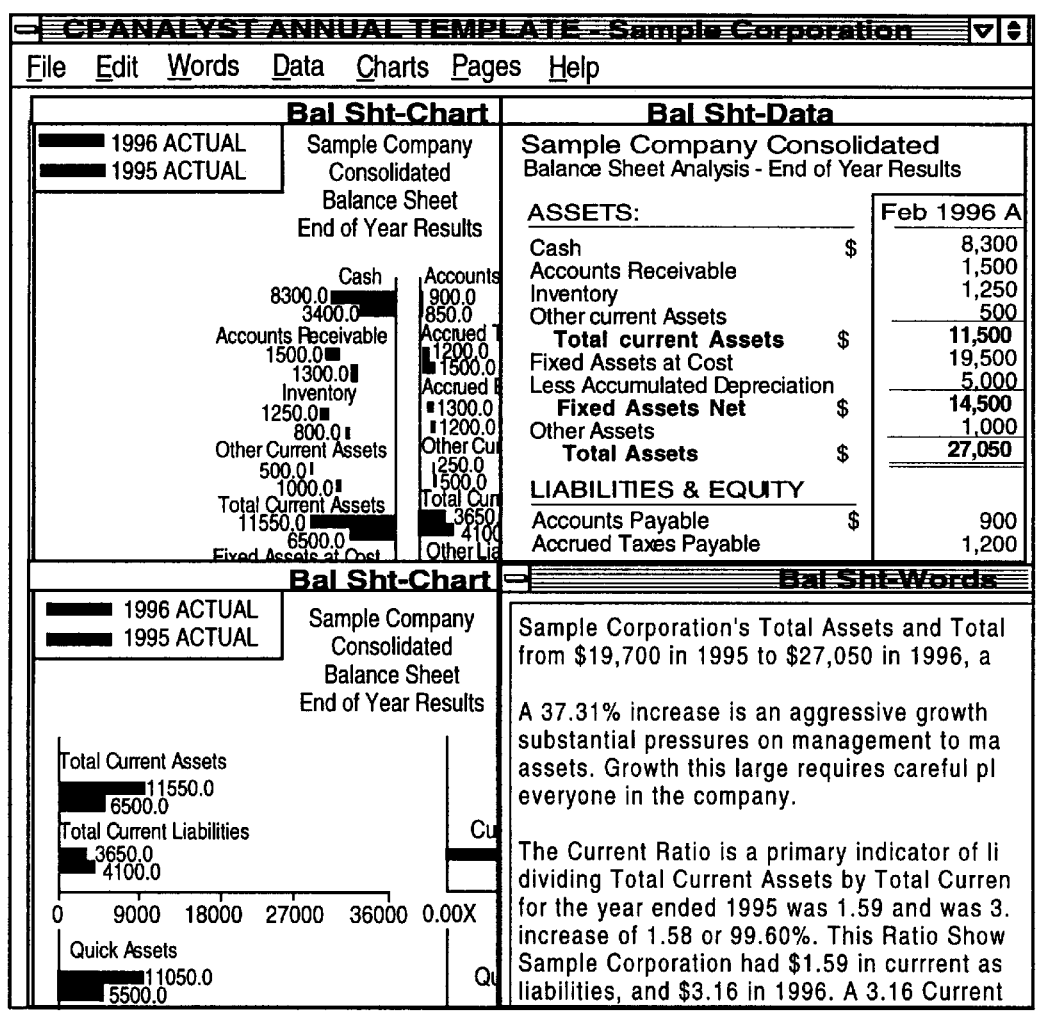
Figure 54:
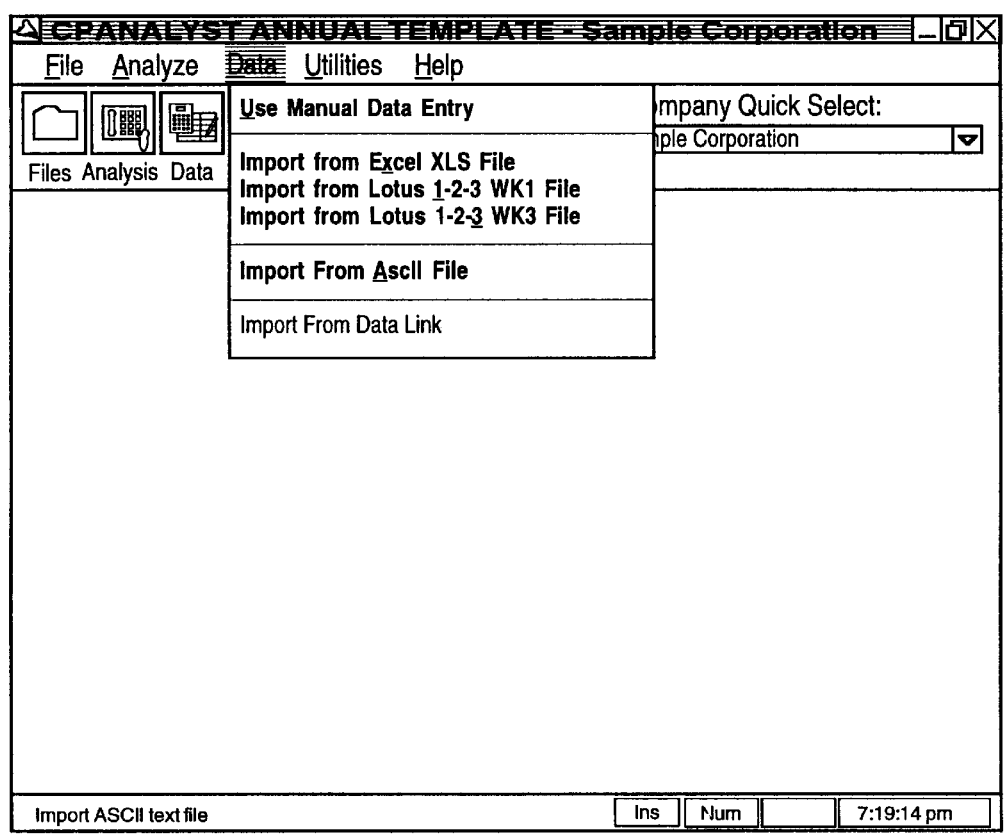
Figure 55:
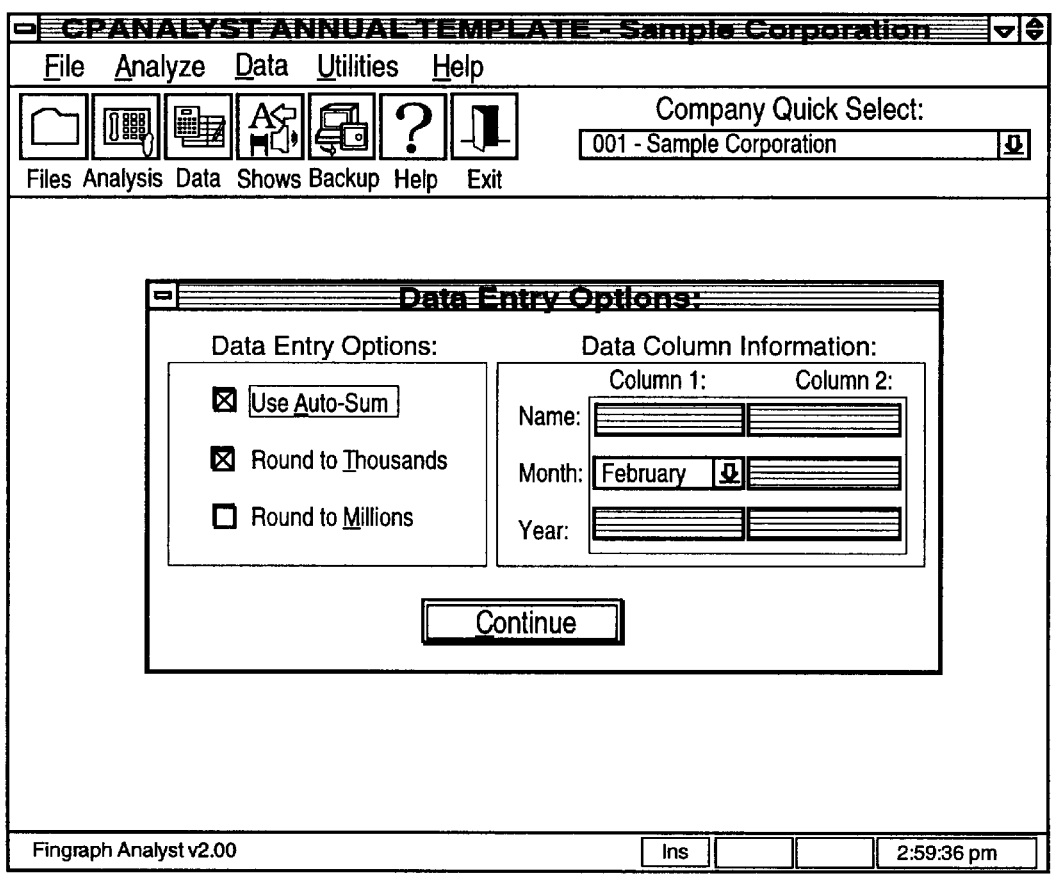
Figure 56:
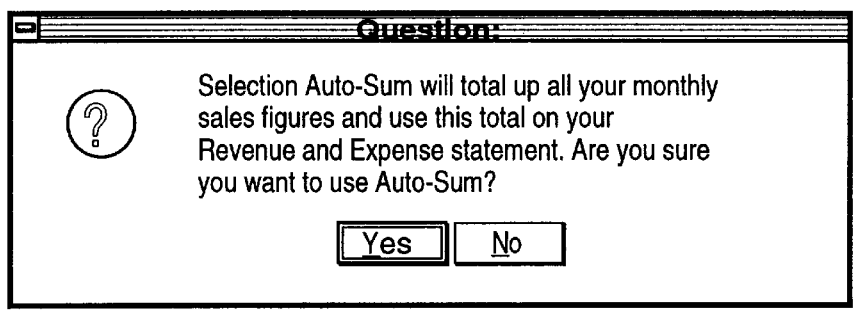
Figure 57:
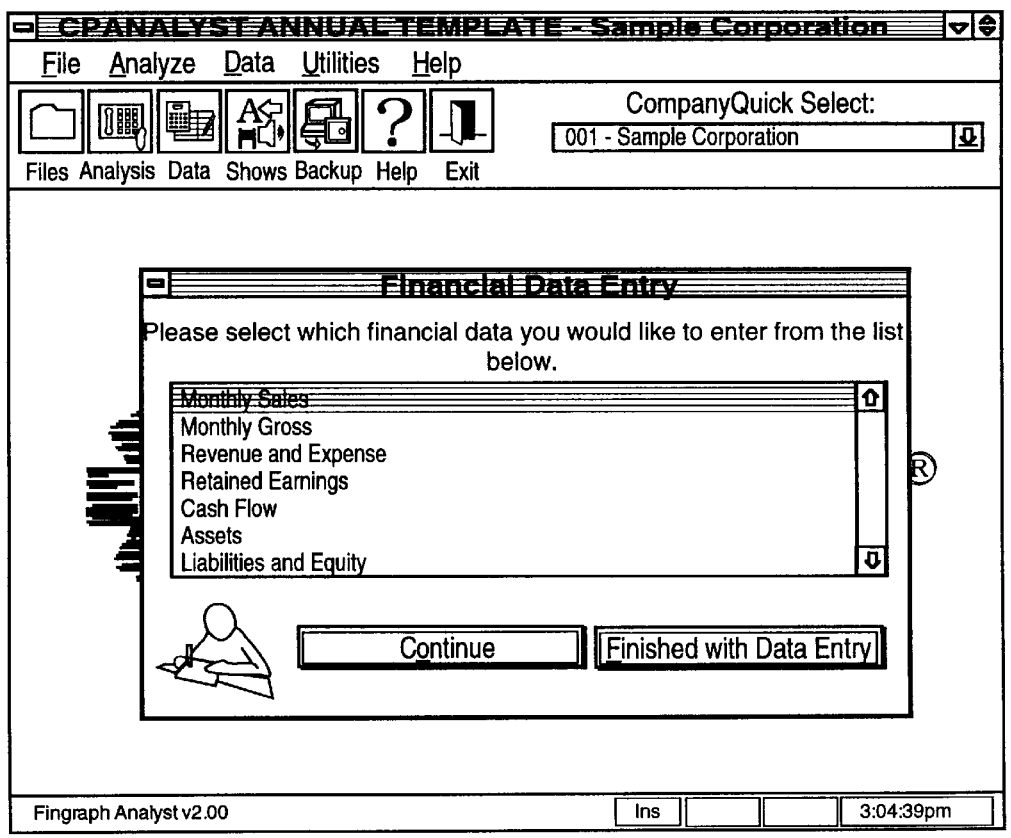
Figure 58:
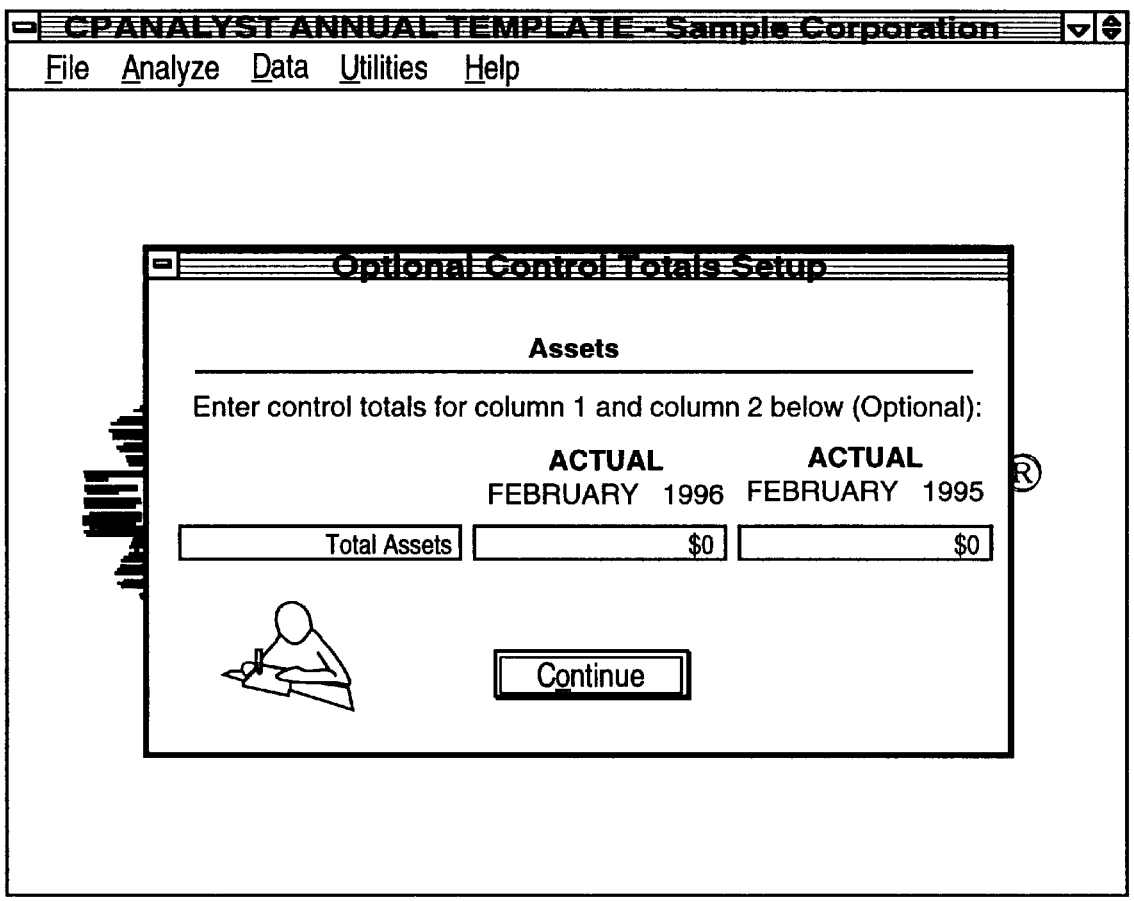
Figure 59:
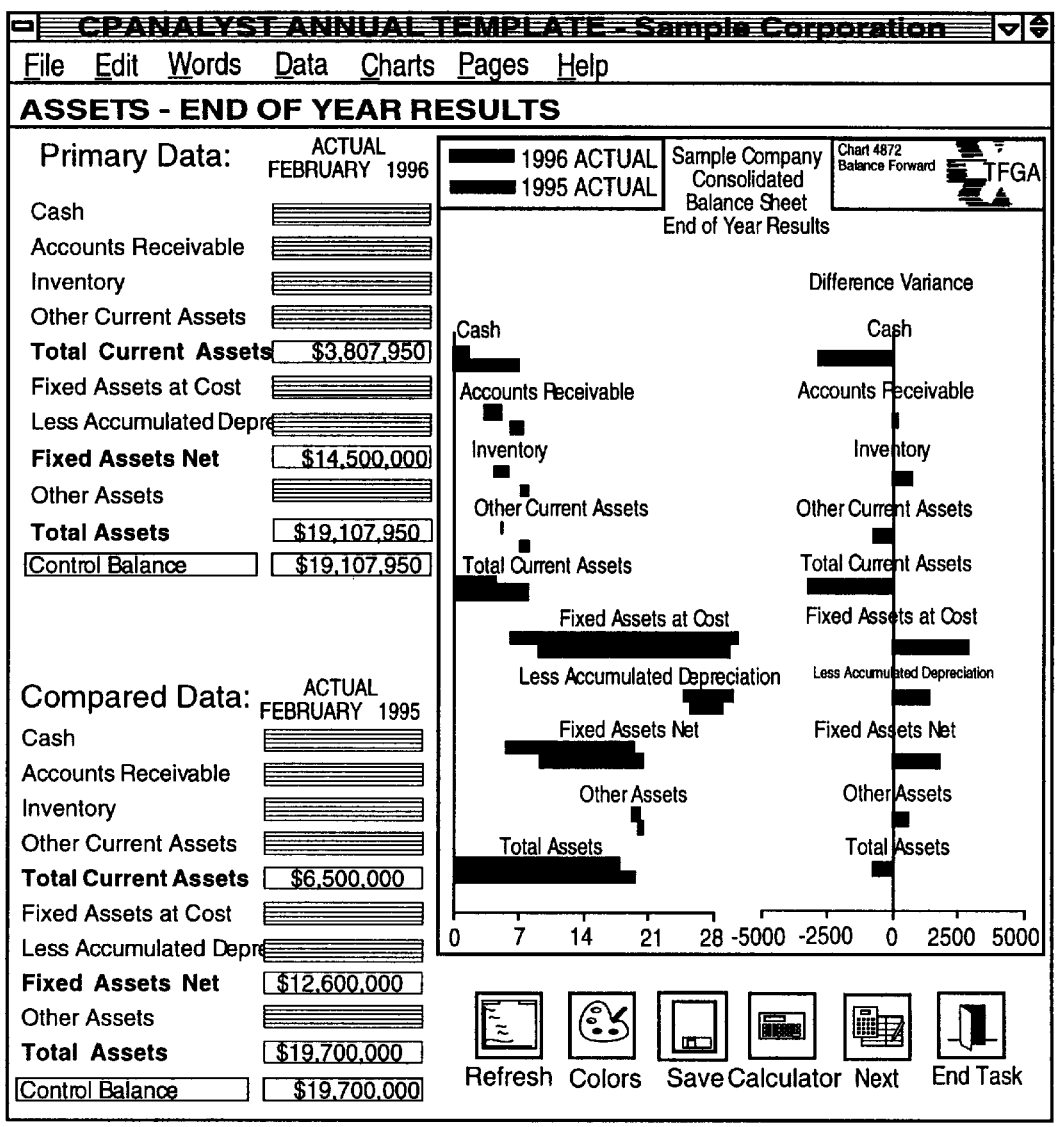
Figure 60:
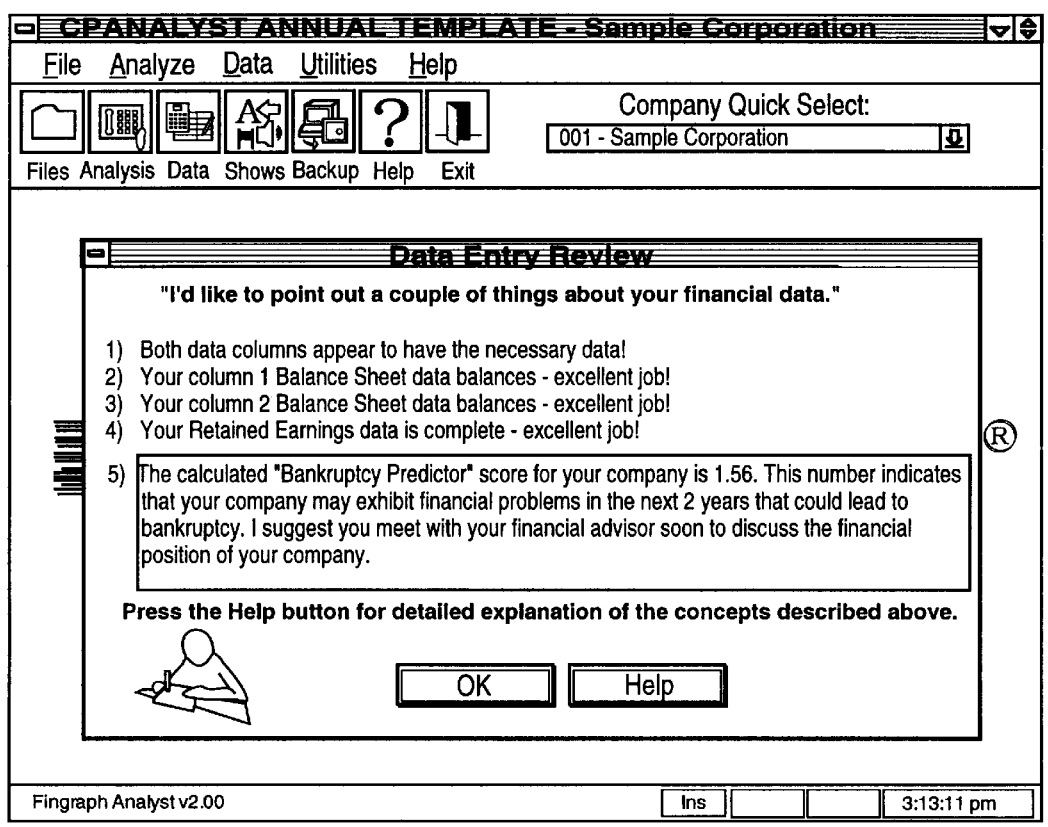
Figure 61:
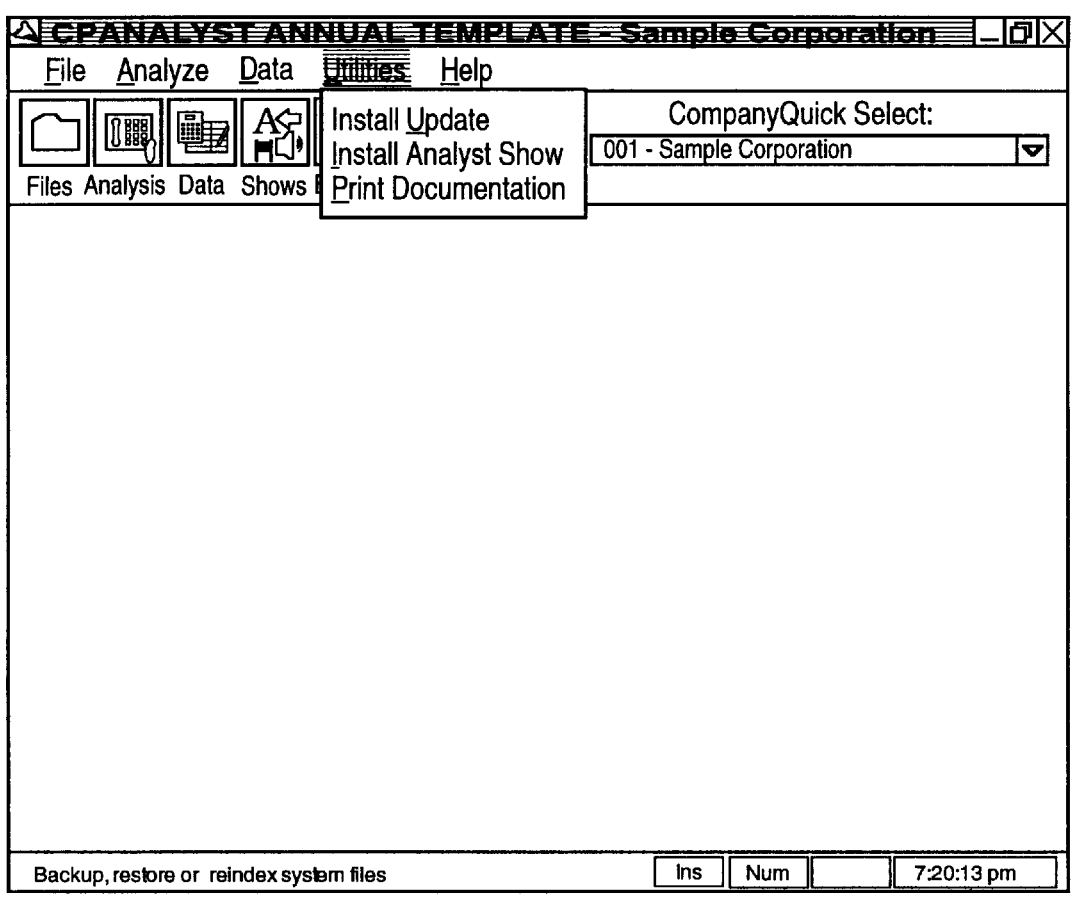
Figure 62:
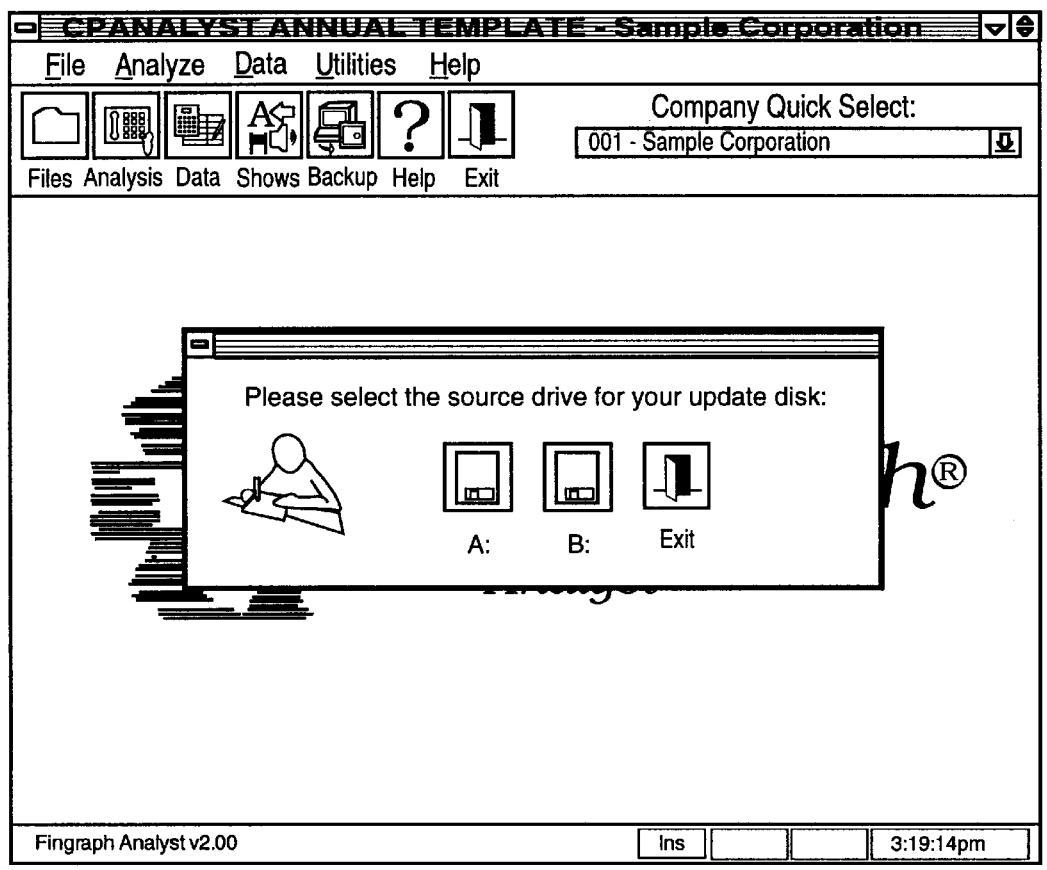
Figure 63:
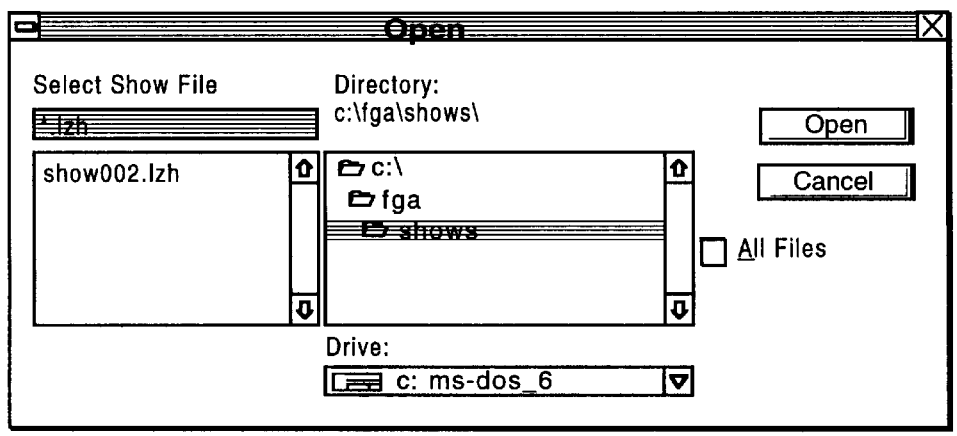
Figure 64:
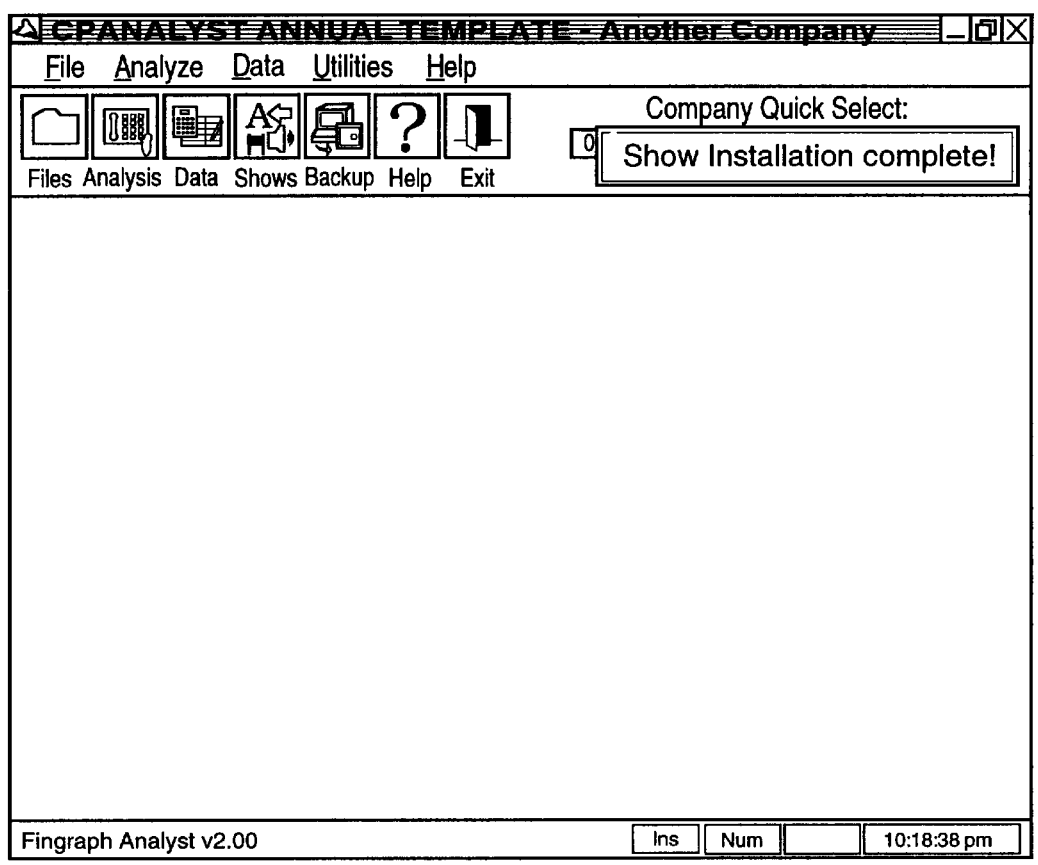
Figure 65:
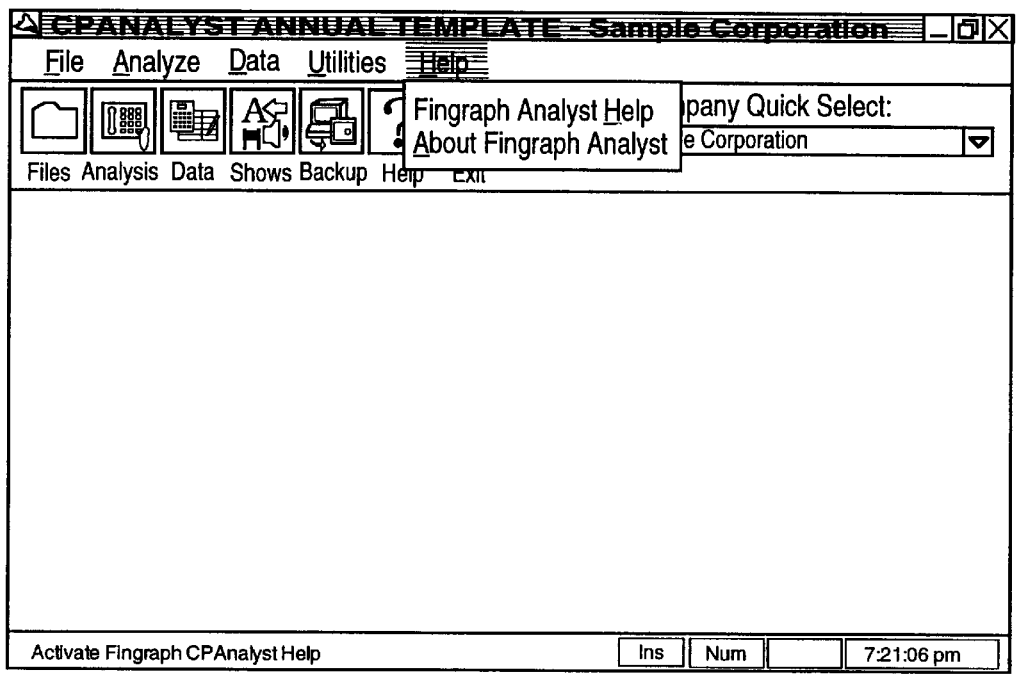
Figure 66:
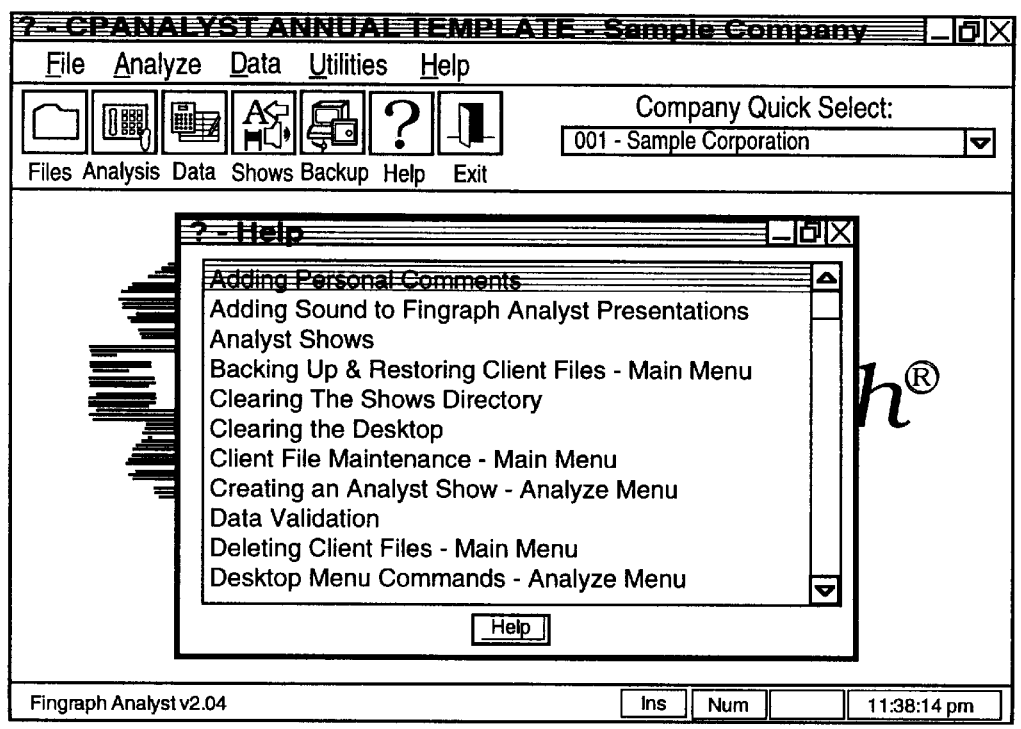
Figure 67:
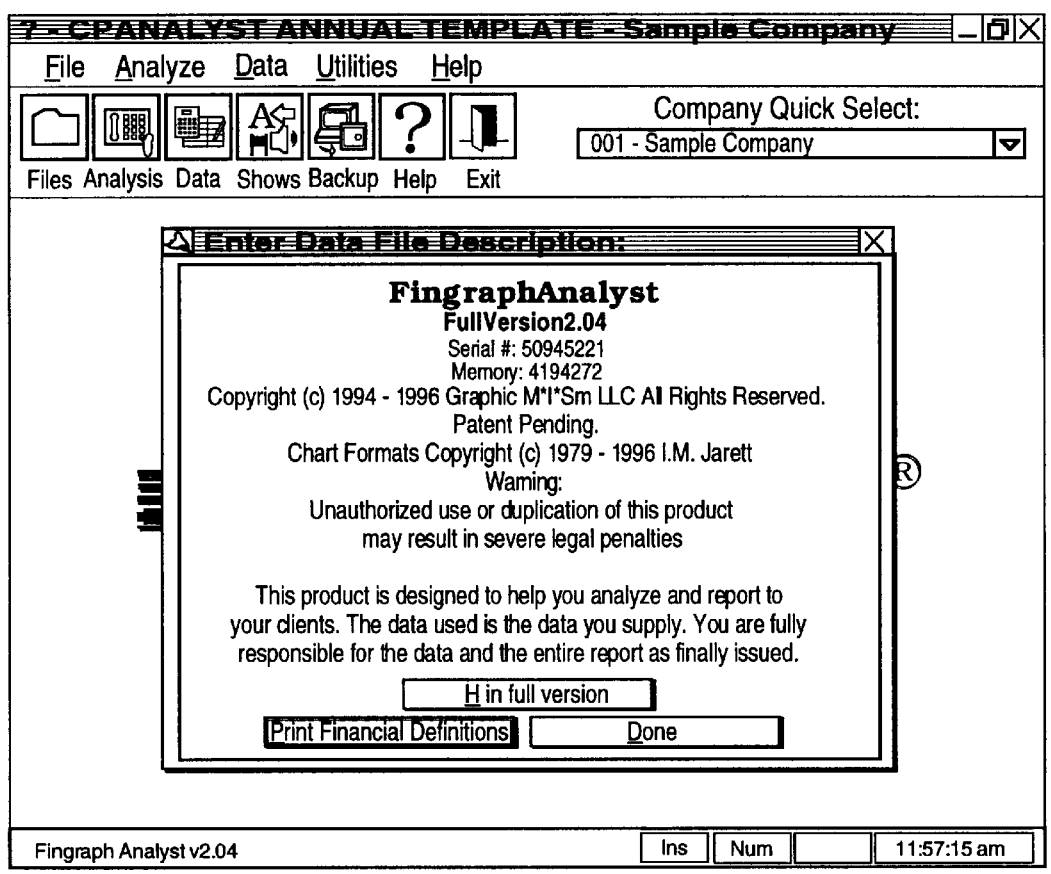
Figure 68:
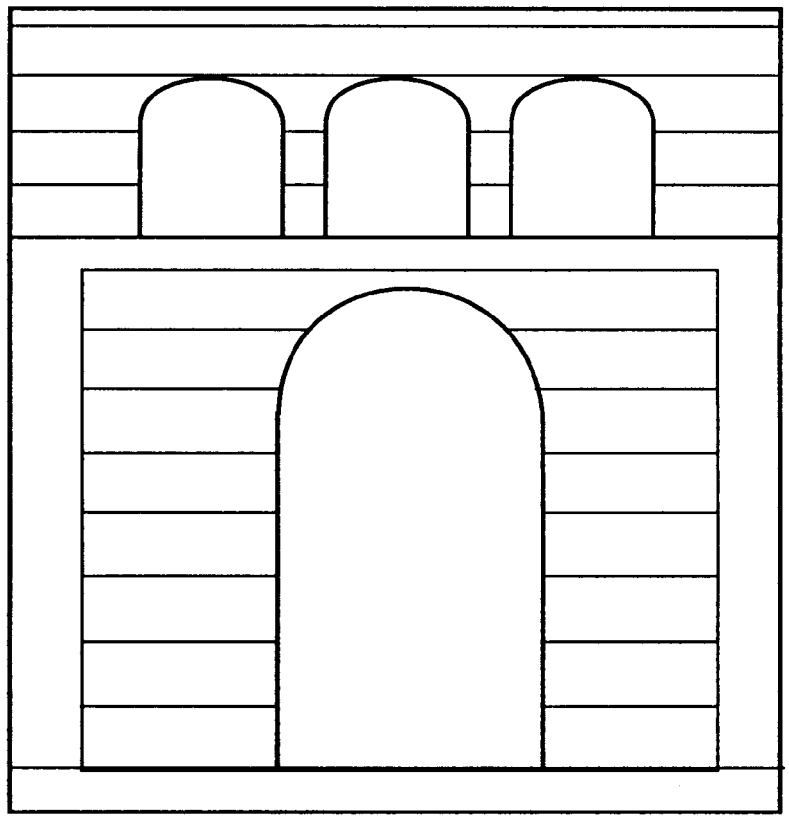
Figures 69, 69A:
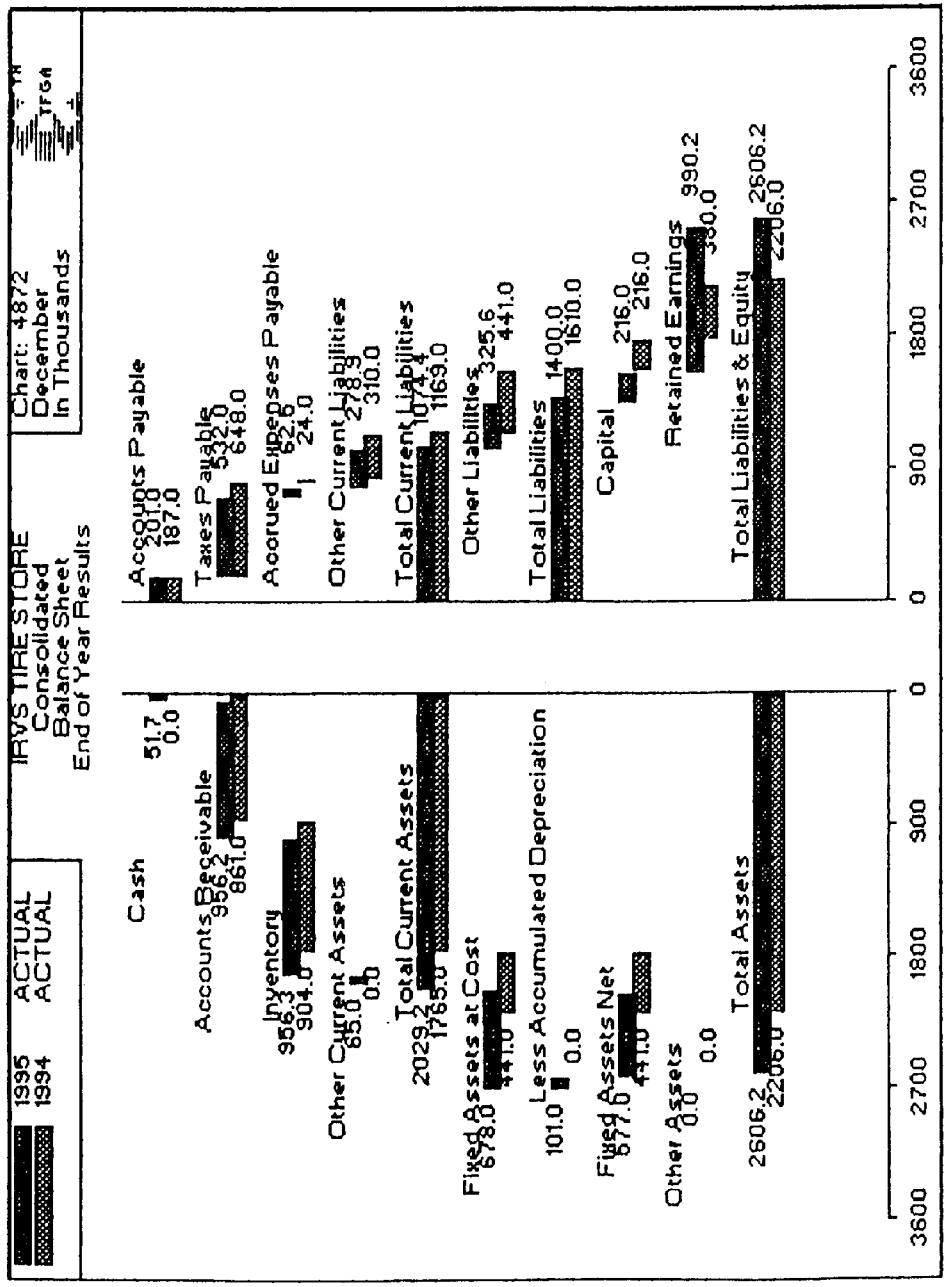
Figure 69C:
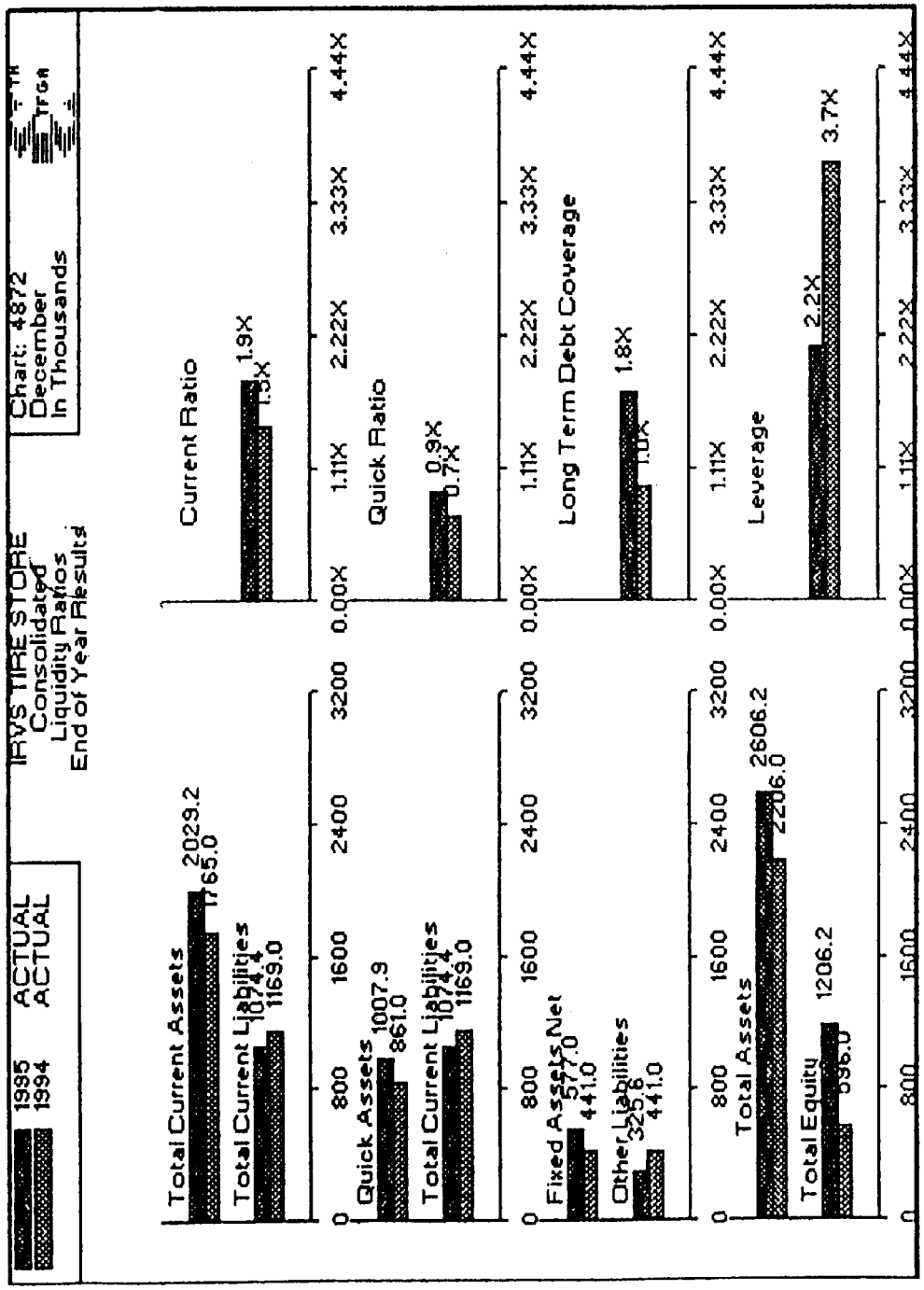
Figures 71, 71A:
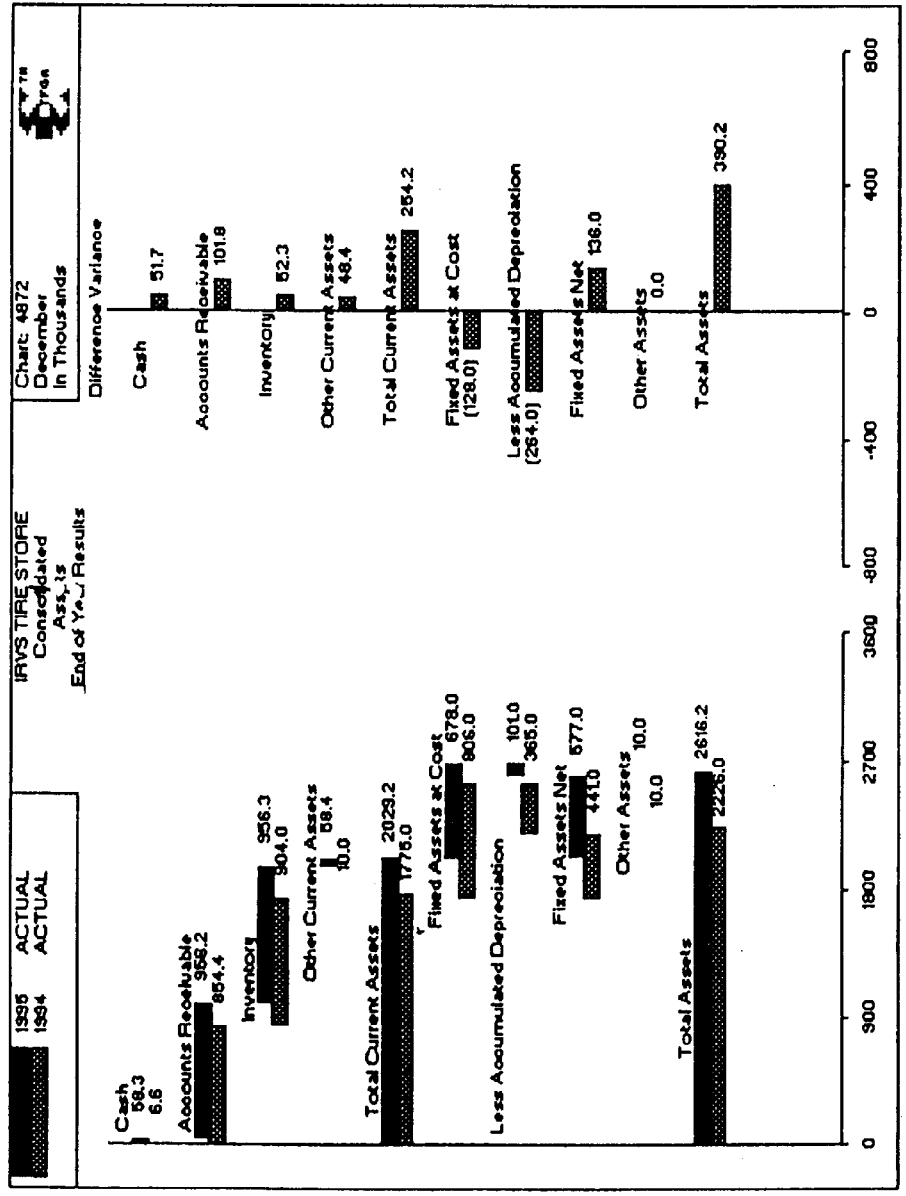
Figure 71C:
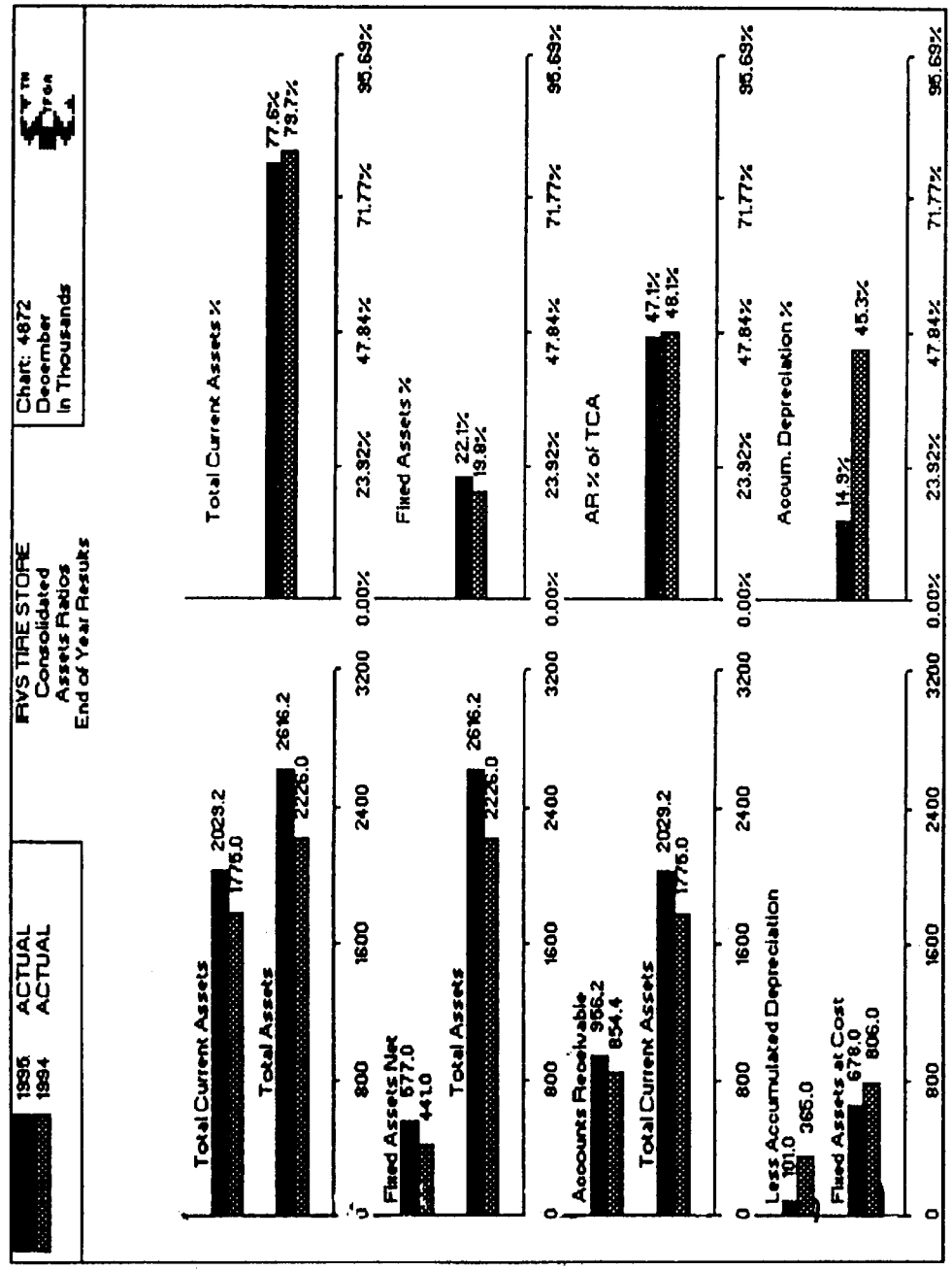
Figures 73, 73A:
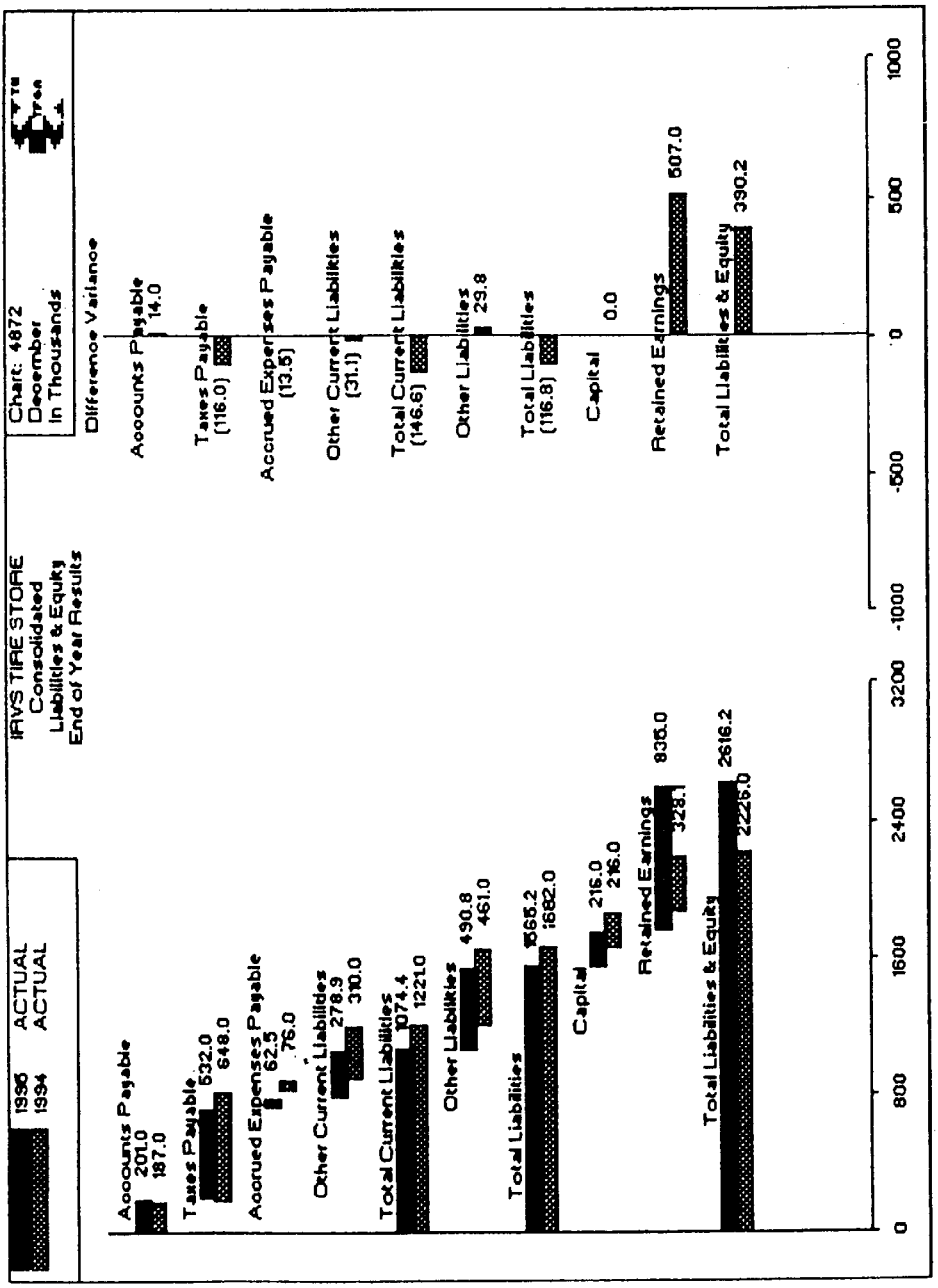
Figure 73C:
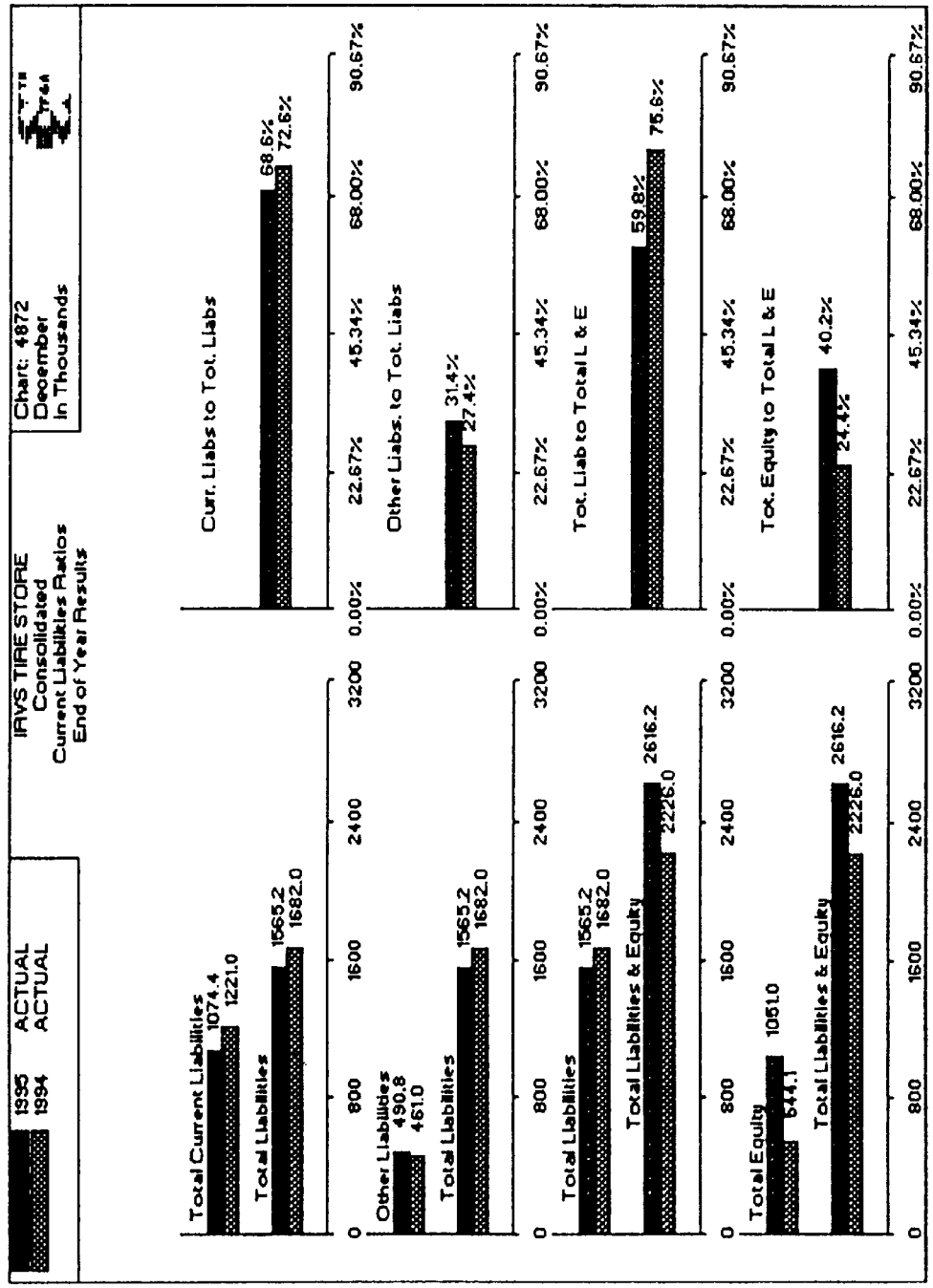
Figures 76, 76A:
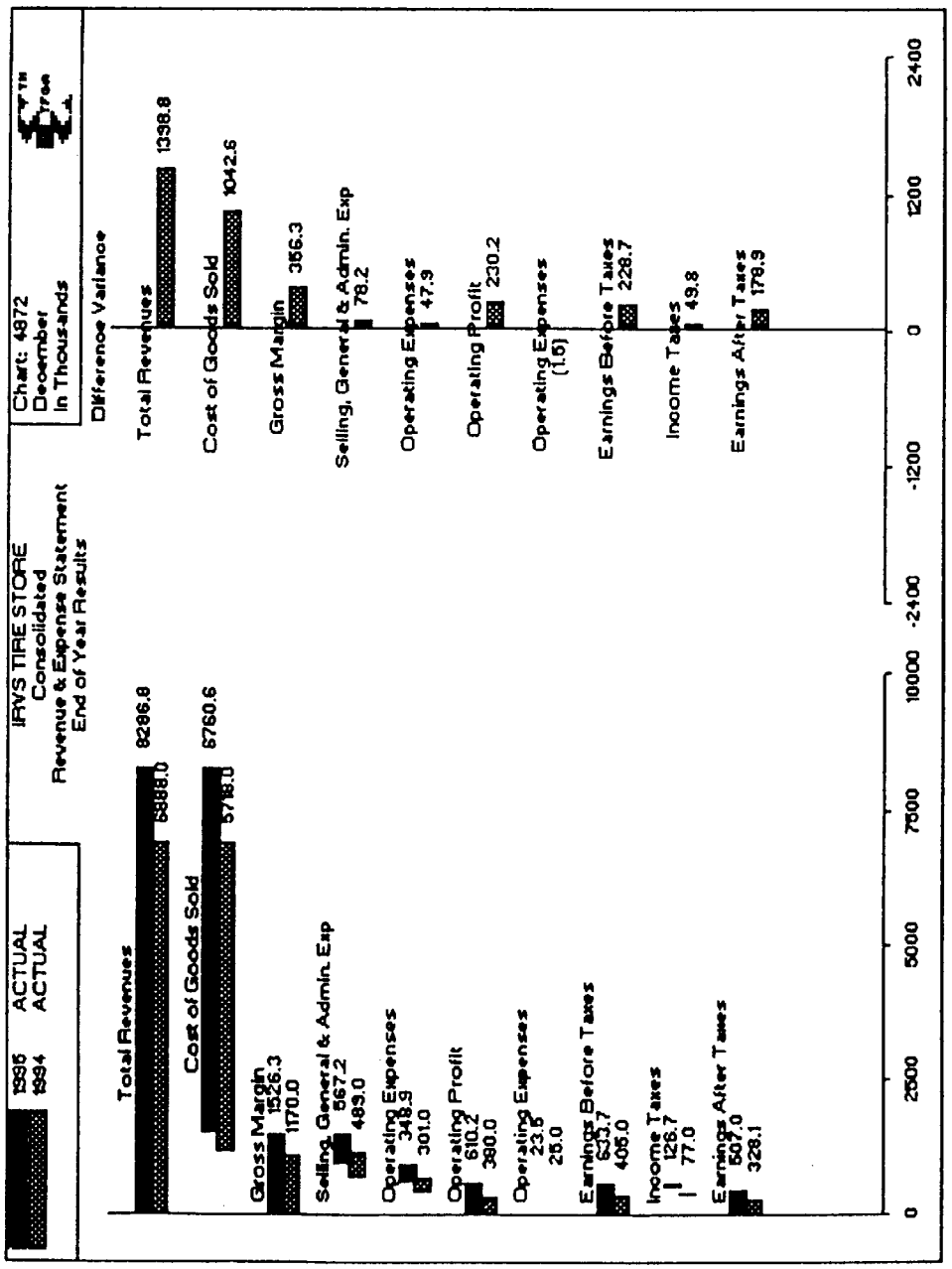
Figure 76C:
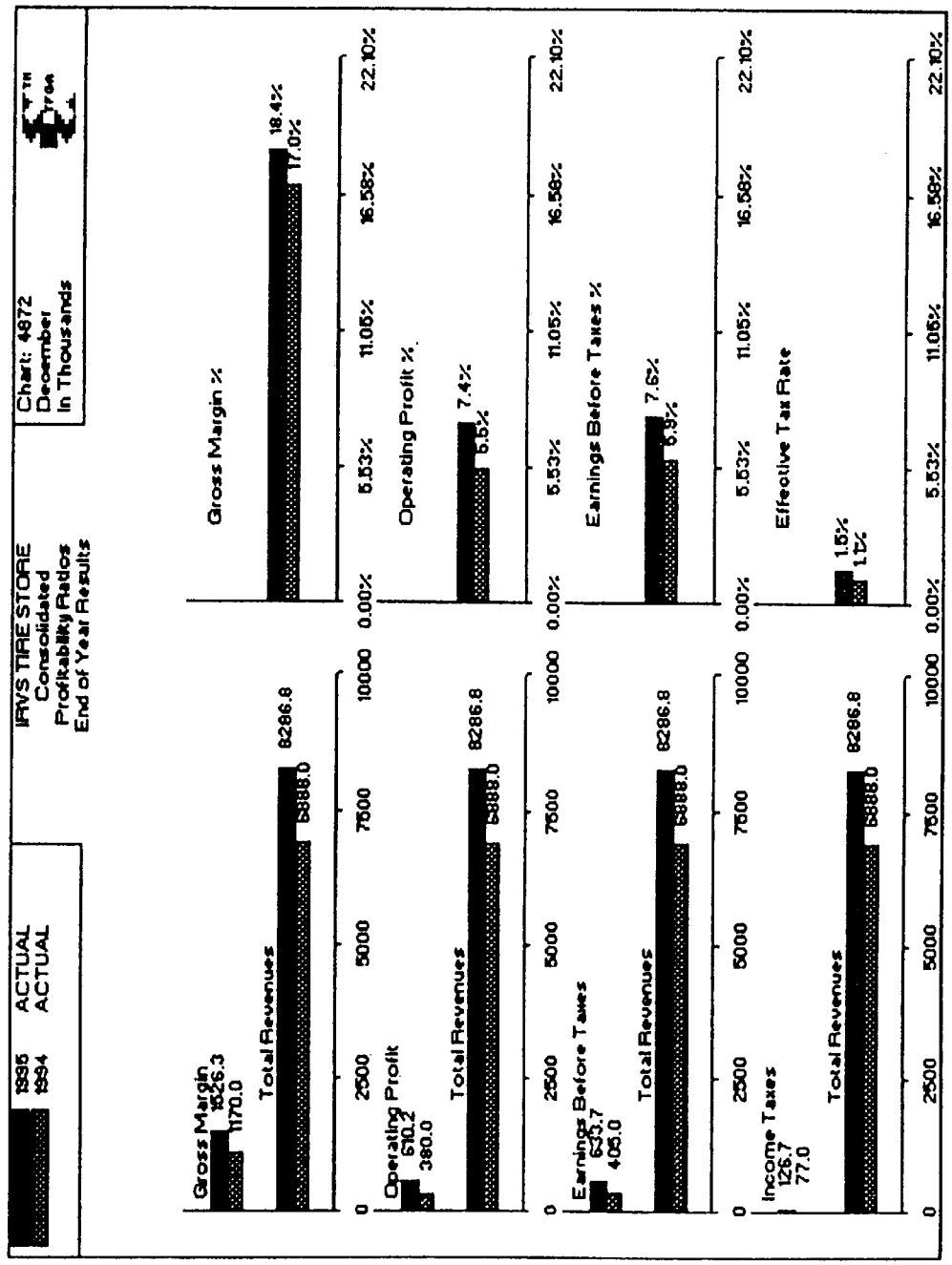
Figure 77B:
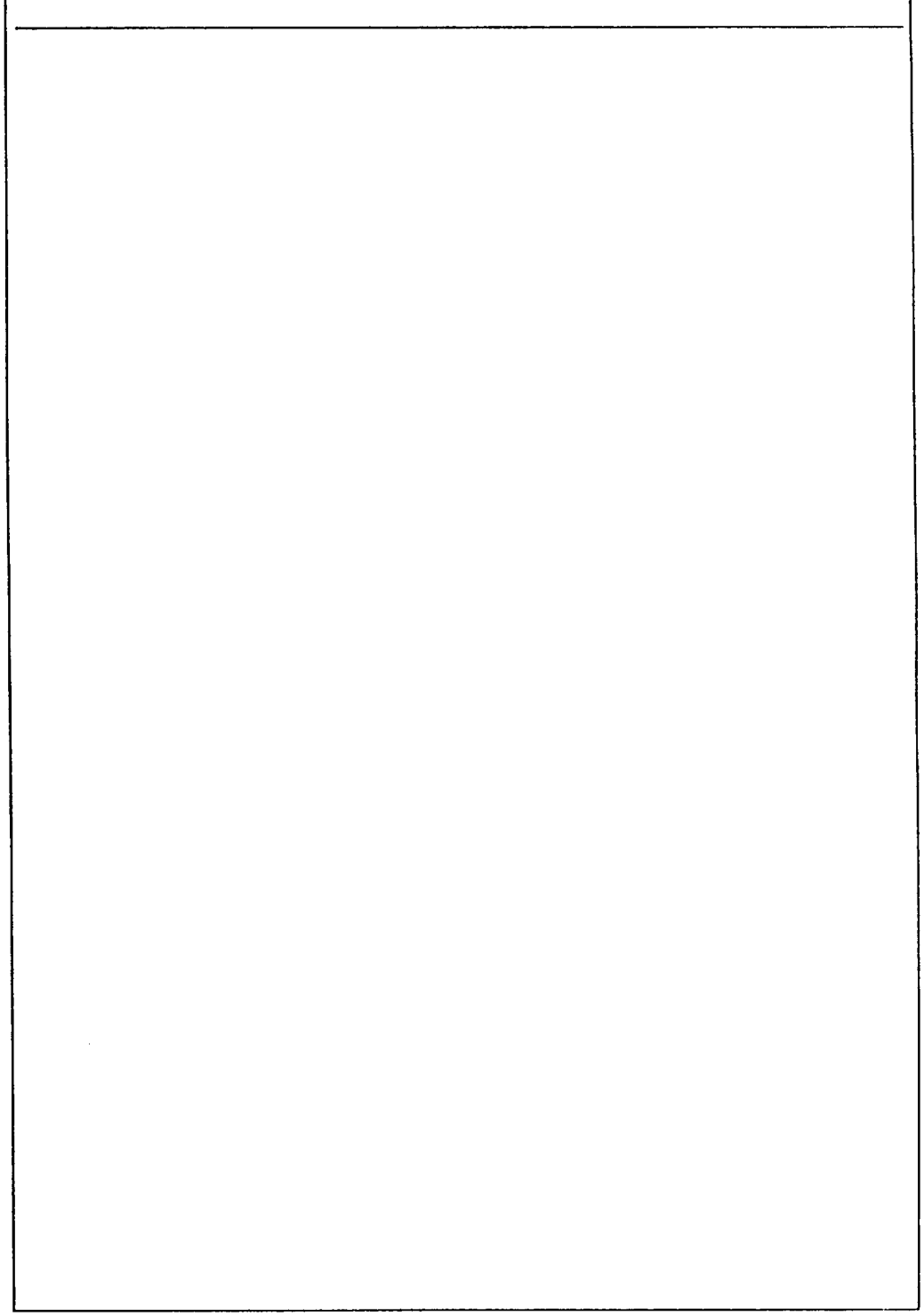

FIG. 13 is a copy of a New Case: Window Screen;
FIG. 14 is a copy of a Write Case Screen;
FIG. 15 is a copy of a Question Screen;
FIG. 16 is a copy of a CPAnalyst Test Result Screen;
FIG. 17 is a copy of a Define Variables Window Screen;
FIG. 18 is a copy of a New Expression Screen;
FIG. 19 is a copy of a Welcome Screen;
FIG. 20 is a copy of a Main Screen;
FIG. 21 is a copy of a File Window Screen;
FIG. 22 is a copy of a Select Client File Screen;
FIG. 23 is a copy of an Edit Current File Specs Screen;
FIG. 24 is a copy of an Add New Client File Screen;
FIG. 25 is a copy of an Add New Company Screen;
FIG. 26 is a copy of an Add Time Comparison to Existing Company Screen;
FIGS. 27 and 28 is a copy of a Select Time Comparison Screen;
FIG. 29 is a copy of a Delete Client File Screen;
FIG. 30 is a copy of a Backup Client Files Screen;
FIG. 31 is a copy of a Year End Roll Over Screen;
FIG. 32 is a copy of a Printer Setup Screen;
FIG. 33 is a copy of a System Setup Screen;
FIG. 34 is a copy of an Analyze—The Zero Values Found Screen;
FIG. 35 is a copy of an Analyst Show Installed Screen;
FIG. 36 is a copy of a Show Message Screen;
FIG. 37 is a copy of an Output Choices: Screen;
FIG. 38 is a copy of a Desktop File Screen;
FIG. 39 is a copy of a Question Screen;
FIG. 40 is a copy of a Select Show Destination Screen;
FIG. 41 is a copy of a Create Show Question Screen;
FIG. 42 is a copy of a Show File Created Message;
FIG. 43 is a copy of an Add Sound . . . Screen;
FIG. 44 is a copy of a Set Graph Colors Screen;
FIG. 45 is a copy of a Print Screen;
FIG. 46 is a copy of a Print Setup Screen;
FIG. 47 is a copy of an Edit Menu Screen;
FIG. 48 is a copy of a Words Menu Screen;
FIG. 49 is a copy of a Word Editing Screen for BalSht Words;
FIG. 50 is a copy of a Comments Button Screen;
FIG. 51 is a copy of a Data Screen;
FIG. 52 is a copy of a Charts Screen;
FIG. 53 is a copy of a Pages Screen;
FIG. 54 is a copy of a The Data Input Menu Screen;
FIG. 55 is a copy of a Data Entry Options: Screen;
FIG. 56 is a copy of a Autosum Question Screen;
FIG. 57 is a copy of a Financial Data Entry—Data Selection Screen;
FIG. 58 is a copy of an Optional Control Totals Screen;
FIG. 59 is a copy of a Manual Data Entry Screen;
FIG. 60 is a copy of a Data Entry Review Screen;
FIG. 61 is a copy of a The Utilities Menu Screen;
FIG. 62 is a copy of a Install Update Screen;
FIGS. 63 and 64 is a copy of an Install Analyst Show Screen;
FIG. 65 is a copy of a The Help Menu Screen;
FIG. 66 is a copy of an Analyst Help Screen;
FIG. 67 is a copy of an About Analyst Screen;
FIG. 68 is a representative configuration of an book, including pages shown in the remainder of the drawings, in accordance with the present invention;
FIG. 69A is a representation of a second portion of a page;
FIG. 69B is a representation of a first portion of a page;
FIG. 69C is a representation of a fourth portion of a page;
FIG. 69D is a representation of a third portion of a page;
FIG. 70A is a representation of a portion of a balance sheet;
FIG. 70B is a representation of a portion of a balance sheet;
FIG. 71A is a representation of a second portion of a second page;
FIG. 71B is a representation of a first portion of a second page;
FIG. 71C is a representation of a fourth portion of a second page;
FIG. 71D is a representation of a third portion of a second page;
FIG. 72A is a representation of a portion of an assets analysis;
FIG. 72B is a representation of a portion of an assets analysis;
FIG. 73A is a representation of a second portion of a third page;
FIG. 73B is a representation of a first portion of a third page;
FIG. 73C is a representation of a fourth portion of a third page;
FIG. 73D is a representation of a third portion of a third page;
FIG. 74A is a representation of a portion of a liabilities & equity analysis;
FIG. 74B is a representation of a portion of a liabilities & equity analysis;
FIG. 75A is a representation of a portion of a liabilities & equity analysis;
FIG. 75B is a representation of a portion of a liabilities & equity analysis;
FIG. 76A is a representation of a second portion of a fourth page;
FIG. 76B is a representation of a first portion of a fourth page;
FIG. 76C is a representation of a fourth portion of a fourth page;
FIG. 76D is a representation of a third portion of a fourth page;
FIG. 77A is a representation of a portion of a revenue & expense analysis; and
FIG. 77B is a representation of a portion of a revenue & expense analysis.

B. Code (Contained in Microfiche Appendix A)

Illustrative source code, written in FoxPro 2.6, is provided as Microfiche Appendix A.

V. DETAILED DESCRIPTION OF A PREFERRED EMBODIMENT OF THE INVENTION

A. Overview

The present invention involves an apparatus, and methods for making and using the apparatus. One aspect of the invention is directed to a method implemented by using a digital electrical information processing system to make a template for organizing subsequently input template data. The digital electrical information processing system includes a digital electrical computer having a processor. The digital electrical computer is connected to an input device (such as a keyboard or a mouse), an output device (such as a monitor or a printer), and a memory device.

The input device is operable for receiving input data and translating the input data into input digital electrical signals communicated to the processor. The processor is programmed to manipulate the input digital electrical signals to produce output digital electrical signals conveyed to the output device. The memory device is operable for storing a portion of the output digital electrical signals in a memory media.

The method includes the steps of: (A) defining, by the input device, a template for presenting the subsequently input data, the template including a page having a first portion, a second portion, and a third portion, wherein: (i) the first portion includes a set of data elements for representing the subsequently input data such that if the subsequently input data includes a time series data, then the first portion includes sets of up to twelve time series numeric data elements, and if the subsequently input data includes numeric data elements, then the first portion includes no more than four sets of numeric data elements, each of the sets including no more than ten numeric data elements, (ii) the second portion includes at least one chart with at least one plot for depicting each of the numeric data elements from the first portion of the page, and (iii) the third portion includes text characterizing at least one of the numeric data elements in the first portion; and (B) storing the template in the memory media.

In this method, the step of defining can be carried out such that the first portion is located in a top right corner of the page, the second portion is located in a top left corner of the page, and the third portion is located in a bottom right corner of the page.

With further regard to the first portion, the method can include the steps of: creating a data matrix of variables defined by rows and columns, each said column having a column heading variable, each said row intersecting a first one of the columns, a second one of the columns for primary data, the primary data being a portion of the subsequently input data, and a third column of the columns for comparative data, the comparative data being an other portion of the subsequently input data, wherein each said row includes: a name-identifier in the variable of the first column, one of the numeric data elements in the variable of the second column, and one of the numeric data elements in the variable of the third column; and linking at least two of the numeric data elements in the first portion with at least one mathematical function.

As to the second portion, the method can be carried out to include the step of illustrating each said mathematical function with a chart.

As to the third portion, the method can be carried out so that the subsequently input data includes primary data and comparative data and the text is formed by the following steps: providing, for at least one row, a first case statement for the case in which the numeric data elements in the primary data are greater than comparative data, providing a second case statement for the case in which the numeric data elements in the primary data are less than the comparative data, and providing a third case statement for the case in which the numeric data elements in the primary data equal the comparative data; inputting, at said input device, range limits within each said case; inputting, at said input device, a corresponding sentence for each of the ranges; and inputting, at said input device, at least one explanatory sentence. The text is formed by combining the explanatory sentence with other text formed by testing the subsequently input template data to select one of the case statements, the range limit, and the corresponding sentence.

As to a preferred version of the invention, there is a fourth portion of the page. The fourth portion includes at least one chart with at least one plot for depicting at least one of the numeric data elements in the first portion of any page in the template. The fourth portion can also involve the steps of: forming a result from at least one of the numeric data elements in the first portion from any said page in said template; and forming a chart including at least one plot for depicting the result. Alternatively, the fourth portion can involve the steps of: identifying a first one of the numeric data elements in the first portion from any said page in said template; identifying another data element; and linking the identified first one of the numeric data elements and the identified second one of the numeric data elements with a mathematical function; and engaging said processor to form the result by using the function.

The template produced in accordance with this process, involving the digital electrical apparatus, can include a variable for storing digitalized voice data as a portion of the subsequently input data. Such a template can be stored on memory media or be made available on line or over the World Wide Web.

While one approach is to make the template with or as part of a hardcoded program which accesses graphics computer instructions to form the plots, other approaches are more flexible or are better suited to available computing environments.

One such approach is to use a template builder program. The template builder includes a set of computer instructions for constructing a template. The template includes a data file and a second set of computer instructions for subsequently programming the processor under the control of a viewer program.

The viewer program includes a third set of computer instructions for later programming the processor to communicate the subsequently input template data into the data file and then to construct output organized in accordance with the template. The output includes a show program.

The show program including a fourth set of computer instructions for programming the processor to display the output.

Still another approach is to program the processor by a plurality of objects which accesses graphics computer instructions to form the plots, each of the objects being code.

Still another approach is to program the processor by a plurality of applets which accesses graphics computer instructions to form the plots, each of the applets being code.

In any case, once a template is constructed using the digital electrical information processing system, this apparatus is used to activate a template to produce a presentation of input template data. In this case, the processor can be programmed by a viewer program to manipulate the input digital electrical signals to produce output digital electrical signals conveyed to the output device, and to the memory device operable to electrically communicate with a memory media.

Using the viewer program includes the steps of: (A) calling up the template from the memory media, the template including a page having the first portion, a second portion, and a third portion, and preferably the fourth portion (B) receiving at the processor the input template data, the input template data in the form of digital electrical signals representing raw numeric data; and (C) organizing, by the processor, the input data into the portions of the template to fill the empty charts (i.e., charts not completely filled with data) and the empty plots (i.e., plots not completely not filled with data) to show respective representations of the input data, and to fill the space with the text representing the input data, the portions being assembled to form a "presentation." A presentation can be formed as a bit map, which can be printed at the printer output device or stored in a memory media.

The presentation can be a show program stored in the memory media. The show program is a computer program for programming the processor to display the presentation at an output device such as a monitor.

Also, preferably, the first portion located in a top right corner of the page, the second portion located in a top left corner of the page, and the third portion is located in a bottom right corner of the page. This is in keeping with brain research.

Additionally, the information processing system can have a microphone electrically connected to convey digitalized voice signals to the processor, and a speaker for receiving the digitalized voice signals from the processor. With such an approach, the method includes the steps of: providing voice data to the microphone to provide the digitalized voice signals; storing the digitalized voice signals in a presentation variable; and viewing the presentation with the information processing system, including outputting the digitalized voice signals at the speaker.

With further regard to the template, and manner for loading it with data, the input device for receiving input data can be a PC-compatible keyboard. Alternatively, the input data can be obtained by the viewer program controlling the processor to read a data file formed by an other computer program. This is advantageous where the present invention is being used in combination with software packages to support consulting or accounting services.

The above-referenced combination also of the loaded template and other computer systems, such a combination approach permits the report to be inserted, by computer means, as a portion of a second report. The second report being generated by an other programming of the processor, the second programming being carried out with an other computer program to control the input device to receive other input data and to organize the other input data into an other portion of the second report.

Further, the template can be constructed so that as each of the input data fills the empty charts and the empty plots, a new chart and a new plot is displayed at the monitor output device. Additionally, the template loaded with data can be read by, or incorporated in using, an other computer program. This also is advantageous where the present invention is being used in combination with software packages to support consulting or accounting services.

Note that preferably one can do editing with the computer processor programmed to do so. The editing can include editing the input data, the data elements, the text in the space, and the digitalized voice signals in the variable to produce a real time change in the presentation. The editing can also include inserting, by the processor, comments into the template such that the comments are inserted in the presentation.

A particularly prefered version of the invention involves combining the present invention with a predictive tool, such as a statistics software package, such as SPSS, Random Walk (Box Jenkins Technique), or the like. This combination permits computerized generating of predictive data projected from the input data. The predictive data can then be inserted by the processor into the presentation.

Also note that the template can first be constructed by an other digital electrical information processing system including an other digital electrical computer having an other processor, the other digital electrical computer being connected to an other input device, an other output device, and an other memory device, the other input device being operable for receiving other input data and translating the other input data into other input digital electrical signals communicated to the other processor, the other processor being programmed by an other program to manipulate the other input digital electrical signals to produce other output digital electrical signals conveyed to the other output device, the memory device operable to electrically communicate with an other memory media, digital electrical computer. By using multiple computer systems, templates can have almost a life of their own.

Such a template is viewed as an article of manufacture, for example, when stored on a memory media and readable by a template viewer program. This approach is particularly useful for use at a location other than at the location of the builder program, to permit locally organizing the subsequently input data to form a report.

In this approach, the template includes a data file and computer instructions for presenting the subsequently input data into a predefined format including the aforementioned pages. This approach is particularly suitable for using the template to generate a report that includes a balance sheet, or more particularly, a balance sheet that includes assets, liabilities, and equity. It is also a suitable approach for generating, by the programmed computer, a report that includes an income statement, or where the numeric data sets include an operating ratio, a financial ratio, and/or an accounting ratio.

A show can also have a life of its own, as an article of manufacture stored on a memory media and readable by a show viewer program to present data previously input to a template. The show can be readable to program a processor in a digital electrical computer, the computer connected to an input device and operable for receiving input commands and translating the commands into input digital electrical signals for processing by the programmed processor into output digital electrical signals presented by an output device operable for receiving the output digital signals and translating the output electrical signals into a report. In this approach, the show includes computer instructions for presenting, in response to the commands, the previously input data organized into a predefined format including the aforementioned pages. Text in the show is formed by the template selecting from a plurality of statements in response to the input template data.

B. How To Make

It is intended that the present invention can be implemented in a variety of equivalents, including purely in hardware, a hard coded computer program, a series of computer programs, objects, applets, or the like, and computer instructions can be stored in Read and Write Memory (RAM) or in Read Only Memory (ROM).

Turning first to FIG. 68, an overview of a preferred mode of the present invention is shown. There is a digital electrical computer 2 having a processor. The computer can be an IBM compatible PC running operating system software. Computer 2 is electrically connected to a monitor 4 output device so as to show screens 6, discussed more fully hereinafter. Computer 2 is electrically connected to a keyboard 8 to receive manually input information so that the information can be converted into electrical signals and processed by the processor of computer 2. The computer 2 is also electrically connected to another output device, a local printer 10, e.g., a laser printer. Computer 2 is electrically connected by a cmmunications system—including a modem, telephone lines, and a service provider—to the World Wide Web 12.

Microphone 14 is a digital microphone electrically connected to the computer 2 to receive acoustic data for processing by computer 2.

Computer 2 is also electrically connected to a memory device 14, including a disk drive having a diskette. The diskette can store the program(s) or computer instructions 18 of the present invention.

In disclosing how to make and use a preferred embodiment of the present invention, reference is made to the Appendix hereto, which contains the following: a system summary that briefly describes all lines of code, program files, procedure files, procedures, functions, tables and DBS files, structural index files, and actual index files, report forms, menu files, screen files, other files, and cross referenced tokens, and otherwise provides an over all summary; a menu file summary that describes the two files used to support the menu structure of the present invention; an index parameter summary that briefly describes the index files, including simple, compound, and structural index files; other file summaries; a report form file summary; a tree diagram showing how the programs fit together; a table/data base format structure summary; a token cross reference report; a proceedures and functions summary that lists all programs and proceedures called in the programs; the source code for the builder program; and the source code for the viewer program.

Note that the present invention can be carried out with different kinds of volitile computer instructions. Other than a completely hard coded approach, one alternative is to make the invention using computer objects as instructions to program the computer. The basic concept in an objects approach is that of an "object" which is a data structure (abstract data type) encapsulated with a set of routines, called "methods", which operate on the data. Operations on the data can only be performed via these methods, which are common to all objects which are instances of a particular "class." Thus, the interface to objects is well defined, and allows the code implementing the methods to be changed so long as the interface remains the same.

Each class is a separate module and has a position in a "class hierarchy". Methods or code in one class can be passed down the hierarchy to a subclass or inherited from a superclass.

In object-oriented programming, a unique instance of a data structure defined according to the template provided by its class. Each object has its own values for the variables belonging to its class and can respond to the messages (methods) defined by its class.

Procedure calls are described in terms of message passing. A message names a method and may optionally include other arguments. When a message is sent to an object, the method is looked up in the object's class to find out how to perform that operation on the given object. If the method is not defined for the object's class, it is looked for in its superclass and so on up the class hierarchy until it is found or there is no higher superclass. Procedure calls always return a result object, which may be an error, as in the case where no superclass defines the requested method.

Object oriented programming for the present invention can be carried out with SIMULA-67, available since around 1970. More popular examples of object-oriented languages are Smalltalk, from Xerox's Palo Alto Research Center, and C++. Others include Object Pascal, Objective C, DRAGOON, BETA, Emerald, POOL, Eiffel, Self, Oblog, EPS, POLKA, and Loops. The computer instructions in the Appendix can be translated to an objects approach, if so desired.

Still another approach to handling the computer instructions is to use applets. An applet approach is particularly advantageous where distribution is being handled over the World Wide Web, where Java capability is important.

Java supports programming for the Internet and World Wide Web in the form of platform-independent Java "applets": simple, object-oriented, distributed, interpreted, robust, secure, architecture-neutral, portable, multithreaded, dynamic, buzzword-complaint, general-purpose programming language developed by Sun Microsystems.

Java is similar to C++ without operator overloading (though it does have method overloading without multiple inheritance, and extensive automatic coercions. It also has automatic garbage collection.

Java programs can run stand-alone on small computers. An interpreter and class support take about 40 kilobytes; adding the standard libraries and thread support (essentially a self-contained microkernel) adds an additional 175 Kb.

Java extends C++'s object-oriented facilities with those of Objective C for dynamic method resolution. Additionally, Java has an extensive library of routines for TCP/IP protocols like HTTP and FTP. Java applications can access objects across the Internet via URLs as easily as on the local file system. A Java compiler and linker both enforce strong type checking—procedures which must be explicitly typed. Java supports the creation of virus-free, tamper-free systems with authentication based on public-key encryption.

The Java compiler generates an architecutre-neutral object file executable on any processor supporting the Java runtime system. The object code consists of bytecode instructions designed to be both easy to interpret on any machine and easily translated into native machine code at load time. The Java libraries provide portable interfaces. For example, there is an abstract Window class and implementations of it for Unix, Microsoft Windows, and the Macintosh. The runtime system is written in POSIX-complaint ANSI C. Java applets can be executed as attachments in World-Wide Web documents using either Sun's HotJava browser or Netscape Navigator version 2.0.

With regard to the anatomy of an applet, every applet is implemented by creating a subclass of the Applet class. The following illustration shows the inheritance hierarchy of the Applet class. This hierarchy determines much of what an applet can do and how, as you'll see on the next few pages.

java.lang.Object

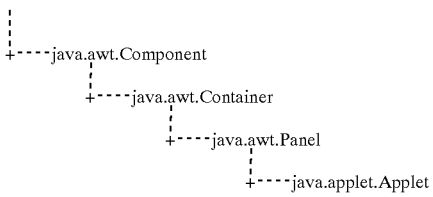

The Applet class provides a framework for applet execution, defining, methods that the system calls when milestones—major events in an applet's life cycle—occur. Every applet must override some or all of these methods to respond appropriately.

Applets inherit the drawing and event handling methods of the Component class. (AWT stand for Advances Windowing Toolkit; it is the package that applets and applications use to produce user interfaces.) "Drawing" refers to anything related to representing an applet on-screen—drawing images, presenting user interface components such as buttons, or using graphics primitives. Event handling refers to detecting and processing user input such as mouse clicks and key presses, as well as more abstract events such as saving files and inconing windows.

Applets are designed to hold Components—user interface objects such as buttons, labels, pop-up lists, and scrollbars. Like other Containers, applets use layout managers that control the positioning of Components.

Even the simplest applets run in multiple threads, although it's not always apparent. Many applets create and use their own threads, so that they perform well without affecting the performance of the applet viewer or of other applets.

Type in the computer instructions in the form it appears above and save it to a file. Then compile the program, include it in an HTML page, and load the page into a Java-enabled browser.

If it were preferred to make an equivalent embodiment, one can simply convert to hardware from the computer instructions provided in the Appendix. Such conversion, in whole or in part, is a routine undertaking.

When software is loaded into, and running, a programmable computer, the software sets what in effect are many, many "switches," and the result can be considered a new computer machine, with logic formed from the set switches. Instead of setting the switches, a circuit equivalent would be to hardwire the same or equivalent logic. Therefore, whether a configurable device is configured to the requirements of the present invention, or a device is constructed from scratch solely for meeting the requirements of the present invention, the result is effectively the same from an electrical signal processing standpoint. All these embodiments are different species of the present invention that are within the contemplated scope of the present invention.

Thus, for example, the computer instructions 18 can be burned into a ROM by using a ROM-burner or one could simply use commercially available software tools for designing circuitry based on a disclosure that consists of flow charts and program code. Using software tools is a largely automated process of going from the code and flow charts to circuit designs. The use of the software tools takes less time than manually doing schematic design by hand, particularly for very large gate count devices.

More particularly, the computer instructions 18 can be loaded into a ROM with a ROM-burner, which is a commercially available machine used to create a programmed ROM from computer instructions such as a computer program. To make a programmed ROM with a ROM-burner, the computer program is stored in the RAM of a computer, then dumped into the ROM-burner, which then uses electricity to burn out connections and thereby embed the program in the ROM. Copying a computer program from a RAM indelibly into the ROM is just another way of storing the exact, same computer program. Then, one simply replaces the RAM with the ROM (which has the same number of pins, pin spacing, and electrical requirements as the RAM) in a trivial process. However, the write pin on a ROM is no longer needed.

Another approach is to use circuit design software tools to make circuitry by employing circuit modules, which can yield more efficient designs than those developed by merely storing the computer program in ROM. These modules can provide simple functions, like gates, or more complex functions like registers, buffers, and ring counters. In the circuit design software tools, these and other functions have a standard cell definition so that one can use cell logic to design circuitry, much like one can build a house out of Lego building blocks. All the standard cell components are plugged together to expediently produce designs for circuitry having arrays with vast numbers of gates.

More specifically, the conversion process begins by specifying the input requirements, the output requirements, and the flow chart definitions of the way that input would be used to generate the output. Converting from a software implementation to a hard wired implementation is routine because the operations of a programmed digital electrical computer literally are switching circuitry operations, and thus, are replicatable. A programmed computer operates by executing functions sequentially or however they are programmed within the memory of the computer. Thus, the executing is a purely digital and logical sequence, which can be recreated by a hard wired structure of gates controlled by timers. From a technical point of view, it is therefore a routine task to go from flow charts and code to hard wired circuitry.

The circuit design tools use this information to produce depictions of a series of digital logic gates in a field programmable gate array (FPGA) or in an application specific integrated circuit (ASIC).

A field programmable gate array is a device which is already largely configured; it just needs final specifications to connect the gates. A FPGA is a relatively expensive device. For example, to individually "program" each 5,000 gate FPGA will cost several hundred dollars per FPGA, but it may replace several thousand dollars worth of less integrated hardware.

One can replace a FPGA with an ASIC, i.e., a customized silicon chip. The software tools generate a chip mask work having the gates, and the chip mask work is used to make the chip. Initially, producing an ASIC is expensive, e.g., $100,000. But for a high volume, perhaps for some mass produced device, in the long run, it would be cost effective to change from a FPGA costing several hundred dollars to an ASIC implementation, which then may cost several dollars per component.

The ASIC can be inserted in place of the FPGA, which in turn can be inserted to replace the programmed microprocessor—all to perform exactly the same functions specified by the software.

Of course the process can be done in the reverse—that is, going from a hard wired implementation to a programmed implementation. The process involves deriving the functions of the hardware, which can easily be done because every piece of hardware has specifications: A set of inputs, a set of outputs, a functional capability. Every aspect of that hardware can be generated in its equivalent flow chart form by a programmer working in whatever language he or she prefers, e.g., C, C++, Fortran, Visual BASIC, or Pascal. In sum, one takes the specifications of the device and its function, and represents them in a flow chart with whatever timing characteristics and whatever input/output (I/O) devices are used. Then it is a straightforward process of writing code according to the specifications of the flow chart.

Although the circuitry created by the tools could be identical to the programmed circuitry, it probably is equivalent to the circuitry. (Two different circuits that produce identical output from identical input are known in electrical engineering as equivalent circuits.) That is, the logical definition for performing, say, multiplication in either hardware or software is identical, so hard wired circuitry must perform the same function as programmed circuitry. However, the hard wired circuitry would probably be somewhat differently structured to reflect the technology employed in building the circuit—e.g., if the circuit is not put on a chip, it would operate at a higher voltage, etc. However, the use of different but equivalent structures to performing the same functions is not unique to converting from software to hardware. Two circuit designers could implement the same function with different hard wired circuitry.

Accordingly, the preferred embodiment of the present invention is carried out by a programmed computer implementation, because it is more flexible than other approaches. However, conversion into a hardware implementation, or vice versa, is a routine undertaking to make the equivalent circuitry of a hard wired approach. From an electrical engineering and computer science point of view, these are equivalent approaches.

Because the present invention is directed at modifying electrical signals in a digital electrical apparatus having a processor, such as a microprocessor, it is helpful to understand how the signals are modified, a basic understanding of microprocessors.

A microprocessor is, of course, the central component in any digital electrical computer system—it controls the functions performed by the other system devices and provides the system's arithmetic and logic capability. The microprocessor fetches instructions from memory and decodes and executes them. It references memory and I/O devices for data and responds to control signals from external devices.

The most fundamental purpose of a microprocessor system is to process digital data that is input from the outside world and to provide as outputs digital data that is a desired function of the input data (i.e., to modify electrical signals). Every processor is equipped with a repertoire of operations which it has the capacity to execute. The operation it selects for execution is based on its interpretation of a command code, called an "instruction." This instruction is part of a sequence of instructions, called a "program," which is stored in a memory to which the processor has access. The processor executes the program, one instruction at a time, by reading the current instruction, interpreting it, executing it, and then proceeding to the next instruction. Because each instruction is available to the processor almost instantaneously, the execution time for an entire program may be very small, which is known as "real time."

A program uses a set of rules based on the instruction repertoire of a specific processor. This set of rules is known as a programming language. (An instruction in a programming language is also called a "statement.") A program written for one processor may be translated into an equivalent program for another processor, even though the two machines have entirely different instruction sets. For this reason, a programming language may be based on a hypothetical machine, which does not physically exist because it is too difficult or too expensive to build. It is defined strictly because its language is easier to use more convenient in which to express programs. It is called a "virtual" machine because it is the one that is "visible" to the programmer. Consequently, the program that a processor executes may have been planned directly for it or may be a translation of a program written for some other (possibly virtual) machine.

The memory containing the program may be a ROM, in which case the program was built into it at the time it was fabricated. Alternatively, the memory may be a volatile Random Access Memory (RAM), in which case the program must first be made resident, using a sequence of memory writes called a program "load," before its execution may commence. In subsequent discussions, unless specified otherwise, asssume the program already resides in the memory to which the processor has access.

To understand microprocessor signal processing systems, it is advantageous to view the entire system— microprocessor, ROM, RAM, and I/O ports—as a collection of addressable registers. Those registers that reside within the microprocessor are internal registers, and those that exist in the ROM, RAM, and I/O ports are external registers.

The collection of registers that constitutes a particular system and the data transfers that are possible among them make up the system architecture. The types of registers in the microprocessor and the possible data transfers among them determine the microprocessor's architecture.

A microprocessor system implements its functions by transferring and transforming data in registers of the system. Typically, transformations on data occur in internal registers, many of which are operational registers. Operational registers differ from storage registers in that they and their associated circuitry implement arithmetic or logic operations on the data contained in the register, thus transforming the data.

The microprocessor controls and synchronizes the data transfers and transformations according to instructions read into it from the application program in the system's ROM.

A microprocessor's architecture has two major functional units: the control unit and the arithmetic/logic unit, ALU. In addition to these units, the microprocessor contains a number of registers—instruction register, program counters, stack pointers, general purpose registers, and temporary registers.

The microprocessor's control unit controls and synchronizes all data transfers and transformations in the microprocessor system and is the key sequential subsystem in the microprocessor itself. All actions attributable to the microprocessor are actions implemented by the control unit.

The basic operation of a simple microprocessor is regulated by the control unit, is cyclical, and consists of the sequential fetching and execution of instructions. Each instruction execution cycle has two primary states: the fetch state and the execute state. The fetch state transfers an instruction from memory into the microprocessor, and the execute state executes the instruction. The microprocessor normally cycles between the fetch and execute states unless and until it executes a halt instruction, in which case it enters a halt state and stops.

To keep track of which instruction is to be executed next, the control unit maintains a special purpose or dedicated register, the program counter. The program counter is an operational register that always holds the address of either the next instruction to be executed or the address of the next word of a multiword instruction that has not been completely fetched. In either case, at the completion of the execution of any instruction, the program counter contains the address of the first word of the next instruction to be executed. The operational nature of the program counter allows its contents to be incremented by the control unit.

One of the control inputs to the microprocessor's control unit is the reset input. When the microprocessor is reset, the control unit resets the program counter to zero. This initial value establishes the memory address from which the first instruction is to be obtained.

To actually obtain the first word of the instruction, the address contained in the program counter is placed on the address bus. To do this, the control unit transfers the contents of the program counter to the address register. The program counter is then incremented to point to the next memory location. The outputs of the address register are the address pins of the microprocessor. The control unit then generates a memory read strobe that transfers the data from the addressed memory location to the microprocessor. The data is transferred into the micro processor through the data bus buffer/latch and then into the instruction register ("IR"). Registers within the microprocessor are interconnected by an internal data bus.

The first word of an instruction is the operation code for that instruction. Operation code indicates to the control unit those operations required to execute the instruction. The output of the IR is decoded and used by the control unit to develop a sequence of operations and register transfers that execute the instruction.

The operation code in the IR addresses a starting location in a control ROM or Programmable Logic Device within the microprocessor where a sequence of very elementary instructions—microinstructions—is located. Each instruction in the fixed instruction set of a microprocessor is implemented by the control unit sequencing through the set of microoperations associated with a particular instruction. For single-chip microprocessors, the microinstructions, and thus the microprocessor's instruction set, are fixed at manufacture.

Arithmetic or logic operations on one or two operands constitute the basic data transformations implemented in a microprocessor. The microprocessor contains an arithmetic and logic unit, ALU, for this purpose. One of the two ALU registers, the accumulator, holds one operand; the other, a temporary register, holds the second. The result of an arithmetic or logic operation is placed in the accumulator at the completion of the operation, replacing one of the original operands.

Various subsystems of the microprocessor system are externally interconnected by the system bus, which includes the address bus, data bus, and control bus which operates according to a set of system bus signals for conveying bits of data.

Each of the subsystems connected to the system bus can be viewed as consisting of a bus interface and primary function. For example, the primary function for a memory subsystem is implemented by memory devices. These memory devices provide the addressable registers considered when viewing the subsystem as a collection of registers.

External or peripheral devices that generate data for input to a microprocessor system are called input devices. Input devices include a large variety of electronic and electromechanical devices. These devices range in complexity from simple switches to other microprocessor systems that preprocess data before transferring it to the main microprocessor. Data generated by an input device is stored temporarily in a register until it can be read by the microprocessor. The loading of the input register with data is done by the input device. Once loaded with data, the input register can later be read by the microprocessor.

Ouput devices, of which there are a large variety, accept data from the microprocessor system. The data to be output from the system is placed in a register connected to the data bus. This register is called an output port and is clocked by an output device select pulse.

Input ports and output ports have a bus interface consisting of address decoding logic. For an input port, the primary function consists of a register and three-state buffer. For an output port, the primary function is simply a register. When viewed as a collection of addressable registers, each port consists of a single register.

Where data in analog form is to be processed or generated by the microprocessor system, suitable analog to digital and digital to analog conversion subsystems are employed to convert analog input data to the required digital form, and vice versa.

The output data can be in a bitmap form, and it should be noted that a preferred embodiment includes bitmap output. This printing involves the output from a data file or a data structure, which corresponds bit for bit with an image displayed on a screen, preferably in the same format as it would be stored in a video portion of memory. A bitmap is characterized by the width and height of the image. A bitmap may represent a colored image, in which case there will be more than one bit for each pixel and it might be called a pixmap.

A computer output device where each pixel displayed corresponds directly to one or more bits in the computer's video memory. Such a display can be updated extremely rapidly since changing a pixel involves only a single processor write to memory compared with a terminal connected via a serial line where the speed of the serial line limits the speed at which the display can be changed.

Most modern personal computers and workstations have bitmap displays, allowing the efficient use of graphical user interfaces, interactive graphics and a choice of on-screen fonts. Some more expensive systems still delegate graphics operations to dedicated hardware such as graphic accelerators. For the purposes of this invention, either approach is acceptable.

A bit font occurs where each character is stored as an array of pixels (a bitmap). Such fonts are not easily scalable, in contrast to vectored fonts.

It is to be explicitly understood that other implementations of the present invention, say, those using a different kind of digital computer, analogous hardware, multiple computer systems, comparable input and output, a computer program or computer programs written in a different language, a chip or chips, in ROM, or a full or partially hardwired system replacing (and in accordance with) the logic of the computer program, are entirely acceptable and equivalent to the embodiment of the invention discussed herein.

C. How to Use

Figure 1:
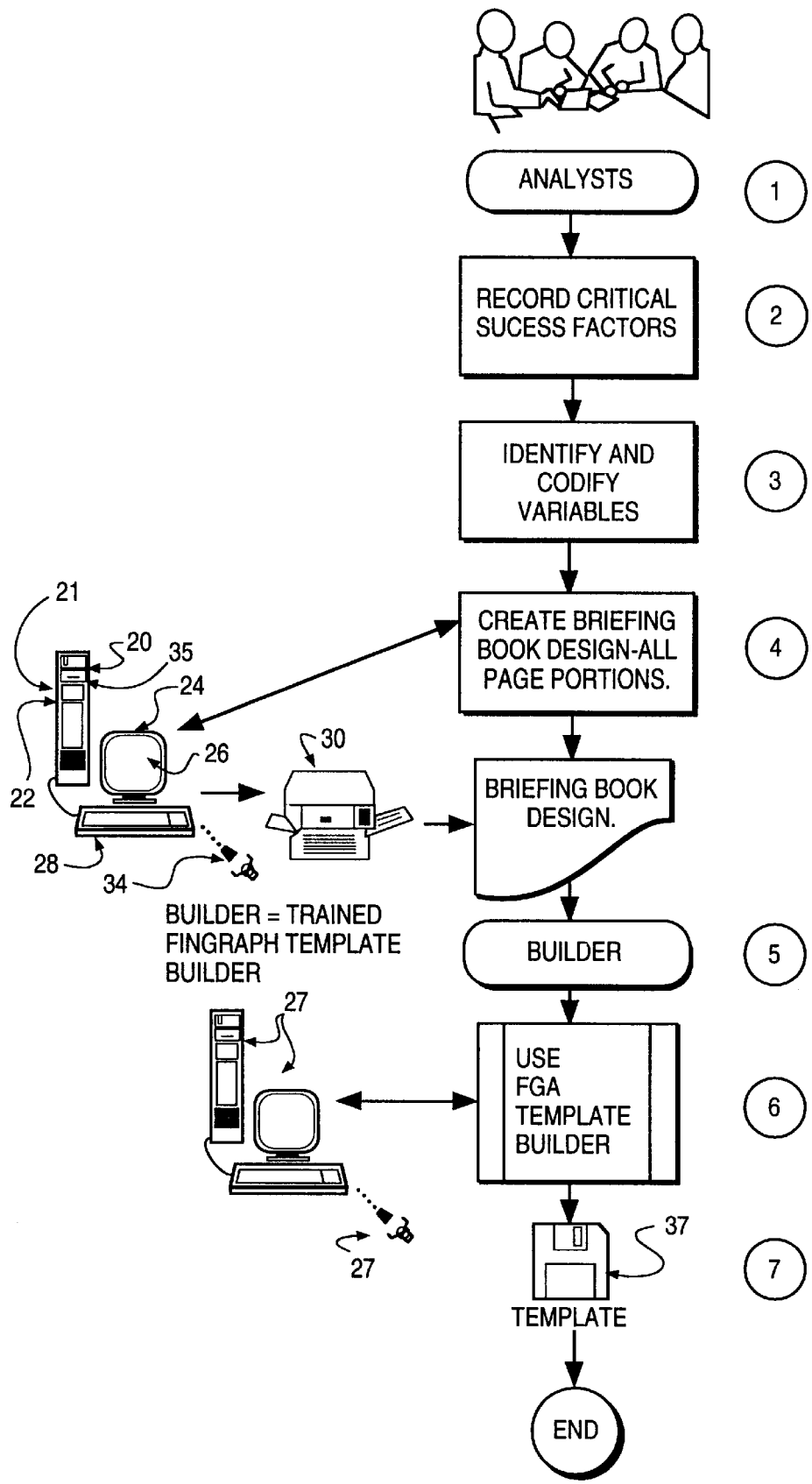
FIG. 1 is an overall flow chart of a Builder program of the present invention.

FIG. 1—shows the overall work flow associated with a Builder program of the present invention. The Builder program begins with professional and trained system analysts with specific training and experience that supports the data and the analysis to be codified in a Template, such as financial, accounting, operating, manufacturing, health care administration, etc.

At step 2, analyst(s) perform a systems analysis of an organization, a department, a function, a process or any other area where a data set that describes operation is available—and the analyst(s) know how to interpret such data. Critical success factors are defined, such as ratios, reports or any other relationships that can be computed from the available data, and, when analyzed, measure the organization's performance.

Once the critical success factors are known, the variables that measure the success factors can be identified and linked in mathematical relationships at step 3. The mathematical relationships will be used to create the Briefing Book Templates.

At step 4, the analysts work with the Builder to create a mock design of the Briefing Book. When the design is approved, the builder completes the Briefing Book using the Builder software/hardware system.

The Builder, step 5, is an analyst who has been trained how to use the Builder to create the Briefing Book Templates.

The Builder creates the Templates following the basic steps of:

1. Setting up the data element names;
2. Defining the mathematical relationships amongst the data elements and the columnar data;
3. Identify and test chart formats to assure proper graphical representations of the mathematical relationships;
4. Defining all of the possible cases in the data sets and identify the formulas that match the cases—write words describing the cases that will be activated when the data sets match the case definitions;
5. Identifying the data ranges within each case that would normally be discussed to understand and control the critical success factors—write words that analyze the cases within the data range;
6. Testing the Templates with data to assure proper reporting;, and
7. Creating the Template and storing it on a magnetic media for use by the Analyst Viewer.

Figure 2:
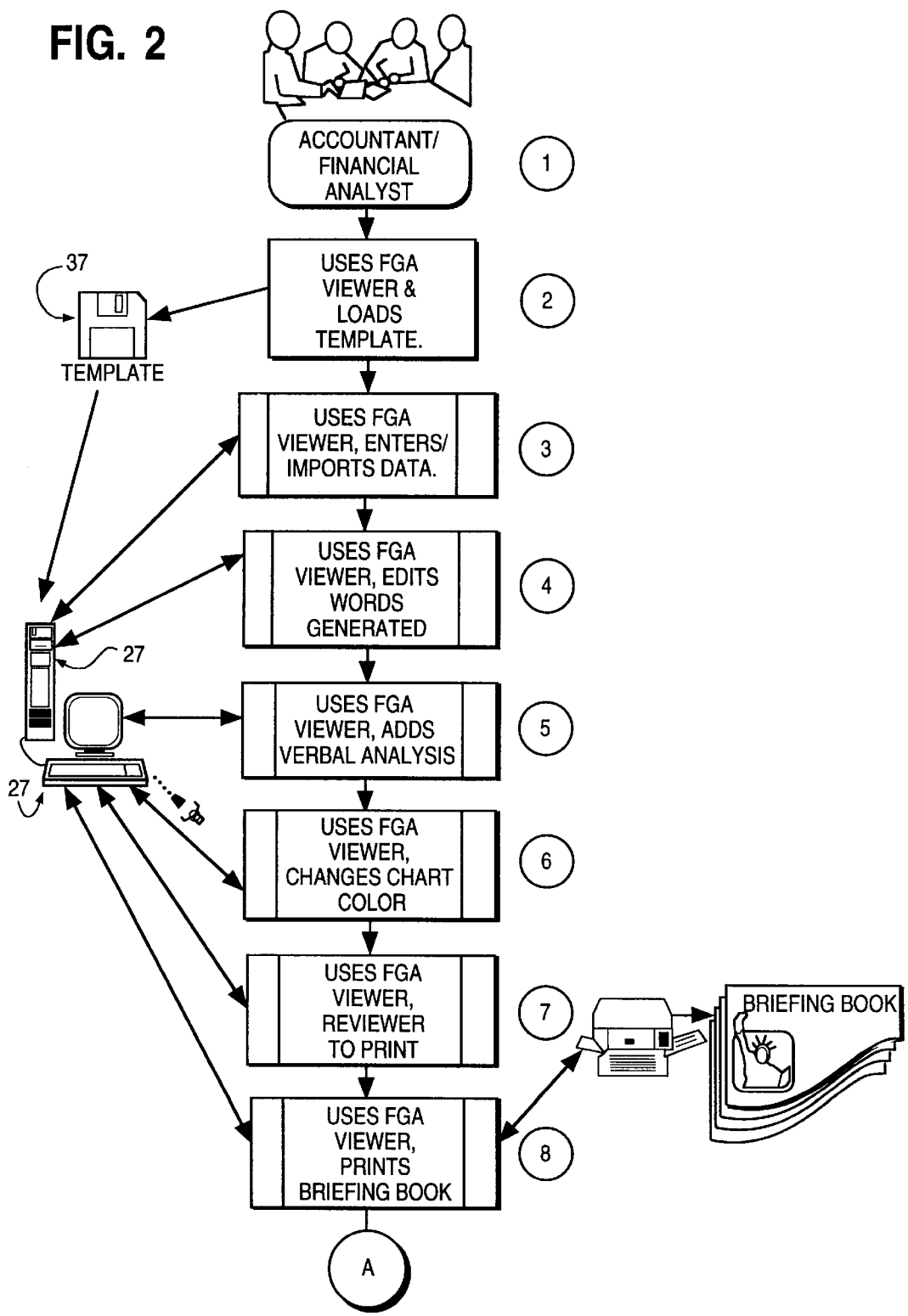
FIG. 2 is an overall flow chart of a Viewer program of the present invention.

FIG. 2—Referring now to FIG. 2, any user who has access to the reports that represent the tabular data used in a specific Template can operate the Viewer at step 1.

At step 2, the user loads each different Template into the directory where the Viewer will look for data. Once the Viewer is opened, the user will locate the template and activate it for use in by Viewer.

At step 3, the user calls the Viewer, selects a company file, and enters the data using the manual data entry process or imports the data from pre-defined data set(s).

At step 4, the user directs the Viewer to receive and analyze data entered into the Template via the computer system. The Viewer will create tabular statements, charts, and written analysis. The user will then edit the written analysis to fit the needs of the specific Briefing Book.

At step 5, the user adds voice data to the words statement and saves the voice data in a sound file with each set of words.

The user can change the default colors for the charts at step 6.

Pursuant to step 7, the user views all of the pages for a final approval.

At step 8, the user opens the print options, selects the ones that best fit the current print needs, and prints the Briefing Book for distribution.

Any user who has access to the reports that present the tabular data used in a specific Template can operate the Viewer as indicated at step 9.

Any user can create a Show file and send it to others inside and outside the organization for the recipient's use as indicated in step 10.

Figure 11:
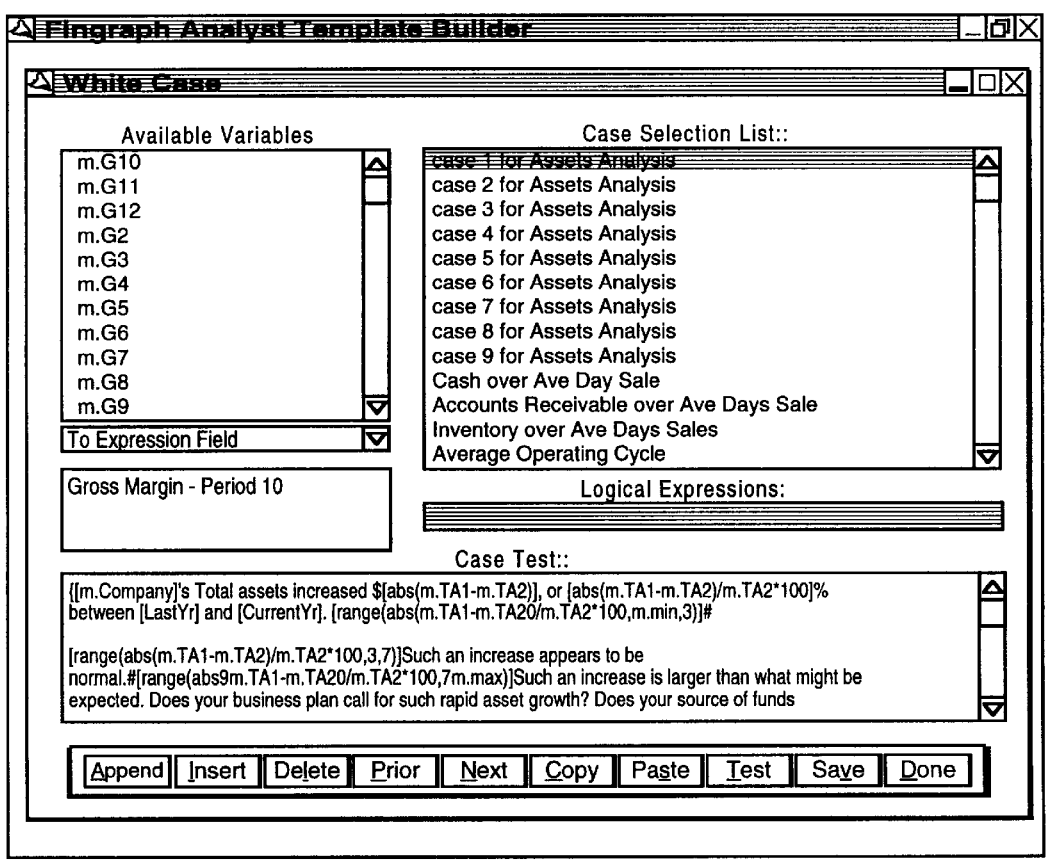
FIG. 11 is a copy of a Write Case Window Screen.
Figure 12:
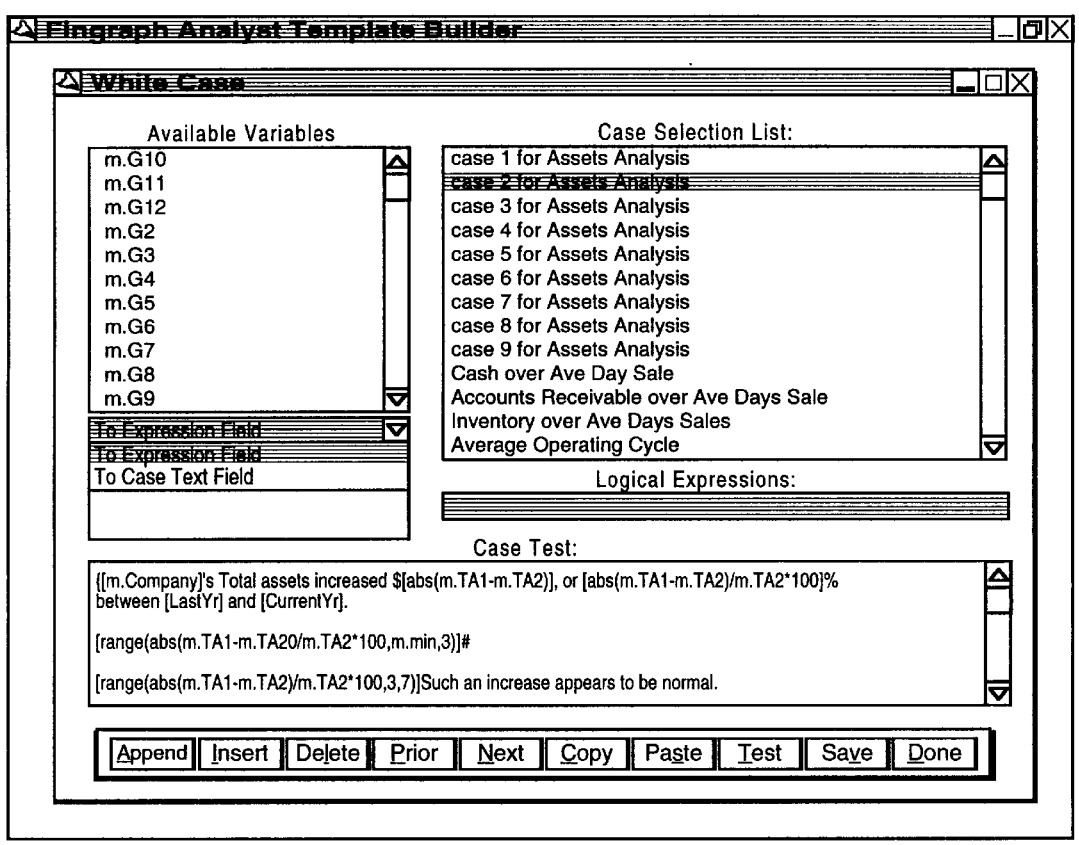
FIG. 12 is a copy of a Write Case Window Screen with the "Directions to Send Variable" window opened in the center left of the screen.

The output of the Show, as indicated in FIG. 11, is a set of files that can be viewed but the data cannot be changed or altered. The Show can be stored on any magnetic media and the numbers in the Show cannot be changed. The Show can be created to allow or not to allow changes in the words, the voice sound or the chart colors.

At step 12, the user can send a Show to anyone with a complete Viewer or a run time version of the Viewer, to see, hear, and print the results.

Pursuant to step 13, the user can also send a Show to another with a complete Viewer or an abbreviated run time version of the Viewer, to see, hear and print the results.

At step 14, anyone in the company can print the Briefing Book for distribution, e.g. as a printed copy.

Subsequently, at step 15, anyone in the company can use the Viewer to view, edit and response to the analysis, a copy of their report sent in an modality. This capability turns the Briefing Book into an analytical process for the users.

Lastly, as noted in step 16, the user can print the Briefing Book as an internal or extenral communication tool.

Figure 3:
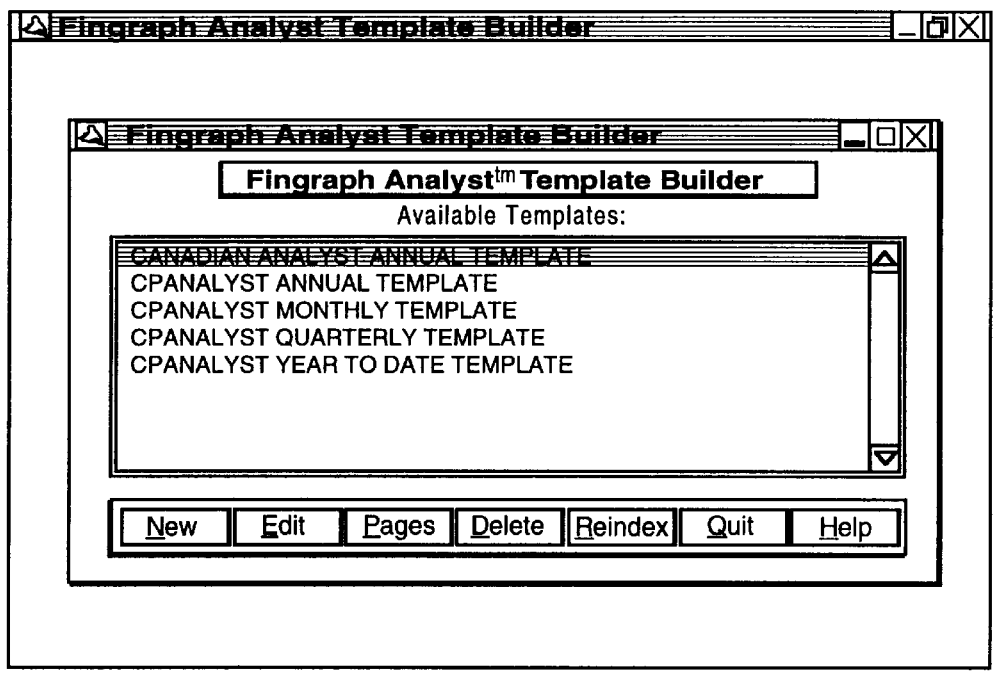
FIG. 3 is a copy of an Analyst Template Builder—Available Templates Screen.

FIG. 3—Analyst Template Builder—Adding Pages Screen. Prior to using the Template Builder, the user creates a set of Template Pages by defining the elements in the data set (the rows,) the primary and comparative data sets (the columns,) and the mathematical relationships amongst the data. The completed Template derives all inferences using the defined relationships amongst the elements and between specific data sets entered when the Template is activated by the Viewer.

The data sets contain any data type that is supported by a knowledge base. Such data sets include but are not limited to historical data such as financial and operating data from any type and size organization; budgeted and forecasted data from any type and size organization; predicted and estimated data using any set of formulations and devices.

The user identifies the data sets to be analyzed in the Template; sets the sequence for presenting the data elements; sets the column definitions; establishes the mathematical functions required to add, subtract, multiply and divide the data to show the planned results; selects the chart or charts that represent the mathematical relationships in the data; adds the chart or charts to a Page portion(s) using the Chart definition language; starts the Template Builder, and defines the cases, the control ranges, the formulas and the related word sets (see detail below).

The Template is activated in the Viewer, which creates the written analysis in using the specific numbers entered by the user to make the computations and assemble the written report. See the detail in Analyst—Viewer.

The user deletes a page by removing the code from the Template Builder.

Template Builder—The first of three "buttons" on the bottom of a main menu open the paths that add templates to the system, edit the names of the current templates, and create the written analysis included in each of the pages in the template. The Delete and Reindex buttons are used to maintain the system, the Quit button closes the system and the Help button opens up the help file listings. Other buttons are as follows:

The New button adds a new template to the system.

The Edit button allows the user to Edit the name of the highlighted template.

The Pages button activates the page building sequences.

The Delete button deletes the highlighted template.

The Reindex button reindexes all of the database files.

The Quit button closes the system and returns to the operating system.

The Help button directs the system to go to the help file listings.

When adding a new template to the system, there are three tasks required to name the template and one decision that can help the user write the cases.

Figure 4:
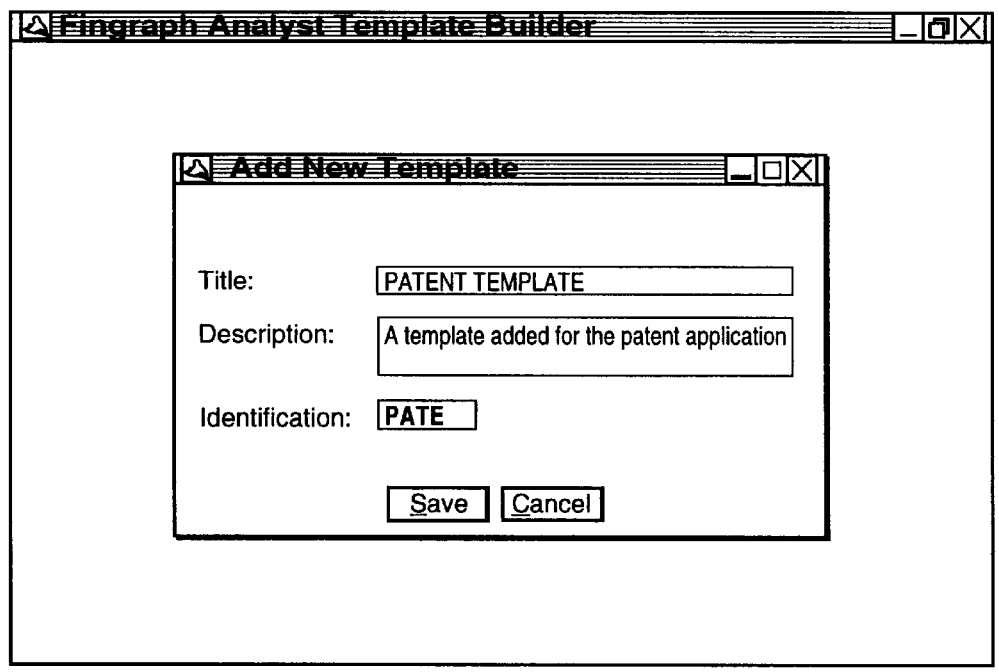
FIG. 4 is a copy of an Add New Template Window Screen.

FIG. 4—Add New Template Window Screen—The user names the File.

The File button—Insert a name that helps the user associate the purpose of the template with their needs.

The Description button—A space for describing the contents of the template.

The Identifier button—A four letter internal naming convention, default is the first four letters of the name of the template. The user can edit the default.

The Save button—Saves the name, closes the window and brings up the support function described in 3.2.

The Cancel button—Closes the window without saving the changes and goes back to the main menu.

Figure 5:
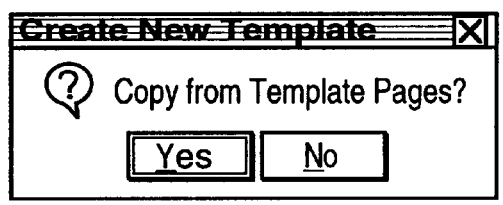
FIG. 5 is a copy of an Copy from existing Template Pages? Screen.

FIG. 5—Copy from existing Template Paces? Screen—If the user selects "Yes" then the system opens a list of current templates for the user to choose as the model. If the user selects "No" the system creates a blank shell for the text.

Figure 6:
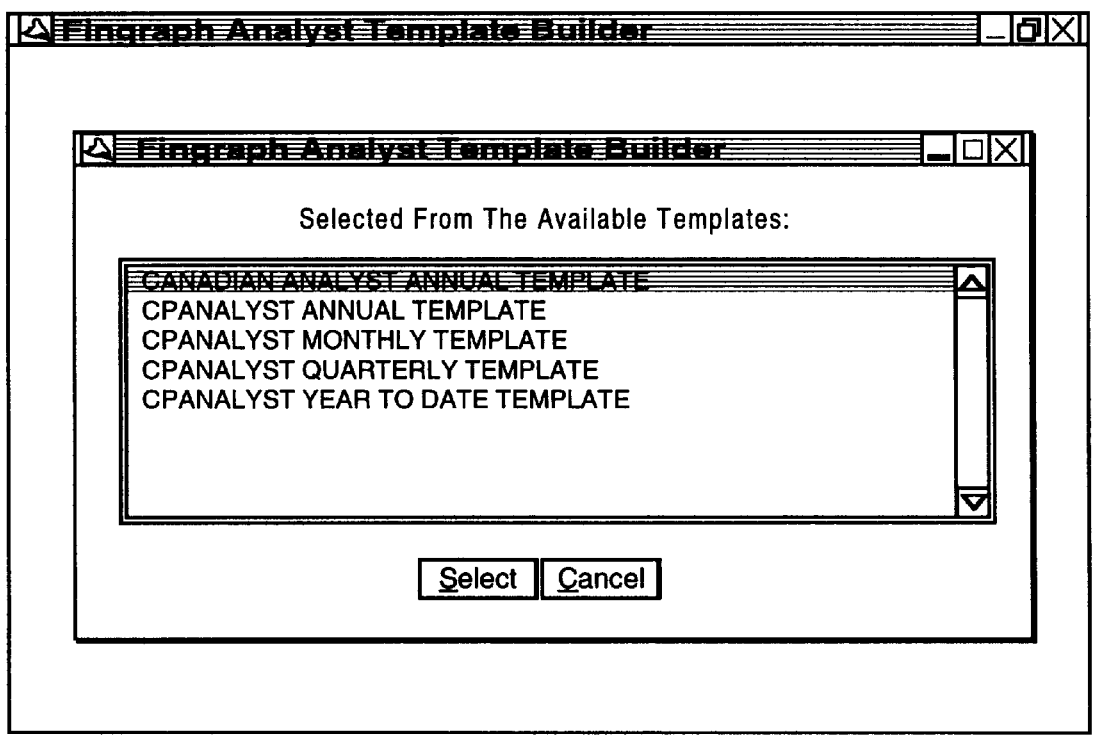
FIG. 6 is a copy of an Select From The Available Templates Screen.

FIG. 6—Select From The Available Templates Screen—Lists the templates available to copy from. The user highlights the name and presses the "Select" button to copy the contents of the selected template into the New template. The "Cancel" button closes the window without saving the new template and returns the system to the Main Menu.

Figure 7:
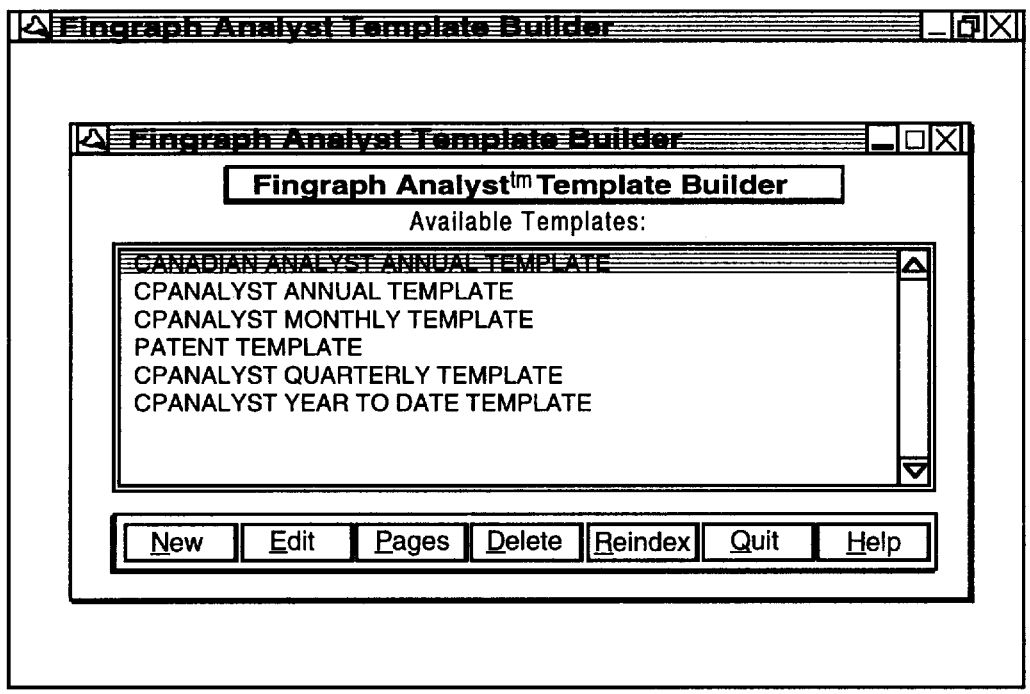
FIG. 7 is a copy of an Analyst—Template Builder Available Templates Screen.

FIG. 7—Analyst—Template Builder Screen—The new template is included in the template list.

Figure 8:
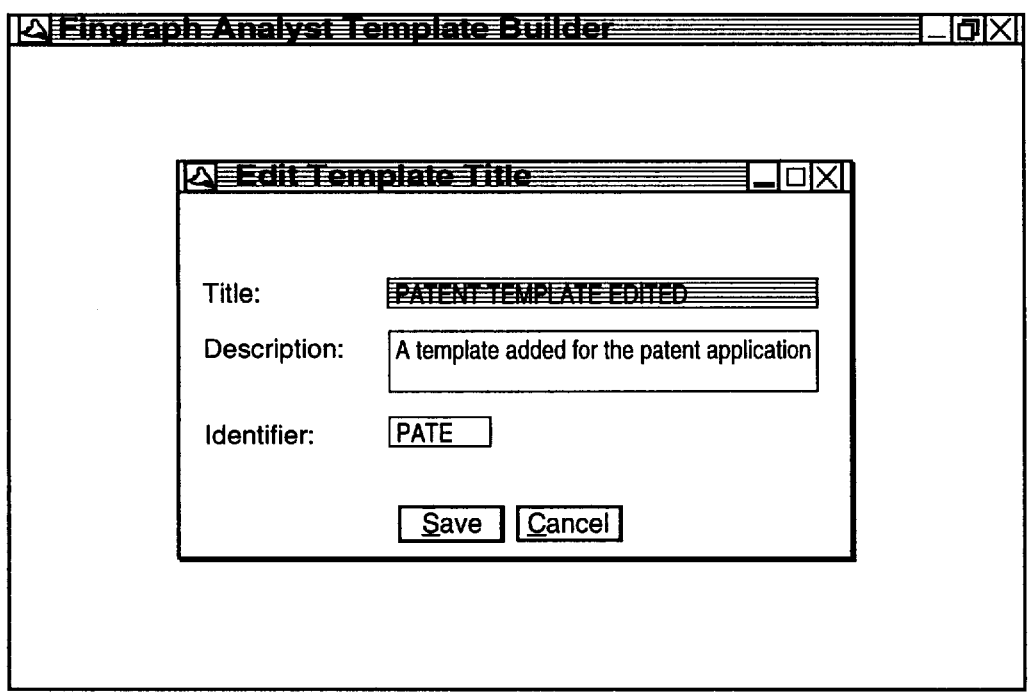
FIG. 8 is a copy of an Edit Template Title Screen.

FIG. 8—Edit Template Screen—Allows the user to Edit the name of the highlighted template. The screen is the same screen used to add a New template. The user can change the name and the description but cannot change the "Identifier."

Figure 9:
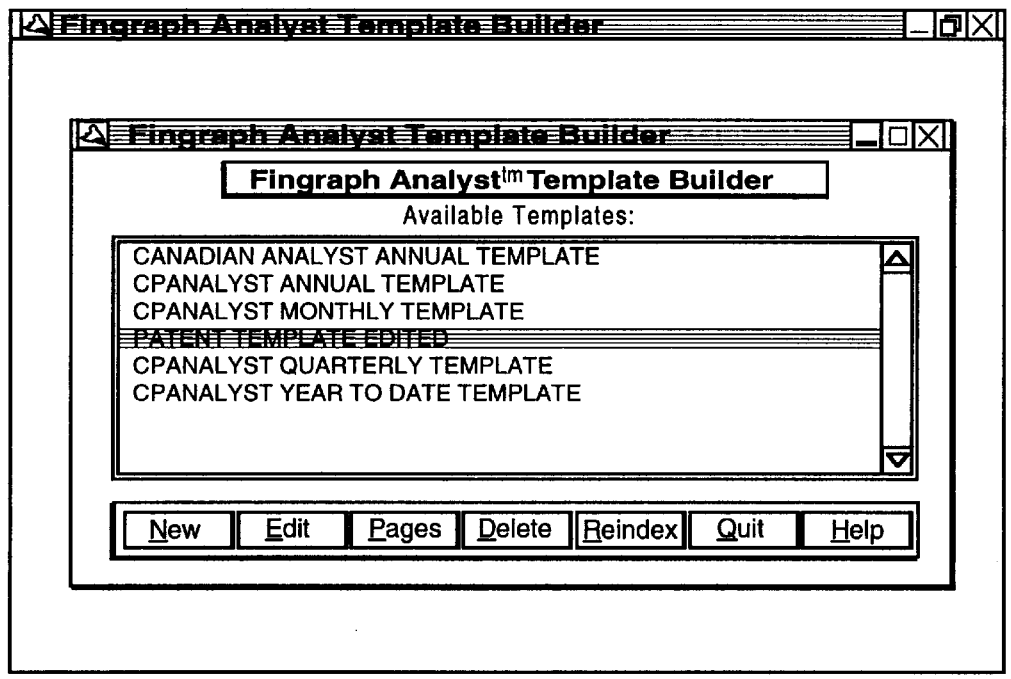
FIG. 9 is a copy of an Edit Available Templates Screen with the Edited Title.

FIG. 9—Available Templates Screen—The edited name is displayed on the Main Menu.

Figure 10:
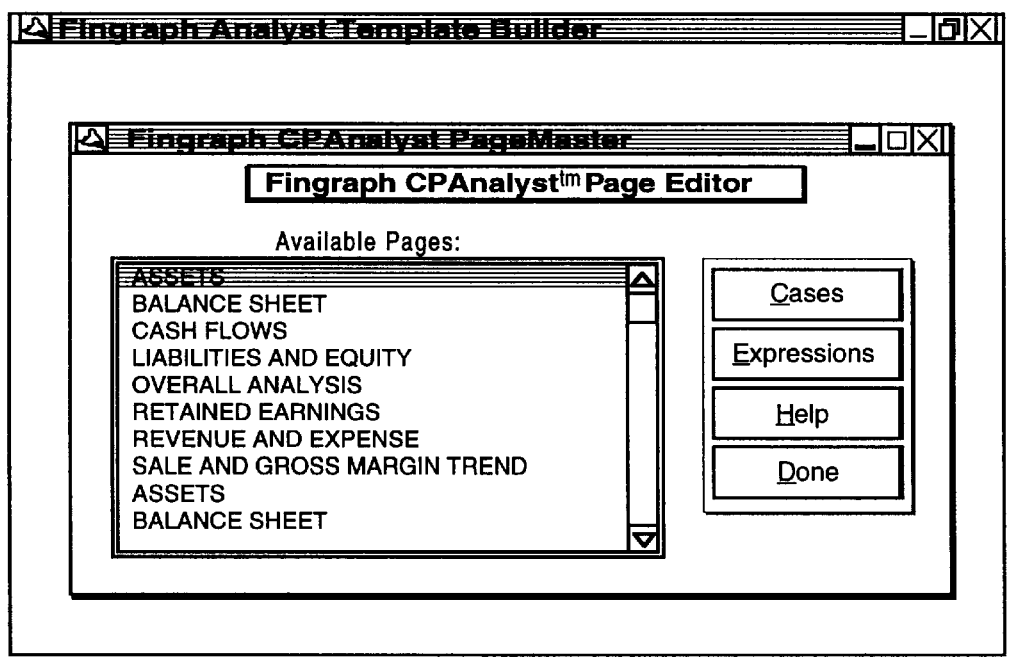
FIG. 10 is a copy of a CPAnalyst Pagemaster—Page Editor Building the Pages Screen.

FIG. 10—CPAnalyst Pagemaster—Building the Pages Screen—Clicking the "Pages" button on the Main Menu activates the page building sequence starting with a list of the Pages recognized by the Template selected. There are four active buttons on the screen.

The Cases button—Opens the Write Case Window for the highlighted Page (see detail below.)

The Expressions button—Opens the Define Variables Window for the currently loaded Template (see detail below.)

The Help button—Directs the system to open the help file specific to the current screen.

The Done button—Returns the system to the Main Menu.

FIG. 11—Write Case Window Screen—The window where the Cases and the Ranges within the Cases are defined and the analytical statements are written for each result. There are six (6) windows and ten (10) buttons to help the user create the Cases and the Ranges.

The Six (6) Windows—Each of the six windows provides a function to help the user build the Case definitions. The Windows are described starting with the upper left window "Available Variables" and moving clockwise around the screen ending with the single row window with the words "To Expression Field."

The Available Variables window—The Available Variables window lists all of the Variables that can be used to define a Case in the Logical Expression window, and to establish the Range parameters used in the Case Text window to activate the appropriate Range sentences.

The Case Selection List: window—A list of the Cases identified for the current Page in the currently opened template. The scroll bar is used to highlight the case currently available for creating or editing.

The Logical Expression: window—The mathematical expression that establishes the case. The mathematical expression is limited to selecting the "Case" where the primary data element is greater than, less than, or equal to the comparative data element. The Variables used are copied automatically from the Available Variable Window to the Logical Expression window by double clicking on the Variable. The Variable Placement Command Window determines if the variable goes to this window or to the Case Text Window, see above.

The Case Text: window—A simple word editor where all of the range formulas and related words are created. The first sentence always defines the Case using predefined variables that generalize the statements. The remaining sentences are always preceded by a "range" formula and then the words specific to that range of results. The Variables used are copied automatically from the Available Variable Window to the Case Text Window by double clicking on the Variable. The Variable Placement Command Window determines if the variable goes to this window or to the Logical Expression Window, see below.

The Variable Description window (unnamed window with the words "Gross Margin - Period 10")—This window displays the description of the highlighted variable entered when the variable is first created. For more specific information, see the Define Variables Window section below.

The Variable Placement Conmand window (unnamed window with the words "To Expression Field")—This window allows the user to select either the Logical Expression or the Case Text window as the destination for copying a variable. When the user double clicks on a highlighted variable, the system will copy the variable to the selected window and insert the variable where the cursor is located.

The Ten (10) Buttons—The ten buttons provide all of the functions necessary to build and test the written inferences to be derived from the data.

The Append button—Inserts a new Case at the bottom of the Case Selection List.

FIG. 13—New Case: Window Screen—User enters the name for the new case and presses Save.

FIG. 14—Write Case Screen—Window lists the new case.

The Insert button—Inserts a new Case below the Case highlighted in the Case Selection List. Same as Append above.

The Delete button—Deletes the Case highlighted in the Case Selection List.

The Prior button—Closes the current case and opens the previous case.

The Next button—Closes the current case and opens the next case.

The Copy button—Copies the text in the Case Text window to the Windows Clipboard so it can be pasted into another editor with more features to help create the words.

The Paste button—Pastes the text in the Windows Clipboard copied from another editor to the Case Text window.

The Test button—Tests the formulas designed to define the Case and the Ranges in the currently highlighted Case to make sure the inference engine is assembling the appropriate sentences.

FIG. 15—Question Screen—When Test is activated, system asks if the user wants to test the system with randomly created numbers or with numbers from a template in the same directory. "Yes" means the system will create random numbers, "No" means the system will use the template data.

FIG. 16—CPAnalyst Screen—The sample text generated with random data. The window shows the text. There are two buttons that can be used with the words generated.

The Save to text file button—Saves the text generated in an ASCII text file for later use.

The Done button—Returns system to the Write Case window.

The Save button—Saves all of the relationships defined for the currently highlighted Case.

The Done button—Returns the system to the PageMaster screen without saving.

FIG. 17—Define Variables Window Screen—This window is opened if the user selects the "Expressions" button in the PageMaster window. There are two main sections with three windows in each of the sections, the "Available Expressions" and the "New Expression:". The New Expression section has four math buttons used to build the new expressions. There are seven buttons on the right hand side of the screen that are tools mostly to help build the New Expression.

Available Expressions—This set of three windows lists the expressions that are currently available, presents the Equation that constructs the expression and the corresponding description of the expression.

The Expression window—Lists the expressions currently available for user.

The Equation: window—Presents the details of the expression highlighted in the Expression window.

The Description: window—Presents the description of the expression with notes from the person who created the expression.

FIG. 18—New Expression Screen—The section is activated when the user presses the "Add New" button on the right hand side of the screen. The three windows are the same as the Available Expressions section except the user has to complete the details.

The Expression Name window—The user enters then name of the new expression.

The Equation: window—The user creates the equation by typing in the expression using standard system variables; or by moving a variable from the Available Expressions window to the Equation window by double clicking on any expression in the Available Expressions window. The user can type in the mathematical descriptors that link the equations to form another equation, or they can click on one of the four math buttons to insert the proper mathematical format: Multiply=X; Divide=/; Add=+; and Subtract=−.

The Description: window—User enters a complete description of the expression with notes on how to use the expression.

Buttons—There are seven buttons to help the user create the expressions: The Add New button -Activates the New Expression section so the user can enter a new expression. The Delete button—Deletes the highlighted expression in the Available Expressions section. The Copy button—Copies text from any of the three windows in the New Expression section. The Paste button—Past text into any of the three windows in the New Expression section. The Case button—Toggles between the Write Case window and this window to help the user keep the work in context. The Save button—Save the New Expression and any changes made to the other expressions. The Done button—Closes the window and moves the system back to the Page Editor screen.

Turning now to the Viewer portion, as contrasted with the foregoing discussion of the Builder portion, the discussion of the figures continues.

FIG. 19—Welcome Screen—Describes the system functions in text and welcomes the users with a recorded message. The Continue button—Continues the process of opening the Analyst Viewer and prepares the system to analyze data. Activated by clicking the left mouse button when the mouse arrow is on the Continue button. The Quit button—Stops opening the system and returns to the operating system.

FIG. 20—Main Screen—Controls all of the functions in the Viewer. The named buttons at the top of the screen catalogue the five (5) types of functions available in the Viewer; the seven (7) icons provide shortcuts to activate the most often used functions; and, the Company Quick Select pull down list provides a quick way to select a different company. To activate one of the function paths or any action in the system, use one of the normal Microsoft® Windows® activation sequences including the mouse, the "Alt" Key menu activation and character selection, the arrow keys and the Enter key.

Menu Buttons—The five named buttons activate pull down menus that list all of the functions in that category. The File Menu button—Lists all of the functions required to maintain the files used by the Viewer. The Analyze—The Desktop button—Lists all the functions required to analyze the data and create the Analyst Briefing Book. The Data Menu button—Lists the function of getting data into the system with both automatic and manual sequences. The Utilities Menu button—Lists the functions of installing an update or a show and printing the documentation. The Help Menu button—Lists the functions of activating the specific help comments and the About Analyst screen. The Icons—Activating any one of the seven (7) icons directs the system to go directly to the specific action identified. Files Icon—Directs the system to go to the Open Company screen that lists all the company files available in the current directory and allows the user to open any file. Analysis Icon—Directs the system to go to the Analyst Desktop where of the analytical functions are performed. The user can choose to see the analytical results and then print the results, or go directly to the Print Screen. Data Icon—Directs the system to go to the first screen of the manual data entry system. Shows Icon—Directs the system to load a saved show for future use. Backup—Directs the system to go to the backup sequence. Help—Directs the system to go to the help file listings. Exit—Directs the operating system to shut down the program and return to the operating system.

The Company Quick Select pull down menu—Directs the system to go to the Open Company screen that lists all the company files available in the current directory and allows the user to open any file.

FIG. 21—The File Screen Menu lists all of the functions required to maintain the files used by the Viewer.

FIG. 22—Select Client File Screen—Directs the system to go to the Open Company screen that lists all the company files available in the current directory and allows the user to open any file. This is the same function activated by the Files icon and the Company Quick Select window. The three options are: The Select button—Directs the system to open the highlighted company's files for analysis by the system.

The Cancel button—Directs the system to go back to the File menu. The Help button—Directs the system to open the help file specific to the current screen.

FIG. 23—Edit Current File Specs Screen—Directs the system to open the Edit screen where the user can change most of the specifications selected when the company was created. The options are as follows:

Id#—Id# is assigned automatically in sequence by the system, and cannot be modified.

Company:—Company name can be edited in this screen.

Optional Line 1:—shows on all graphs, directly under Company name, normally describes the time period of the statements being presented (can be edited on this screen).

Optional Line 2:—shows on all graphs, directly under Optional Line 1, normally describes the organizational status of the statements being presented (can be edited on this screen).

Fiscal Year End:—user selects the Company's year end month. The final month selection is required so the system can make year to date and other computations. If the selection is changed on this screen, all of the data is deleted.

Data Directory:—Sets the system path for the data files of the Company. Can be changed, but will cause the current data to be blank.

Show directory:—Sets the system path for the Show files of the Company. Can be changed, but will loose the current set of shows.

Sound directory:—Sets the system path and defines the sound file controlling the system. Once set, it should not be changed or the sound system may not work in the program.

Template:—Shows the templates that are available in the current directory. Cannot be changed in the Edit screen.

Logo File—Shows the current bitmap used to print on the briefing book. The selection can be changed by clicking on the bitmap and selecting another. Can be used in this screen.

Edit Template—Activates the Builder, allows the user to edit the name of the templates. Can be used in this screen.

Data Link—Activates the Data Link program and allows the user to define the link to other accounting, spreadsheet, data base or other programs using a specific data link program. Can be used in this screen.

The Save button—Saves all the changes made on the screen.

The Help button—Activates the specific help for the this screen.

The Exit Screen button—Moves the program back to the File menu.

FIG. 24—Add New Client File Screen—There are two choices provided under this option, Add New Company or Add New Comparison to Existing Company.

FIG. 25—Add New Company Screen—Directs the system to open the New Client screen where the user can add a new company to the companies in the active directory.

Id#—Id# is assigned automatically in sequence by the system, and cannot be changed.

Company:—Company name must be entered in this screen, or the window will not close.

Optional Line 1:—This entry shows on all graphs, directly under Company name, normally describes the time period of the statements being presented, and must be completed.

Optional Line 2:—This entry shows on all graphs, directly under Optional Line 1, normally describes the organizational status of the statements being presented, and may be completed.

Fiscal Year End:—The user selects the Company's year end month. The final month selection is required so the system can make year to date and other computations.

Data Directory:—Sets the system path for the data files of the Company.

Show directory:—Sets the system path for the Show files of the Company.

Sound directory:—Sets the system path and defines the sound file controlling the system.

Template:—Shows the templates that are available in the current directory.

Logo File—Shows the current bitmap used to print on the briefing book. The selection can be changed by clicking on the bitmap and selecting another.

Edit Template—Activates the Builder, allows the user to edit the name of the templates.

Data Link—Activates the Data Link program and allows the user to define the link to other accounting, spreadsheet, data base or other programs using specific data link program.

The Save button—Saves all the changes made on the screen.

The Help button—Activates the specific help for this screen.

The Exit Screen button—Moves the program back to the File menu.

FIG. 26—Add New Comparison to Existing Company Screen—Leads the user through the screens required to add another template comparison.

Confirmation Screen—Asks the user to confirm the selection.

FIGS. 27 and 28—Select Time Comparison Screen—Lists the available alternatives. The user clicks to make a selection and the programs completes the selection.

FIG. 29—Delete Client File Screen—Directs the system to open the Delete Client screen where the user can delete any company except the currently active client.

The Delete button—Deletes the highlighted company.

The Cancel button—Moves the system back to the File menu.

The Help button—Activates the specific help for the this screen.

FIG. 30—Backup Client Files Screen—Directs the system to open the Backup Client Files screen where the user can back up all the company files.

The Continue button—Activates the Microsoft back up system.

The Cancel button—Moves the system back to the File menu.

FIG. 31—Year End Roll Over Screen—Directs the system to open the Year End Roll Over screen where the user can cause the system to delete the last years data and move current years data to the last year column and increment the years by one. Provides two options: "Yes" to continue the roll over and "No" to return system back to File menu.

FIG. 32—Printer Setup Screen—Directs the system to open the standard Windows printer setup screen.

FIG. 33—System Setup Screen—Directs the system to open the System Setup screen where the user can choose to hear or not hear the system sounds, set the "Ask for Backup" message "On" or "Off", and enter the name and the path for the systems sound drivers.

System Sounds—User sets the switch to "Enabled" to turn on the system provided sounds; or "Disabled" to turn off the system sounds.

PromPt Backup on Exit?—User sets the switch to "Enabled" to turn on the system to ask if the user wants to Back Up the system each time they leave the system; or "Disabled" to turn off the option.

Sound Record/Play Application:—User must complete this entry to define the sound system that will control all of the sound record/play functions in the program.

The Save button—Saves all the changes made on the screen.

The Help button—Activates the specific help for the this screen.

Run Template Builder—Directs the system to open the Analyst Template Builder if it is present in the appropriate directory. This option will be shaded out if the Template Builder is not available.

The Exit button—directs the operating system to shut down the program and return to the operating system.

FIG. 34—Analyze—The Desktop Screen—The Analyze button opens the Viewer Desktop where the program performs the analysis required to publish the briefing book. Before the program opens the Desktop, the program performs several system checks.

Zero Values Found—Analysis Data Edit Screen—This screen activates when a user activates the Analysis before data has been entered. The analysis program computes a large number of ratios and cannot use zeros. The user can ignore the warning and click on the Continue button, the program will open the Desktop. Pushing the Esc button will return the system to the Main Menu.

FIG. 35—Analyst Show Installed Screen—This screen activates when an Analyst Show has been installed and is available for use in this company:

Show Screen—If the user clicks on this icon, the program loads the saved show.

Analysis—If the user clicks on this icon, the program opens the Desktop.

Exit Screen—If the user clicks on this icon, the program goes back to the Main Menu.

FIG. 36—If this selection is activated, the system reminds the user that the Show is a "view-only process" and the data cannot be edited.

FIG. 37—Output Choices: Screen—Actives the type of reporting the user chooses.

The Screen button—Activates the Desktop where the results can be viewed directly on the screen, the word analysis can be edited, and the final results saved as a Show or sent to the printer.

The Printer button—Activates the printer screen directly.

The End Task button—Returns the program to the Main Menu.

The Help button—Activates the specific help for the this screen.

FIG. 38—The Desktop Screen—Activates seven (7) menus that perform all of the analyses and report the results either on the screen or as a printed briefing book.

File—Lists all of the functions required to support the analysis and presentation of the results. Here are the six menu options.

Create Show File—Saves the file in a Show format for future use.

FIG. 39—Question Screen—The program checks to see if the program has run the written analysis procedure and reports if there are blank pages. The user can select "Yes" to save the file without the written analysis or "No" to return to the File menu.

FIG. 40—Select Show Destination Screen—Lets the user name the show or use the system default; and select the directory.

FIGS. 41 and 42—Question Screen—Confirms that the user want to save the show, and if "yes", the system completes this task.

FIG. 43—Add Sound . . . Screen—Activates the sound system and presents a list of the Pages where sound can be added.

The Select Verbal Analysis Topic: Page List button—Lists the Pages (topics) where sound can be added.

The Record Button—Activates the Microsoft Recording system so the user can record a message for the highlighted Page.

The Cancel button—Returns the system to the File Menu.

The Help button—Activates the specific help for the this screen.

FIG. 44—Set Graph Colors Screen—Opens the Global Graph Color Settings screen.

The Backgrounds, Borders, Headings and Bars button—The colors for each of these four (4) areas can be changed. Clicking on any of the area menus opens the list of colors available. Clicking on the color will select the color highlighted.

The Save button—Saves the colors selected. The system will notify the user that the charts have to be recreated to activate the new colors.

The Exit button—Closes the window without saving the changes and goes back the File Menu.

The Help button—Activates the specific help for the this screen.

The Hide Graph Numbers - Off button (File Menu)—A switch to hide or show the numbers in the graphs. The default is "Off" meaning the numbers will show on the graph. To take the numbers off the graphs, click on the listing and the switch will turn to "On" meaning that the numbers will not show on the graphs.

FIG. 45—Print Screen—Opens the Print Screen. The Print menu offers four types of print switches and four action buttons. Each option on the Print Screen is "On" if the "X" is shown and off if the box is blank and clicking on any of the options toggles the options between off and on.

FIG. 46—Print Setup Menu—This is a standard Microsoft Window Setup.

The Pare Selection: button—The Page Selection screen opens with the default—"Print All Pages in Default Sequence". Or, the user can toggle off the default and select which pages to print and in what order.

The Briefing Book Format Options: button—Lets the user select from four options.

The Print Cover Pare button—The system provides a pre-formatted cover page that is available to the user.

The Include Company Logo button—If the Print Cover Page option is on, then the user can toggle the Logo to print or not to print.

The Include Definition Page button—The system includes a complete set of definitions for all of the terms used in the system and can be printed with this option.

The Use Black and White Palette button—Default setting is "On". If the setting is "Off", the program will print in color.

The Page Options: button—There are two ways to print the pages. The first is All on One Page, the Landscape mode where all four portions are printed on one page. The second is Split between Two Pages, the Portrait mode where two portions are printed on one page and two on the second page. When the two pages are matched, they create a single, larger Page view.

The Suppress Output: button—Allows the user to toggle off two of the four portions to check output, the Written or the Graphs portions or both portions. The tabular portion will always print.

The Print Button—Activates the printer to print the selections.

The Settings button—Activates the Microsoft Windows Print Setup screen.

The Return to Main Menu button—Returns the system to the main menu.

The Help button—Activates the specific help for the this screen.

The Exit Printing button—Returns system to Desktop.

FIG. 47—Edit Screen—When a Words screen is open, the user can Copy Text to the Clipboard (CTRL C) or From the Clipboard (CTRL V).

FIG. 48—Words Screen—Activating any of the options on the Words menu opens a word screen with a word editing section and six action buttons.

FIG. 49—Word editing section Screen—Each time the system is run it checks to see if the numbers have been changed, if "no", the system regenerates the words that describe the numbers and puts them in the main portion. The main portion of the screen is a simple word editing system that shows all of the words generated by the system for the current data set. The user can edit the words directly by adding comments, modifying the comments or deleting the comments.

The Play Sound Button—Activates the sound system to Play the messages previously recorded.

The Add Sound Button—Activates the Windows recording system so the user can add comments directly to each page.

FIG. 50—The Comments Button Screen—Activates the Comments window that is available for each of the pages in the template. The user can record words that may be used a number of times. These comments are permanent and are never replaced except by the user.

The Export Text Button—Activates a "Save" routine that lets the user send the current words to an ASCII file any directory in the system.

The Done Button—Returns the system to the Desktop.

Help Button—Activates the specific help for the this screen.

FIG. 51—Data Screen—Shows the data selected in stylized tabular formats.

FIG. 52—Charts Screen—Shows the Charts selected as they will appear on the printed Page.

FIG. 53—Pares Screen—Shows all four portions of the Page selected.

The Help button—Activates the complete help function.

FIG. 54—The Data Input Menu Screen—Main Menu lists the functions for entering data into the system, both automatic and manual sequences.

Use Manual Data Entry—Opens the manual data entry system that presents the set of screens required to manually enter the data from the keyboard. The system also displays the chart the data represents.

FIG. 55—Data Entry Options: Screen—Sets up the special data entry features and describes the data set.

Use Auto Sum—Automatically balances the internal financial statement computations including sales and cash flows.

Round to Thousands—Rounds up to thousands when entering the data and pressing the Enter key.

Round to Millions—Rounds up to millions when entering the data and pressing the Enter key.

Data Column Information—Describes the data set.

Name—User can change the name of the data columns up to seven characters.

Month—Sets the month for the data set.

Year—Lets the user define the year.

Continue—Activates the data entry screen.

FIG. 56—Question Screen—Confirms that the Auto Sum feature requires the sales detail to tie into the Revenue and Expense statements and that the user wants this function.

FIG. 57—Financial Data Entry Screen—Lists the Pages where data can be entered.

Continue—Activates the data entry sequence.

Finished with Data Entry—Closes the Data Entry sequence and goes back to the Main Menu.

FIG. 58—Optional Control Totals Screen—Permits the user to enter Control Totals that will be used to control the accuracy of the manual data entry.

FIG. 59—The Manual Data Entry Screen—For ASSETS—END OF YEAR RESULTS. Each data entry screen fits the data sets required and presents two sets of data, top and bottom. The top set is always the current data and the second set is always the comparative set. All alpha descriptions in the data sets can be edited on this screen.

The Entering Data button—The data entry cursor starts on the top line of the first column and all data is entered from the numerical portions of the keyboard. All totals are automatically calculated; the rounding occurs when the Enter key is used, the arrow keys will not activate the rounding.

The Refresh button—Redraws the graph showing the new data entered and the new colors chosen.

The Colors button—Activates the standard Global Graph Color Settings screen so the user can change the color settings.

The Save button—Saves the numbers and other changes entered on the screen.

The Calculator button—Activates the Windows Calculator function.

The Next button—Reactivates the Financial Data Entry Screen where the same sequence is repeated until the data for all eight pages are entered, prompts the user to save the data if not saved.

The End Task button—Closes the Data Entry function, prompts the user to save the data.

FIG. 60—Data Entry Review Screen—Is activated each time the data is involved to constantly remind the user of the status. Shows that all of the columns are in or out of balance if all the data needed for all the computations is available. Also computes the results of computing the Altman Z Bankruptcy Ratios and provides the user with a brief analysis of their financial position.

Import from Excel XLS file—(See FIG. 54) Activates the data import system so the user can import the data from a previously created and formatted Excel spreadsheet.

Import from Lotus 1-2-3 WK1 file—(See FIG. 54) Activates the data import system so the user can import the data from a previously created and formatted Lotus 1-2-3 WK1 spreadsheet.

Import from Lotus 1-2-3 WK3 file—(See FIG. 54) Activates the data import system so the user can import the data from a previously created and formatted Lotus 1-2-3 WK3 spreadsheet.

Import From ASCII file—(See FIG. 54) Activates the data import system so the user can import the data from a previously created and formatted ASCII data file.

Import From Data Link—(See FIG. 54) Activates the data import system so the user can import the data from another unrelated computer program utilizing a previously created Analyst—Data Link program that search the linked data storage program and returns the required values to the Analyst system.

FIG. 61—The Utilities Menu Screen lists the functions of installing an update or a show; and, printing the documentation.

FIG. 62—Install Update Screen—Activates the system that will install updated Analyst programs from a magnetic media without disturbing the data or company files.

FIGS. 63 and 64—Install Analyst Show Screen—Activates the system that will install previously created Analyst show programs from a magnetic media to the currently active show directory for subsequent use in the Viewer.

The Print Documentation button—Activates the printer to print all of the documentation provided with the system.

FIG. 65—The Help Menu Screen the functions of activating the specific help comments and the About Analyst screen.

FIG. 66—Analyst Help Screen—Opens the Analyst Help system and lists all of the help comments available so the user can select the help they need. The user selects a topic by moving the cursor (the dark shaded bar) over the topic and clicking on the topic or clicking on the Help button.

FIG. 67—About Analyst Screen—Opens the About Analyst screen that describes the product copyrights, trademarks, patents and users' responsibilities.

The Print Financial Definitions button—Activates the printer to print the definitions of all the terms used in the Analysis portion of the system.

The Done button—Returns to the Main Menu.

While a particular embodiment of the present invention has been disclosed, it is to be understood that various different modifications are possible and are within the true spirit of the invention, the scope of which is to be determined with reference to the claims set forth below. There is no intention, therefore, to limit the invention to the exact disclosure presented herein as a teaching of one embodiment of the invention.

I claim:

1. A method implemented by using a digital electrical information processing system to make a template for organizing subsequently input template data, the digital electrical information processing system including a digital electrical computer having a processor, the digital electrical computer being connected to an input device, an output device, and a memory device, the input device being operable for receiving input data and translating the input data into input digital electrical signals communicated to the processor, the processor being programmed to manipulate the input digital electrical signals to produce output digital electrical signals conveyed to the output device, the memory device being operable for storing a portion of the output digital electrical signals in a memory media, wherein the method includes the steps of:
   (A) defining, by the input device, a template for presenting the subsequently input data, the template including a page having a first portion, a second portion, and a third portion, wherein:
      (i) the first portion includes a set of data elements for representing the subsequently input data such that if the subsequently input data includes a time series data, then the first portion includes sets of up to twelve time series numeric data elements, and if the subsequently input data includes numeric data elements, then the first portion includes no more than four sets of numeric data elements, each of the sets including no more than ten numeric data elements,
      (ii) the second portion includes at least one chart with at least one plot for depicting each of the numeric data elements from the first portion of the page, and
      (iii) the third portion includes text characterizing at least one of the numeric data elements in the first portion; and
   (B) storing the template in the memory media.

2. The method of claim 1, wherein the step of defining is carried out such that the first portion is located in a top right corner of the page, the second portion is located in a top left corner of the page, and the third portion is located in a bottom right corner of the page.

3. The method of claim 1, wherein the step of defining, for the first portion, includes the steps of:
   creating a data matrix of variables defined by rows and columns, each said column having a column heading variable, each said row intersecting a first one of the columns, a second one of the columns for primary data, the primary data being a portion of the subsequently input data, and a third column of the columns for comparative data, the comparative data being an other portion of the subsequently input data, wherein each said row includes: a name-identifier in the variable of the first column, one of the numeric data elements in the variable of the second column, and one of the numeric data elements in the variable of the third column; and
   linking at least two of the numeric data elements in the first portion with at least one mathematical function.

4. The method of claim 3, wherein the step of defining, for the second portion, includes the step of:
   illustrating each said mathematical function with a chart.

5. The method of claim 1, wherein the subsequently input data includes primary data and comparative data and wherein step of defining, for the third portion, forming the text by the following steps:
   providing, for at least one row, a first case statement for the case in which the numeric data elements in the primary data are greater than comparative data, providing a second case statement for the case in which the numeric data elements in the primary data are less than the comparative data, and providing a third case statement for the case in which the numeric data elements in the primary data equal the comparative data;
   inputting, at said input device, range limits within each said case;
   inputting, at said input device, a corresponding sentence for each of the ranges; and
   inputting, at said input device, at least one explanatory sentence; wherein
   said text is formed by combining the explanatory sentence with other text formed by testing the subsequently input template data to select one of the case statements, the range limit, and the corresponding sentence.

6. The method of claim 1, wherein the step of defining is carried out with the template including more than one of said page, each said page including a fourth portion, the fourth portion including at least one chart with at least one plot capable of depicting at least one of the numeric data elements in the first portion of any said page in said template.

7. The method of claim 6, wherein the step of defining, for the fourth portion, includes the steps of:
   forming a result from at least one of the numeric data elements in the first portion from any said page in said template; and
   forming a chart including at least one plot for depicting the result.

8. The method of claim 7, wherein the step of defining is carried out with the template including more than one of said page, each said page including one said fourth portion, and the step of defining further includes the steps of:
   identifying a first of the numeric data elements in the first portion from one of said pages in said template;
   identifying a second of the numeric data elements from another of said pages in said template; and linking the identified first one of the numeric data elements and the second of the numeric data elements with a mathematical function; and engaging said processor to form the result by using the function.

9. The method of claim 3, wherein the step of defining, for the second portion, includes the steps of:

illustrating each said mathematical function with a chart.

10. The method of claim 9, wherein the subsequently input data includes primary data and comparative data, and wherein the step of defining, for the third portion, said text is formed by the following steps:

providing, for at least one row, a first case statement for the case in which the numeric data elements in the primary data are greater than the comparative data, providing a second case statement for the case in which the numeric data elements in the primary data are less than the comparative data, and providing a third case statement for the case in which the numeric data elements in the primary data equal the comparative data;

inputting, at said input device, range limits within each said case;

inputting, at said input device, a corresponding sentence for each of the ranges; and inputting, at said input device, at least one explanatory sentence; wherein said text is formed by combining the explanatory sentence with other text formed by testing the subsequently input template data to select one of the case statements, the range limit, and the corresponding sentence.

11. The method of claim 9, wherein the step of defining is carried out with the template including more than one of said page, each said page including a fourth portion, the fourth portion including at least one chart with at least one plot capable of depicting at least one of the numeric data elements in the first portion of any said page in said template.

12. A template produced in accordance with the process of any one of claims 1 through 11.

13. A template produced in accordance with claim 12, wherein:

said template includes a variable for storing digitalized voice data as a portion of the subsequently input data.

14. The method of any one of claims 1 through 11, wherein the processor is programmed by a hardcoded program which accesses graphics computer instructions to form the plots.

15. The method of any one of claims 1 through 11, wherein the processor is programmed by a template builder, the template builder including a set of computer instructions for constructing a template, the template including a data file and a second set of computer instructions for subsequently programming the processor under the control of a viewer program, the viewer program including a third set of computer instructions for later programming the processor to communicate the subsequently input template data into the data file and then to construct output organized in accordance with the template, the output including a show program, the show program including a fourth set of computer instructions for programming the processor to display the output.

16. The method of any one of claims 1 through 11, wherein the processor is programmed by a plurality of objects which accesses graphics computer instructions to form the plots, each of the objects being code.

17. The method of any one of claims 1 through 11, wherein the processor is programmed by a plurality of applets which accesses graphics computer instructions to form the plots, each of the applets being code.

18. A method implemented by using a digital electrical information processing system to activate a template to produce a presentation of input template data, the digital electrical information processing system including a digital electrical computer having a processor, the digital electrical computer being connected to an input device, an output device, and a memory device, the input device being operable for receiving input data and translating the input data into input digital electrical signals communicated to the processor, the processor being programmed by a viewer program to manipulate the input digital electrical signals to produce output digital electrical signals conveyed to the output device, the memory device operable to electrically communicate with a memory media, wherein the method includes the steps of:

(A) calling up the template from the memory media, the template including a page having a first portion, a second portion, and a third portion, wherein:

(i) the first portion includes a set of data elements for representing the subsequently input data such that if the subsequently input data includes a time series data, then the first portion includes sets of up to twelve time series numeric data elements, and if the subsequently input data includes numeric data elements, then the first portion includes no more than four sets of numeric data elements, each of the sets including no more than ten numeric data elements, (ii) the second portion includes at least one empty chart with at least one empty plot for depicting each of the numeric data elements from the first portion of the page, and (iii) the third portion includes space for text characterizing at least one of the numeric data elements in the first portion.

(B) receiving at the processor the input template data, the input template data in the form of digital electrical signals representing raw numeric data; and (C) organizing, by the processor, the input data into the portions of the template to fill the empty charts and the empty plots to show respective representations of the input data, and to fill the space with the text representing the input data, the portions being assembled to form a presentation.

19. The method of claim 18, wherein the step of calling up the template is carried out with the template including more than one of said page, each said page including a fourth portion, the fourth portion including at least one chart with at least one plot capable of depicting at least one of the numeric data elements in the first portion of any said page in said template.

20. The method of claim 18, wherein the step of calling up is carried out with the first portion located in a top right corner of the page, the second portion located in a top left corner of the page, and the third portion is located in a bottom right corner of the page.

21. The method of claim 18, wherein:

the information processing system further includes a microphone electrically connected to convey digitalized voice signals to the processor, and a speaker for receiving the digitalized voice signals from the processor; and further including the steps of:

providing voice data to the microphone to provide the digitalized voice signals;

storing the digitalized voice signals in a presentation variable; and viewing the presentation with the information processing system, including outputting the digitalized voice signals at the speaker.

22. The method of claims 18, further including the step of: editing, by the processor, the input data, the data elements, the text in the space, and the digitalized voice signals in the variable to produce a real time change in the presentation.

23. The method of claim 18, further including the steps of: storing the presentation in a memory media.

24. The method of claim 18, further including the steps of: storing the presentation as a show program in the memory media, the show program being a computer program for programming the processor to display the presentation at the output device.

25. The method of claim 18, wherein said method is carried out with said input device for receiving input data being a PC-compatible keyboard.

26. The method of claim 18, wherein said step of organizing is carried out so that as each of the input data fills the empty charts and the empty plots, a new chart and a new plot is displayed at the output device.

27. The method of claim 18, wherein the step of receiving the input data is carried out by the viewer program controlling the processor to read a data file formed by an other computer program to store the input data.

28. The method of claim 18, wherein the step of organizing is carried out by forming the presentation as a bit map; and further comprising the step of printing the bit map at the output device.

29. The method of claim 18, wherein the digital electrical computer is connected to an acoustic input device to receive acoustic input data; and wherein the step of organizing includes inserting, by the programmed processor, acoustic data into the presentation.

30. The method of claim 18, wherein the template is first constructed by an other digital electrical information processing system including an other digital electrical computer having an other processor, the other digital electrical computer being connected to an other input device, an other output device, and an other memory device, the other input device being operable for receiving other input data and translating the other input data into other input digital electrical signals communicated to the other processor, the other processor being programmed by an other program to manipulate the other input digital electrical signals to produce other output digital electrical signals conveyed to the other output device, the memory device operable to electrically communicate with an other memory media,digital electrical computer.

31. The method of claim 18, wherein the step of organizing includes inserting, by the processor, comments into the template such that the comments are inserted in the presentation.

32. The method of claim 18, wherein the step of organizing includes generating, by the processor, predictive data projected from the input data, the predictive data being inserted by the processor into the presentation.

33. A template article of manufacture stored on a memory media and readable by a template viewer program to organize subsequently input data, the template being readable by programming a processor in a digital electrical computer, the computer connected to an input device and operable for receiving input data and translating the input data into input digital electrical signals for processing by the programmed processor into output digital electrical signals stored in the memory media, and to an output device and operable for receiving the output digital signals and translating the output electrical signals to form a report including more than one page, wherein the template includes:

(A) a data file and computer instructions for presenting the subsequently input data into a predefined format including at least one page, the page having a first portion, a second portion, a third portion, and a fourth portion, wherein:
  (i) the first portion includes a set of data elements for representing the subsequently input data such that if the subsequently input data includes a time series data, then the first portion includes sets of up to twelve time series numeric data elements for organizing the subsequently input data, and if the subsequently input data includes numeric data elements, the n the first portion includes no more than four sets of numeric data elements, each of the four sets including no more than ten numeric data elements for organizing the subsequently input data,
  (ii) the second portion includes at least one chart with at least one plot for depicting each of the numeric data elements from the first portion of the page,
  (iii) the third portion includes a space for text characterizing at least one of the numeric data elements in the first portion, the text being inserted in the fourth portion in response to the subsequently input data being processed in accordance with text options in the computer instructions, and
  (iv) the fourth portion includes at least one chart with at least one plot capable of depicting at least one of the numeric data elements in the first portion of any said page in said template.

34. The template of claim 33, wherein the first portion includes:
  a data matrix of variables defined by rows and columns, each said column having a column heading variable, each said row intersecting a first one of the columns, a second one of the columns for primary data, and a third column of the columns for comparative data, wherein each said row includes: a name-identifier in the variable of the first column, one of the numeric data elements in the variable of the second column, and one of the numeric data elements in the variable of the third column; and
  at least two of the numeric data elements in the first portion are linked by at least one mathematical function.

35. The template of claim 33, wherein the second portion includes:
  a chart definition for illustrating each of the subsequently input data processed in accordance with said at least one mathematical function.

36. The template of claim 33, wherein the fourth portion includes:
  a result formed from at least one of the numeric data elements in the first portion from any said page in said template; and
  a chart including at least one plot formed to depict the result.

37. The template of claim 33, wherein the third portion includes:
  for at least one row, a first case statement for the case in which the numeric data elements in the primary data are greater than the comparative data, providing a second case statement for the case in which the numeric data elements in the primary data are less than the comparative data, and providing a third case statement for the case in which the numeric data elements in the primary data equal the comparative data;

range limits within each said case;

a corresponding sentence for each of the ranges; and at least one explanatory sentence; wherein said text is formed by combining the explanatory sentence with other text formed by testing the subsequently input template data to select one of the case statements, the range limit, and the corresponding sentence.

38. The template of claim 33, wherein the report includes a balance sheet.

39. The template of claim 38, wherein the report includes assets, liabilities, and equities.

40. The template of claim 33, wherein the report includes an income statement.

41. The template of claim 33, wherein the numeric data sets include an operating ratio.

42. The template of claim 33, wherein the numeric data sets include a financial ratio.

43. The template of claim 33, wherein the numeric data sets include an accounting ratio.

44. The template of claim 33, wherein the report is inserted as a portion of a second report, the second report being generated by an other programming of the processor, the other programming being carried out with an other computer program to control the input device to receive other input data into an other portion of the second report.

45. A show article of manufacture stored on a memory media and readable by a show viewer program to present data previously input to a template, the show being readable to program a processor in a digital electrical computer, the computer connected to an input device and operable for receiving input commands and translating the commands into input digital electrical signals for processing by the programmed processor into output digital electrical signals presented by an output device operable for receiving the output digital signals and translating the output electrical signals into a report, wherein the show includes:

(A) computer instructions for presenting, in response to the commands, the previously input data organized into a predefined format including at least one page, the page having a first portion, a second portion, and a third portion, and a fourth portion, wherein:

(i) the first portion includes a set of data elements for representing the previously input data such that if the previously input data is time series data, then the first portion includes sets of up to twelve time series numeric data elements organizing the previously input data, and if the previously input data is numeric data elements, then the first portion includes no more than four sets of numeric data elements, each of the four sets including no more than ten numeric data elements for organizing the previously input data, (ii) the second portion includes at least one chart with at least one plot for depicting each of the numeric data elements from the first portion of the page, (iii) the third portion includes text characterizing at least one of the numeric data elements in the first portion, and (iv) the fourth portion includes at least one chart with at least one plot for depicting at least one of the numeric data elements in the first portion of any said page in said template.

46. The show of claim 45, wherein the first portion includes:

a data matrix of variables defined by rows and columns, each said column having a column heading variable, each said row intersecting a first one of the columns, a second one of the columns for primary data, and a third column of the columns for comparative data, wherein each said row includes: a name-identifier in the variable of the first column, one of the numeric data elements in the variable of the second column, and one of the numeric data elements in the variable of the third column; and at least two of the numeric data elements in the first portion are linked by at least one mathematical function.

47. The show of claim 45, wherein the second portion includes:

a chart illustrating each of the input template data processed in accordance with said at least one mathematical function.

48. The show of claim 45, wherein the fourth portion includes:

a result formed from at least one of the numeric data elements in the first portion from any said page in said template; and a chart including at least one plot formed to depict the result.

49. The show of claim 45, wherein the third portion includes:

said text is formed by the template selecting from a plurality of statements in response to the input template data.

* * * * *